(12) United States Patent
Jin

(10) Patent No.: US 7,956,495 B2
(45) Date of Patent: *Jun. 7, 2011

(54) STRUCTURE HAVING A POWER TRANSMITTING DEVICE

(75) Inventor: Mikimoto Jin, Chino (JP)

(73) Assignee: Seiko Epson Corporation, Tokyo (JP)

( * ) Notice: Subject to any disclaimer, the term of this patent is extended or adjusted under 35 U.S.C. 154(b) by 264 days.

This patent is subject to a terminal disclaimer.

(21) Appl. No.: 12/237,449

(22) Filed: Sep. 25, 2008

(65) Prior Publication Data

US 2009/0079270 A1 Mar. 26, 2009

(30) Foreign Application Priority Data

Sep. 26, 2007 (JP) ................................. 2007-249443

(51) Int. Cl.
*H01F 27/42* (2006.01)
(52) U.S. Cl. ........................................................ 307/104
(58) Field of Classification Search ................... 307/104
See application file for complete search history.

(56) References Cited

U.S. PATENT DOCUMENTS

| | | | |
|---|---|---|---|
| 5,376,778 A | 12/1994 | Kreft | |
| 5,821,731 A | 10/1998 | Kuki et al. | |
| 5,850,135 A | 12/1998 | Kuki et al. | |
| 7,518,337 B2 | 4/2009 | Beart et al. | |
| 7,521,890 B2 | 4/2009 | Lee et al. | |
| 7,863,860 B2 | 1/2011 | Lin | |
| 2007/0126583 A1* | 6/2007 | Maniwa et al. | 340/572.2 |
| 2007/0182367 A1* | 8/2007 | Partovi | 320/108 |
| 2008/0245422 A1* | 10/2008 | McTargett | 137/487.5 |
| 2009/0096415 A1 | 4/2009 | Beart et al. | |
| 2009/0127937 A1* | 5/2009 | Widmer et al. | 307/149 |

FOREIGN PATENT DOCUMENTS

| | | |
|---|---|---|
| JP | A-6-4723 | 1/1994 |
| JP | A-08-033112 | 2/1996 |
| JP | A-9-182212 | 7/1997 |
| JP | A-9-215211 | 8/1997 |
| JP | A-2001-309579 | 11/2001 |
| JP | A-2002-101578 | 4/2002 |
| JP | A-2002-152997 | 5/2002 |
| JP | A-2003-284264 | 10/2003 |
| JP | A-2005-6440 | 1/2005 |
| JP | A-2005-6441 | 1/2005 |
| JP | A-2005-006460 | 1/2005 |
| JP | A-2006-500894 | 1/2006 |
| JP | A-2006-060909 | 3/2006 |
| JP | A-2006-320047 | 11/2006 |
| JP | A-2008-036101 | 2/2008 |

OTHER PUBLICATIONS

U.S. Appl. No. 12/237,733; in the name of Mikimoto Jin, filed Sep. 25, 2008.
U.S. Appl. No. 12/236,192; in the name of Mikimoto Jin, filed Sep. 23, 2008.
U.S. Appl. No. 12/237,450; in the name of Mikimoto Jin, filed Sep. 25, 2008.
Office Action mailed Feb. 18, 2011 in U.S. Appl. No. 12/237,450.

* cited by examiner

*Primary Examiner* — Michael Rutland Wallis
(74) *Attorney, Agent, or Firm* — Oliff & Berridge, PLC

(57) ABSTRACT

A structure compliant with non-contact power transmission includes a placement member that includes a placement side, an electronic instrument including a non-contact power transmission power receiving device being placed on the placement side, a non-contact power transmission power transmitting device, and a position detection circuit that detects the positional relationship between a primary coil and a secondary coil. The power transmitting device detects the relative positional relationship between the primary coil and the secondary coil using a harmonic detection circuit, and drives an XY stage using an actuator to automatically position the primary coil with respect to the secondary coil, for example.

12 Claims, 33 Drawing Sheets

$fp = 1/2\pi\sqrt{L1 \cdot C1}$ $Lps (= L1 + \Delta L)$ $fsc = 1/2\pi\sqrt{Lps \cdot C1}$ FIG. 6A  FIG. 6B  FIG. 6C  FIG. 6D
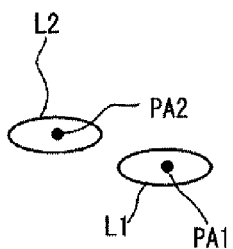 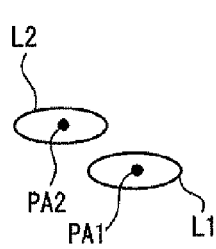 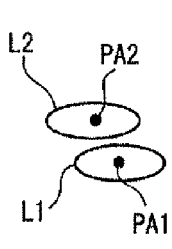 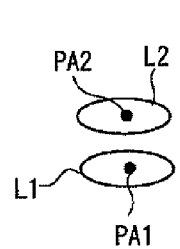
FIG. 7
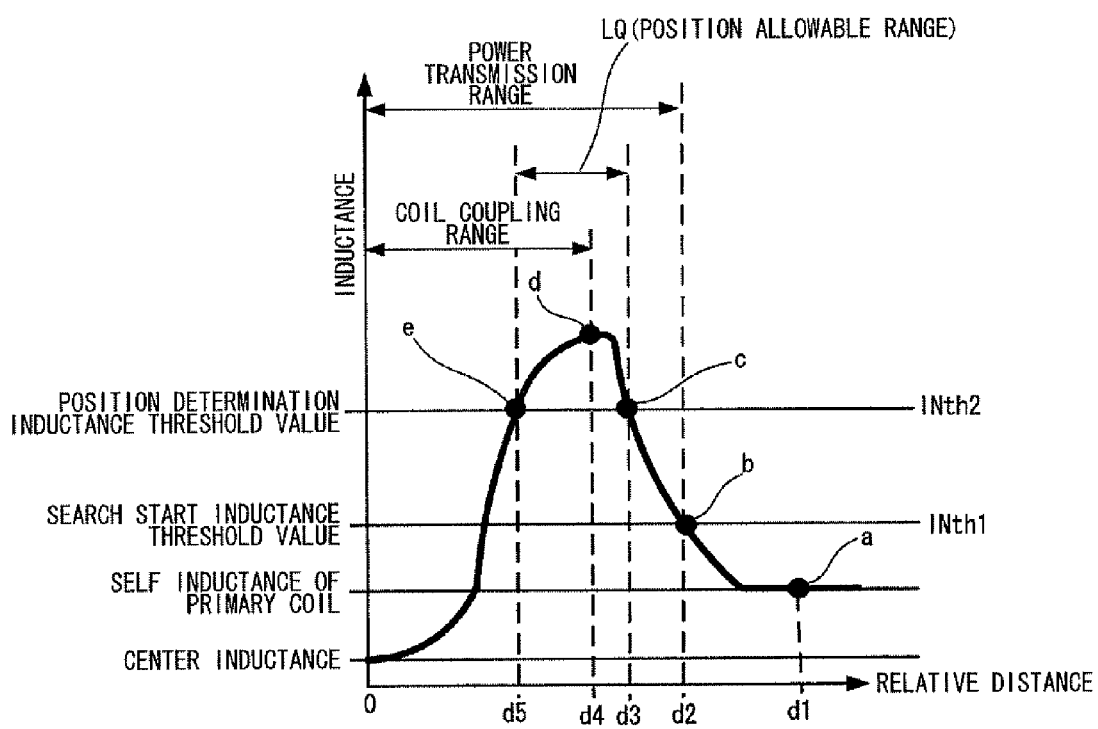

FIG. 8
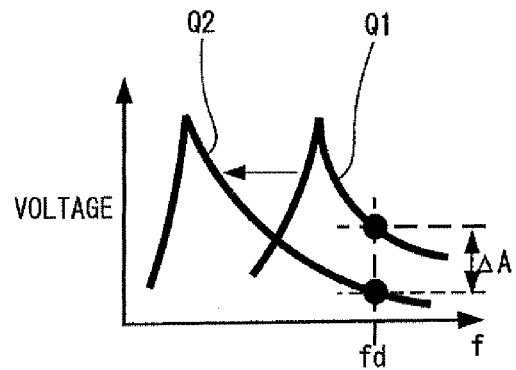
FIG. 9A  FIG. 9B  FIG. 9C
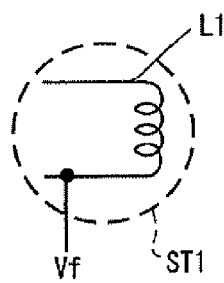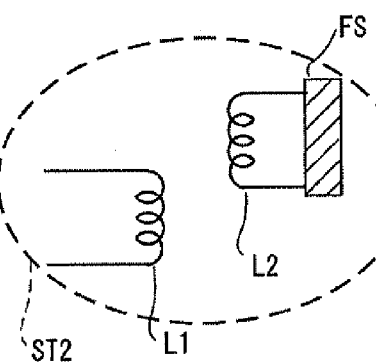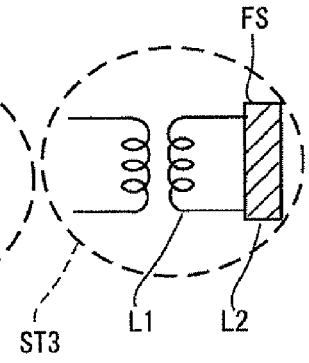
FIG. 10
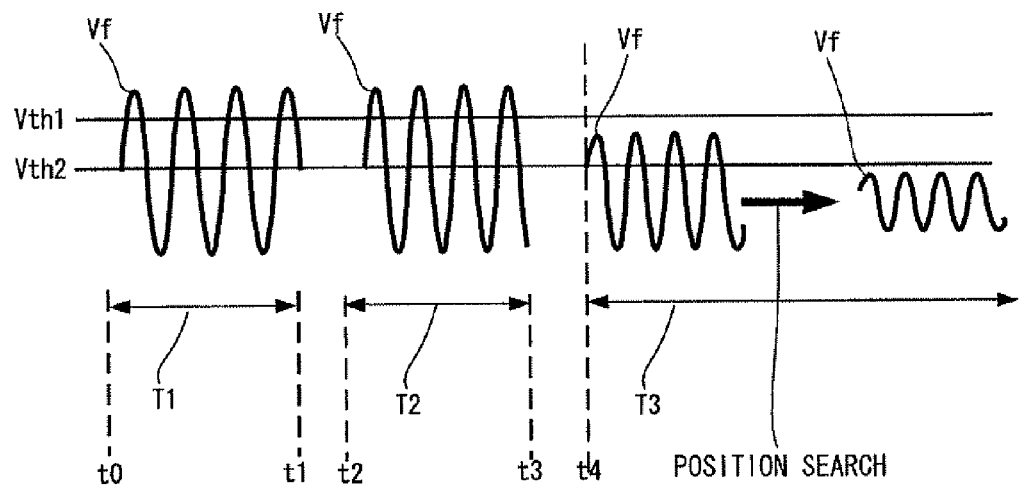

(SPIRAL SCAN)

FIG. 17A  FIG. 17B  FIG. 17C  FIG. 17D
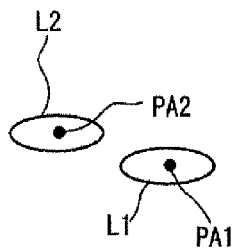
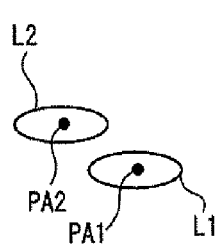
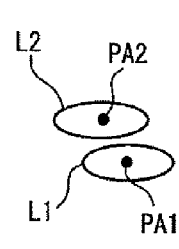
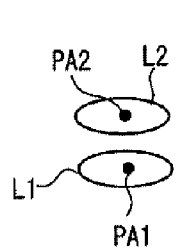
FIG. 18
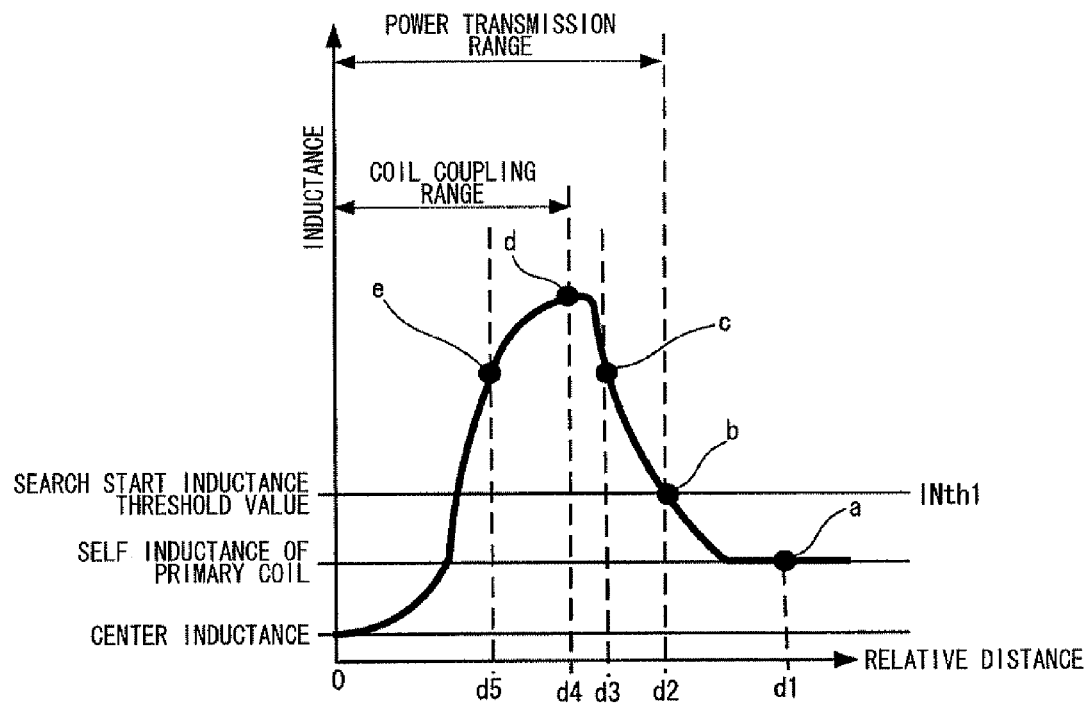

FIG. 20A
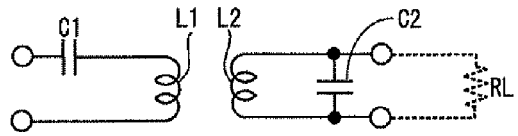
FIG. 20B
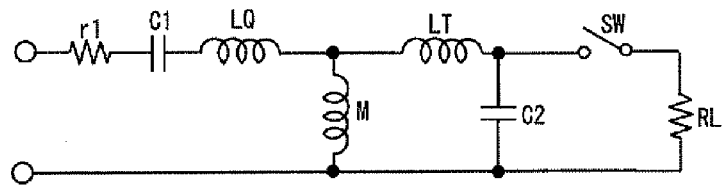
FIG. 20C
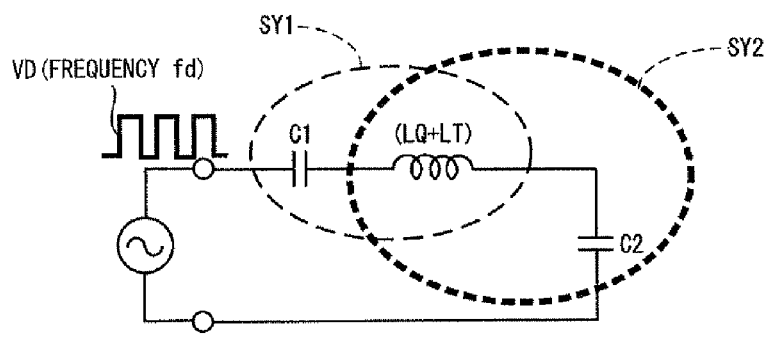
FIG. 20E
FIG. 20D
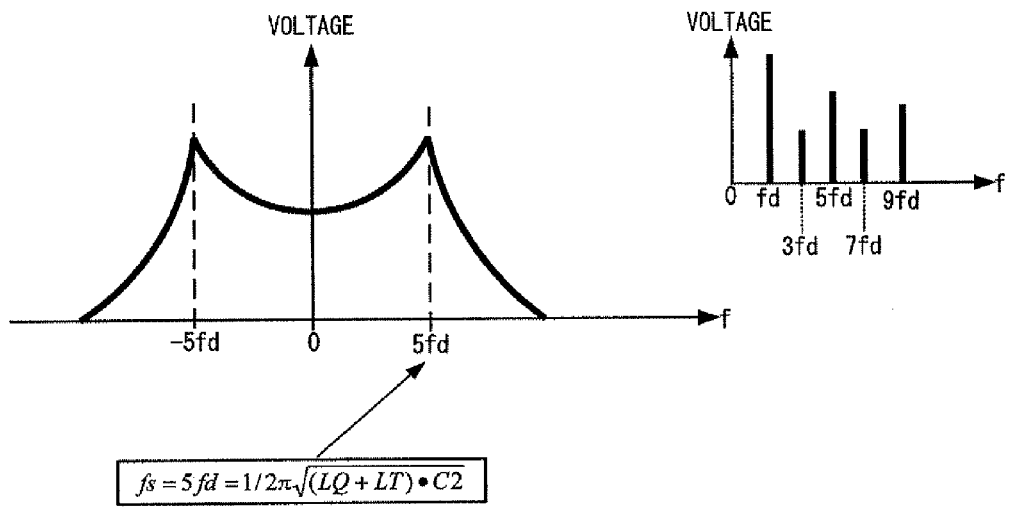
$$fs = 5fd = 1/2\pi\sqrt{(LQ+LT) \cdot C2}$$

W(=POSITION AT WHICH RESONANCE PEAK IS OBTAINED)

STRUCTURE HAVING A POWER TRANSMITTING DEVICE

Japanese Patent Application No. 2007-249443 filed on Sep. 26, 2007, is hereby incorporated by reference in its entirety.

BACKGROUND

The present invention relates to a structure having a power transmitting device and the like.

In recent years, non-contact power transmission (contactless power transmission) that utilizes electromagnetic induction to enable power transmission without metal-to-metal contact has attracted attention. As application examples of non-contact power transmission, charging a portable telephone, charging a household appliance (e.g., cordless telephone handset or watch), and the like have been proposed.

JP-A-2006-60909 discloses a non-contact power transmission device using a primary coil and a secondary coil, for example.

JP-A-2005-6460 discloses technology that detects misalignment of a primary coil and a secondary coil in a non-contact power transmission system. According to the technology disclosed in JP-A-2005-6460, whether or not the relative positional relationship between the primary coil and the secondary coil is correct is detected based on an output voltage of a rectifier circuit of a power receiving device. When the relative positional relationship between the primary coil and the secondary coil is correct, a light-emitting diode (LED) is turned ON to notify the user that the relative positional relationship between the primary coil and the secondary coil is correct. When the relative positional relationship between the primary coil and the secondary coil is incorrect, the LED is not turned ON. In this case, the user manually adjusts the positional relationship between the primary coil and the secondary coil.

In order to accurately position the primary coil and the secondary coil in a non-contact power transmission system, it is desirable to use a dedicated power transmitting instrument (i.e., a primary-side electronic instrument including a power transmitting device) for a secondary-side instrument including a power receiving device, for example. In this case, it is necessary to provide a dedicated power transmitting instrument corresponding to each secondary-side instrument. Therefore, a versatile power transmitting instrument cannot be provided.

For example, when charging a battery of a portable terminal utilizing a non-contact power transmission system, the external shape (design) of the portable terminal and the secondary coil installation position generally differ depending on the manufacturer even if the size of the portable terminal is identical. Therefore, it is difficult to deal with a plurality of portable terminals produced by different manufacturers using one power transmitting instrument (charger).

Moreover, different types of terminals (e.g., portable telephone terminal and PDA terminal) differ in size, shape (design), and secondary coil installation position. Therefore, it is difficult to deal with different types of terminals using one power transmitting instrument.

If a portable terminal can be charged merely by placing the portable terminal in a given area of a structure (e.g., desk) having a flat surface without using a dedicated power transmitting instrument, the convenience of a non-contact power transmission system can be significantly improved. However, the accurate position of a secondary coil of a portable terminal placed at an approximate position in a given area cannot be determined for the above-described reasons. Therefore, such a next-generation non-contact power transmission system cannot be implemented by the current technology.

According to the technology disclosed in JP-A-2005-6460, although the user can be notified whether or not the primary coil and the secondary coil are positioned correctly, the user must manually adjust the positional relationship between the primary coil and the secondary coil when the positional relationship is incorrect.

SUMMARY

According to one aspect of the invention, there is provided a structure having a power transmitting device comprising:

a placement member that includes a placement side on which an electronic instrument including a power receiving device can be placed; and a power transmitting device that transmits power to the power receiving device, the power transmitting device including a primary coil and a position detection circuit, the primary coil being able to couple electromagnetically with a secondary coil of the power receiving device, the position detection circuit detecting a positional relationship between the primary coil and the secondary coil.

BRIEF DESCRIPTION OF THE DRAWINGS

FIGS. 6A to 6D are views showing examples of the relative positional relationship between a primary coil and a secondary coil.

FIG. 7 is a view showing the relationship between the relative distance between a primary coil and a secondary coil and the inductance of the primary coil.

FIG. 8 is a view showing a change in the resonance frequency of a resonant circuit including a primary coil due to an increase in inductance.

FIGS. 9A to 9C are views showing examples of a change in the relative positional relationship between a primary coil and a secondary coil.

FIG. 10 is a view illustrative of a method that automatically adjusts the positional relationship between a primary coil and a secondary coil.

FIGS. 17A to 17D are views showing examples of the relative positional relationship between a primary coil and a secondary coil.

FIG. 18 is a view showing the relationship between the relative distance between a primary coil and a secondary coil and the inductance of the primary coil.

FIGS. 20A to 20E are views illustrative of the configuration and the operation of a harmonic resonant circuit.

DESCRIPTION OF EXEMPLARY EMBODIMENTS

Figure 1A:
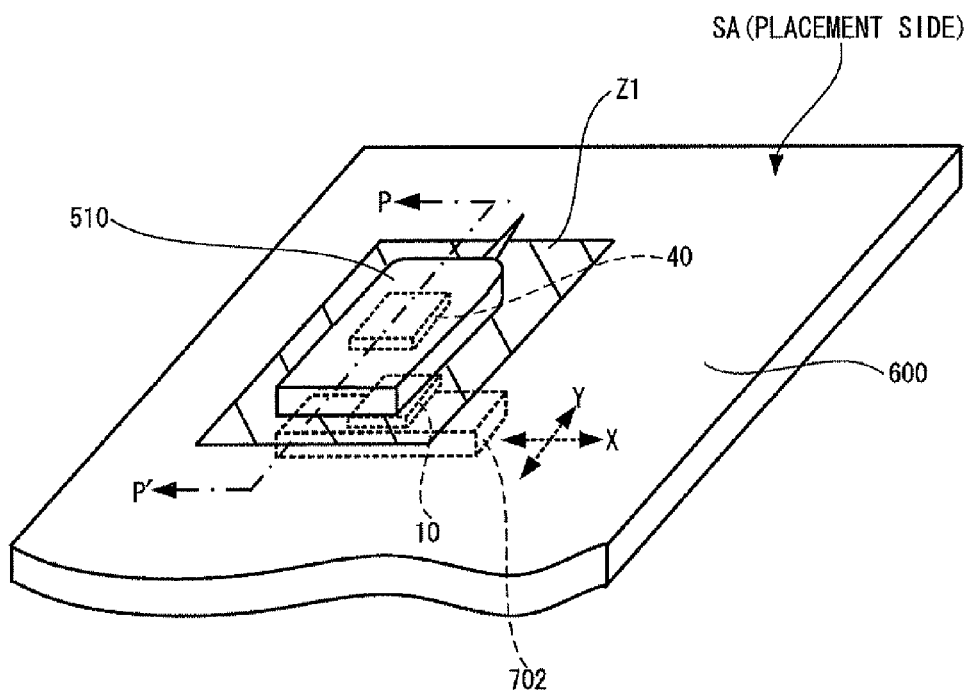
FIGS. 1A and 1B are views showing an example of a structure provided with a non-contact power transmission power transmitting device.

Several embodiments of the invention may provide a structure (e.g., system desk) for a next-generation non-contact power transmission system with significantly improved versatility and convenience, for example. For example, a power transmitting device (primary-side instrument) may voluntarily detect the relative positional relationship between the power transmitting device (primary-side instrument) and a power receiving device (secondary-side instrument). A primary coil and a secondary coil may be efficiently positioned using the resulting positional relationship detection information. Moreover, the primary coil and the secondary coil may be automatically positioned. Therefore, the relative positional relationship between the primary coil and the secondary coil may be automatically optimized regardless of the manufacturer, size, type, design, and the like of the secondary-side instrument. Therefore, the user may easily utilize the next-generation non-contact power transmission system in daily life.

(1) According to one embodiment of the invention, there is provided a structure having a power transmitting device (non-contact power transmission device) comprising:

a placement member that includes a placement side on which an electronic instrument including a power receiving device can be placed; and a power transmitting device that transmits power to the power receiving device, the power transmitting device including a primary coil and a position detection circuit, the primary coil being able to couple electromagnetically with a secondary coil of the power receiving device, the position detection circuit detecting a positional relationship between the primary coil and the secondary coil.

In the structure compliant with non-contact power transmission according to this embodiment, the power transmitting device (primary-side instrument) can voluntarily detect the relative positional relationship between the power transmitting device (primary-side instrument) and the power receiving device (secondary-side instrument). The primary coil and the secondary coil can be efficiently positioned using the resulting positional relationship detection information. Moreover, the primary coil and the secondary coil can be automatically positioned.

When the positional relationship between the primary coil and the secondary coil can be detected, it can be determined that the article placed in the placement area is not a screw, a nail, or the like, but is a secondary-side instrument that can be (may be) a power transmission target. Specifically, the positional relationship detection circuit also has a function of a means that detects whether or not the article placed in the placement area is an instrument that can be a power transmission target (i.e., a detector that detects whether or not the article is an appropriate secondary-side instrument).

(2) The structure may further comprise:

a notification section that indicates a detection result of the positional relationship by the position detection circuit.

According to this embodiment, the user can determine the positional relationship of the secondary-side instrument (e.g., portable terminal) placed on the placement side of the structure with respect to the power transmitting device provided under the placement side (e.g., a relative positional relationship in which the distance between the primary coil and the secondary coil is within a power transmission range, but the center of the primary coil differs to a considerable extent from the center of the secondary coil, or a relative positional relationship in which the center of the primary coil coincides with the center of the secondary coil) in real time, for example.

The user can easily position the secondary coil with respect to the primary coil by moving the secondary-side instrument on the placement side by trial and error using the notification information as an index, for example.

Positioning is further facilitated by forming a transparent placement area so that the user can visually observe the position of the coil provided under the placement area either directly or indirectly, for example.

Moreover, placement or removal (leave) of the secondary-side instrument can be detected by the position detection circuit, and the notification section can notify the user of the detection result.

The notification section may notify the user whether or not the secondary-side instrument is an instrument that can be a power transmission target (e.g., a secondary-side instrument having a secondary-side configuration compliant with the standard).

(3) In the structure according to this embodiment, the position detection circuit may detect the positional relationship between the primary coil and the secondary coil based on a coil end voltage or a coil current of the primary coil that changes due to the approach of the secondary coil provided with a magnetic material.

The positional relationship (including the approach of the secondary coil toward the primary coil) between the primary coil and the secondary coil can be detected by a simple circuit based on a change in the inductance of the primary coil due to the approach of the secondary coil provided with a magnetic material.

The magnetic material attached to the secondary coil is a shield that separates a magnetic flux of the secondary coil from a secondary-side circuit, or may be a core of the secondary coil, for example. When the secondary coil has approached the primary coil, a magnetic flux of the primary coil passes through the magnetic material of the secondary coil. As a result, the inductance of the primary coil increases. The term "inductance" used herein refers to an inductance (more accurately an apparent inductance) that changes due to the approach of the secondary coil provided with the magnetic material. The term "apparent inductance" is distinguished from the inductance (self-inductance) of the primary coil (i.e., the inductance of the primary coil when the primary coil is not affected by the secondary coil). The value of the apparent inductance is obtained by measuring the inductance of the primary coil when the secondary coil has approached the primary coil using a measuring instrument, for example.

In this specification, the term "apparent inductance" is merely written as "inductance", except for the case where clear statement of the term "apparent inductance" is considered to be necessary. Since the coil end voltage (coil current) of the primary coil decreases along with an increase in the inductance of the primary coil, the approach of the primary coil can be detected by detecting the change in the coil end voltage (coil current).

When the approach of the secondary coil can be detected, it can be determined that the secondary-side instrument that can be a power transmission target has approached the primary-side instrument. Therefore, the approach detection circuit also has a function of a means that detects whether or not the instrument placed in the placement area is a secondary-side instrument that includes the secondary coil and can be a power transmission target (i.e., a detector that detects whether or not the instrument is an appropriate secondary-side instrument).

(4) In the structure according to this embodiment, the position detection circuit may be a harmonic detection circuit that detects a harmonic signal of a drive signal (drive frequency) of the primary coil.

According to this embodiment, the harmonic resonance peak of the drive frequency of the primary coil can be detected by the harmonic detection circuit. For example, a resonant circuit that resonates with the harmonic of the drive frequency of the primary coil is formed in the secondary-side instrument (power receiving device side). For example, the secondary-side resonant circuit is formed when the primary coil and the secondary coil have a given relative positional relationship.

The primary coil is driven intermittently, and the detection output level of the harmonic detection circuit is detected, for example. This enables a situation in which the primary coil and the secondary coil have a given relative positional relationship can be accurately detected irrespective of the operation of the secondary-side instrument (i.e., the primary-side instrument can voluntarily detect the situation).

For example, when the resonance frequency of the primary-side resonant circuit including the primary coil is referred to as fp, the drive frequency of the primary coil is generally set at a frequency (fd) away from the resonance frequency (fp) taking the operational stability into consideration. When the drive signal of the primary coil is a symmetrical alternating-current signal, the harmonic (fs) of the drive frequency of the primary coil is only an odd-order harmonic. For example, the fifth-order harmonic (fs=5fd) may be used to detect the position of the secondary coil.

Since the harmonic signal has a frequency that is not involved in normal power transmission from the primary coil to the secondary coil, the harmonic signal does not affect the normal operation. Moreover, since the resonance energy is reduced to about 1/nth of the basic frequency when using an nth-order (n is an odd number equal to or larger than three, for example) harmonic, the resonance peak value has an appropriate level so that the harmonic resonance peak can be easily detected by the harmonic detection circuit.

The detection output of the harmonic detection circuit may be used to detect the positions of the primary coil (power transmitting device) and the secondary coil (power receiving device or secondary-side instrument) in a broad sense. The detection output may be utilized for various applications.

For example, the primary coil and the secondary coil may be positioned using the detection output of the harmonic detection circuit as an index.

A situation in which the secondary-side instrument has been placed at a given position can be detected utilizing the harmonic detection output (secondary-side instrument placement detection).

A situation in which the primary coil or the secondary coil moves away (or approaches) can be detected in real time by monitoring a change in the level of the harmonic detection output (detection of movement, approach, leave, or the like).

A situation in which the secondary-side instrument has been removed can be detected when the harmonic detection output at a given level has not been obtained (leave detection).

(5) In the structure according to this embodiment, a resonant circuit may include the primary coil being formed when the primary coil and the secondary coil are electromagnetically coupled in a state in which the center of the primary coil and the center of the secondary coil having a given positional relationship, the resonant circuit resonating with a harmonic of the driving signal of the primary coil, and a resonance peak signal may be output from the harmonic detection circuit.

According to this embodiment, the resonant circuit that resonates with the harmonic of the drive frequency of the primary coil is formed on the power receiving device side so that the harmonic resonance peak is obtained. In the resonant circuit, the capacitance of the resonant capacitor of the secondary coil is set to resonate with a leakage inductance when the primary coil and the secondary coil are positioned at a given distance R ($R \geq 0$), for example. In this case, the harmonic resonance peak is detected when the primary coil and the secondary coil are positioned at the given distance R.

When a resonant circuit is formed by a capacitor and a leakage inductance when the position of the primary coil coincides with the position of the secondary coil, the harmonic resonance peak is detected when the position of the primary coil coincides with the position of the secondary coil. In this case, the detection output of the harmonic detection circuit can be utilized as a position detection signal that indicates that the position of the primary coil coincides with the position of the secondary coil. Therefore, the primary coil and the secondary coil can be positioned using the level of the harmonic detection output as the position detection signal as an index.

For example, the secondary coil can be positioned with respect to the primary coil by providing an indicator lamp that emits light when a harmonic detection output that exceeds a given level is obtained, and manually moving the secondary-side instrument by trial and error to search for a position at which the indicator lamp emits light.

(6) The structure may further comprise:

an actuator that causes movement of the position of the primary coil of the power transmitting device in an XY plane; and an XY stage that moves the position of the primary coil when driven by the actuator.

According to this embodiment, the position of the primary coil is moved by trial and error using the actuator until a harmonic detection output equal to or higher than a given level is obtained, for example. This automatically implements a given relative positional relationship between the primary coil and the secondary coil.

The primary coil may be moved by trial and error by moving the primary coil based on a given movement sequence (e.g., based on a spiral scan sequence), or moving the primary coil at random, for example.

(7) In the structure according to this embodiment, the power transmitting device may further include:

a power transmission control device, the power transmission control device may include a power-transmitting-side control circuit that controls power transmission to the power receiving device;

a harmonic detection circuit that detects the harmonic signal of the drive signal of the primary coil;

a calculation circuit that performs given calculations based on a detection signal from the harmonic detection circuit, and calculates the position of the center of the secondary coil;

and an actuator control circuit that controls the operation of the actuator that causes movement of the position of the primary coil in the XY plane, the actuator control circuit may scan the primary coil to detect the position of the secondary coil, the calculation circuit may detect the position of the center of the secondary coil by performing the given calculations based on data acquired by a scan to detect the position of the secondary coil, and the actuator control circuit may move the primary coil so that the position of the center of the primary coil coincides with the calculated position of the center of the secondary coil.

According to this embodiment, the calculation circuit calculates the center position of the secondary coil based on the coordinate position data when the harmonic resonance peak has been obtained. Since the center of the secondary coil is accurately calculated utilizing the resonance peak and the primary coil is moved so that the center of the primary coil coincides with the calculated position of the center of the secondary coil, the primary coil and the secondary coil can be accurately positioned.

(8) In the structure according to this embodiment, the primary coil and the secondary coil may be circular coils, the actuator control circuit may drive the actuator to move the primary coil along a first axis that intersects the secondary coil to perform a first scan to detect the position of the secondary coil, the calculation circuit may calculate the coordinates of a midpoint of a line segment that connects two points at which the peak of the detection signal of the harmonic detection circuit is obtained during the first scan, the actuator control circuit may drive the actuator to move the primary coil along a second axis that perpendicularly intersects the first axis and passes through the midpoint calculated by the first scan to perform a second scan to detect the position of the secondary coil, the calculation circuit may calculate the coordinates of a midpoint of a line segment that connects two points at which the peak of the detection signal of the harmonic detection circuit is obtained during the second scan, and the actuator control circuit may drive the actuator to move the primary coil so that the position of the center of the primary coil coincides with the position of the midpoint calculated during the second scan.

According to this embodiment, the position of the secondary coil is detected by an orthogonal two-axis search utilizing the circular coil and harmonic detection, and the primary coil is automatically moved to the detected position of the secondary coil.

For example, the circular primary coil is scanned along an axis (first axis) in an arbitrary direction (first scan). When the search range of the primary coil is rectangular, for example, the primary coil necessarily intersects the secondary coil by moving the primary coil along a diagonal axis. The harmonic peak is obtained during the first scan when the center of the primary coil and the center of the secondary coil are positioned at a given distance (R). This positional relationship is implemented when the primary coil approaches the secondary coil and when the primary coil moves away from the secondary coil. Therefore, the harmonic resonance peak is obtained at two points in the XY plane by performing the first scan.

The calculation circuit calculates the midpoint of a line segment that connects the two points. The second scan is then performed along the second axis that passes through the midpoint and perpendicularly intersects the first axis. The calculation circuit calculates the midpoint of a line segment that connects two points at which the harmonic peak is obtained by the second scan.

The coordinates of the midpoint thus calculated indicate the coordinates of the center of the secondary coil. Therefore, the primary coil is moved so that the center of the circular primary coil coincides with the calculated center of the secondary coil. This enables the primary coil to be accurately positioned with respect to the secondary coil.

(9) In the structure according to this embodiment, the placement member may have a strength sufficient to withstand a given weight, and the primary coil and the secondary coil may be electromagnetically coupled through the placement member.

According to this embodiment, the placement member is provided between the primary coil and the secondary coil, and the primary coil and the secondary coil are electromagnetically coupled through the placement member. The placement member may be formed of a material that allows a magnetic flux to pass through and has rigidity.

The placement member has strength sufficient to withstand a given weight. For example, the placement member may be formed of a resin plate (e.g., acrylic plate) having a thickness of several millimeters. It is desirable to carefully determine the material and the thickness of the placement member taking into consideration the weight and the like of an article to be placed and a reduction in electromagnetic coupling loss of the primary coil and the secondary coil.

In the structure according to this embodiment, since the power transmitting device is provided under the placement side of the structure, the power transmitting device is shielded from the outside by the placement member (e.g., a flat plate having rigidity). Therefore, since a liquid such as water does not enter the power transmitting device or an object does not fall onto the power transmitting device, the power transmitting device can be used safely.

When the placement side of the structure is partially utilized as the placement area for the secondary-side instrument, the remaining area of the placement side may be utilized as an area for placing an article other than the secondary-side instrument, for example. When the secondary-side instrument is not charged, an article other than the secondary-side instrument may be placed in the placement area for the secondary-side instrument, for example.

(10) In the structure according to this embodiment, the placement member may have a cutting portion in which the primary coil faces the secondary coil so that the primary coil and the secondary coil are electromagnetically coupled without the placement member interposed between the primary coil and the secondary coil.

According to this embodiment, the placement member (e.g., flat plate) is cut in the area in which the primary coil faces the secondary coil (i.e., an area that covers the area in which the primary coil at least overlaps the secondary coil). Specifically, the placement member is not positioned between the primary coil and the secondary coil. Therefore, the primary coil and the secondary coil can directly transmit and receive power without the placement member interposed between the primary coil and the secondary coil.

According to this embodiment, since the placement member is not interposed between the primary coil and the secondary coil, a non-contact power transmission loss does not occur. Therefore, a decrease in transmission efficiency can be prevented.

(11) In the structure according to this embodiment, the placement side may at least partially have a side parallel to a coil surface of the primary coil that is planar.

The placement side may have various types of shape. The placement side at least partially has a side parallel to the coil surface of the planar primary coil (e.g., a wound coil or a coil formed by providing a spiral conductive wire in a semiconductor substrate or the like).

It is considered that the placement side is generally a horizontal surface. However, the entire placement side may be a slope, or a protrusion or a slope may be partially formed for positioning the secondary-side instrument. Likewise, the entirety of the placement side is not necessarily formed of a single plane.

However, since power is transmitted in a state in which the planar primary coil faces the planar secondary coil, the surface of the primary coil and the surface of the secondary coil are generally parallel. Therefore, the placement side on which the secondary-side instrument including the secondary coil is placed is at least partially parallel to the coil surface of the planar primary coil. The primary coil and the secondary coil are maintained parallel (positional relationship optimum for non-contact power transmission) by placing the secondary-side instrument so that the main surface (secondary-coil-side surface of the housing) of the secondary-side instrument comes in contact with the side (side having an area sufficient for placing the secondary-side instrument) parallel to the coil surface of the planar primary coil.

(12) In the structure according to this embodiment, the structure may be a desk-shaped structure.

Since the structure compliant with non-contact power transmission according to this embodiment can be utilized as a multi-functional work desk such as a system desk, a highly versatile and convenient next-generation non-contact power transmission system can be utilized in daily life.

The desk-shaped structure includes a charger table that is used in a portable telephone shop and can simultaneously charge a plurality of portable terminals, a counter table used in a family restaurant or a bar popular among young people, and the like.

(13) In the structure according to this embodiment the structure may be a wall-shaped structure.

The structure compliant with non-contact power transmission according to this embodiment can also be utilized as a wall (structure in which the power transmitting device and the like are provided in a wall) of a condominium or a single-family house, for example. In this case, a portable terminal suspended on a wall through a strap can be automatically charged via non-contact power transmission from the power transmitting device provided in the wall, for example.

The structure in which the power transmitting device is provided in a wall may be used to charge a portable terminal or supply power to a household appliance, for example (this also applies to a structure configured so that the secondary-side instrument is placed horizontally).

(14) In the structure according to this embodiment, the structure may be a portable plate-shaped structure.

The structure compliant with non-contact power transmission according to this embodiment may be a plate-shaped structure, for example. The plate-shaped structure refers to a plate-shaped article having a relatively small area, for example, and generally has excellent portability.

The material for the plate-shaped structure is not limited. For example, a synthetic resin such as an acrylic resin may be used. A rubber or a plastic having flexibility (bendability) and elasticity, a synthetic fiber fabric, or the like may also be used in order to provide a friction or impact buffer function.

Since the plate-shaped structure has excellent movability and portability, the user can easily utilize non-contact power transmission in an arbitrary location. When the power transmitting device is provided in the plate, the power transmitting device can be moved together with the plate.

(15) In the structure according to this embodiment, the structure may be a portable pad-shaped structure.

The structure compliant with non-contact power transmission according to this embodiment may be a pad-shaped structure, for example. The pad-shaped structure refers to a pad or a mat having a relatively small area, for example, and generally has excellent portability.

The material for the pad-shaped structure is not limited. For example, a synthetic resin such as an acrylic resin may be used. A rubber or a plastic having flexibility (bendability) and elasticity, a synthetic fiber fabric, or the like may also be used in order to provide a friction or impact buffer function.

Since the pad-shaped structure has excellent movability and portability, the user can easily utilize non-contact power transmission in an arbitrary location. When the power transmitting device is provided in the pad, the power transmitting device can be moved together with the pad.

(16) In the structure according to this embodiment, a plurality of the electronic instruments may be able to be placed on the placement side, and the power may be simultaneously transmitted from the structure to the plurality of electronic instruments via non-contact power transmission.

According to this embodiment, secondary batteries of a plurality of secondary-side instruments can be charged simultaneously, for example. The structure according to this embodiment may be installed in a portable telephone shop as a charger table that can simultaneously charge a plurality of portable terminals, and may be utilized by the customer.

(17) In the structure according to this embodiment, the power transmitting device may intermittently drive the primary coil using a drive signal having a given frequency in order to detect an approach of the secondary coil.

According to this embodiment, the power transmitting device intermittently drives the primary coil at a given frequency, and monitors a change in coil end voltage (coil current). This enables the power transmitting device to automatically detect the approach of the secondary-side instrument.

When the approach of the secondary-side instrument has been detected, the power transmitting device automatically specifies the position of the secondary coil by an orthogonal two-axis search using the harmonic detection circuit, and moves the primary coil to the specified position, for example. This implements full-automatic coil positioning so that the user can conveniently utilize non-contact power transmission.

According to at least one embodiment of the invention, the next-generation non-contact power transmission system with significantly improved versatility and convenience can be easily utilized. Therefore, the invention promotes utilization of the non-contact power transmission system as an infrastructure to contribute to widespread use of the non-contact power transmission system.

Preferred embodiments of the invention are described below with reference to the drawings. Note that the following embodiments do not in any way limit the scope of the invention defined by the claims laid out herein. Note that all elements of the following embodiments should not necessarily be taken as essential requirements for the invention.

First Embodiment

An example of a structure according to the invention is described below.

Figure 1B:
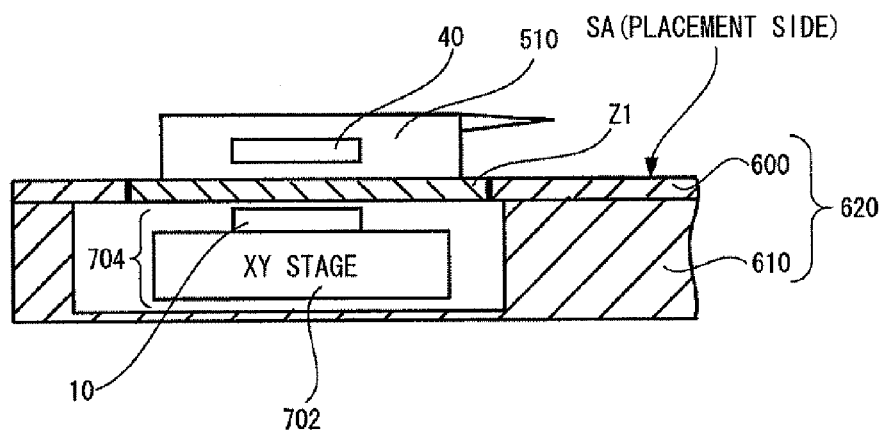

Example of structure provided with non-contact power transmission power transmitting device FIGS. 1A and 1B are views showing an example of a structure provided with a non-contact power transmission power transmitting device. FIG. 1A is a perspective view showing a system desk that is an example of the structure, and FIG. 1B is a cross-sectional view of the system desk shown in FIG. 1A along the line P-P'.

As shown in FIG. 1B, a power-transmitting-side device (i.e., a primary-side structure including a power transmitting device 10, an actuator (not shown), and an XY stage 702) 704 is provided in a structure (system desk in this example) 620 having a placement side SA.

Specifically, the power-transmitting-side device 704 is placed in a depression formed in the system desk 620 as the structure. A flat plate (e.g., an acrylic plate having a thickness of several millimeters) 600 as a placement member is provided over (on the upper side of) the system desk 620. The flat plate 600 as the placement member is supported by a support member 610.

In the following description, the flat plate as the placement member may be simply referred to as a flat plate or a placement member. The structure compliant with non-contact power transmission may be simply referred to as a structure. The system desk as the structure may be simply referred to as a system desk or a structure.

The flat plate 600 includes a portable terminal placement area Z1 in which a portable terminal (such as a portable telephone terminal, a PDA terminal, and a portable computer terminal) or the like is placed.

As shown in FIG. 1A, the portable terminal placement area (placement area) Z1 included in the flat plate 600 differs in color from the remaining area so that the user can determine that the portable terminal placement area Z1 is an area in which a portable terminal should be placed. Note that the color of the boundary area between the portable terminal placement area (placement area) Z1 and the remaining area may be changed instead of changing the color of the entire portable terminal placement area Z1.

The placement area Z1 may be formed using a transparent member, and the area other than the placement area Z1 may be formed using an opaque member. In this case, since the user can determine the placement area Z1 and visually observe the lower side (inside) of the placement area Z1, the user can easily determine the position of a primary coil provided under (in) the placement area Z1 either directly or indirectly. Therefore, when the user moves the position of a secondary-side instrument to position a primary coil (L1) and a secondary coil (L2), the user can more easily position the primary coil (L1) and the secondary coil (L2) so that the convenience to the user is improved.

A portable terminal (secondary-side instrument) 510 includes a power receiving device 40 (including a secondary coil) that receives power transmitted from the power transmitting device 10.

When the portable terminal 510 has been placed at an approximate position in the portable terminal placement area Z1, the power transmitting device 10 provided in the system desk 620 automatically detects that the portable terminal 510 has been placed in the portable terminal placement area Z1, and moves the XY stage (movable stage) by driving the actuator (not shown in FIG. 1) to automatically adjust the position of the primary coil corresponding to the position of the secondary coil. The above-described primary coil position automatic adjustment function enables non-contact power transmission to be performed while optimizing the positional relationship between the primary coil and the secondary coil regardless of the manufacturer, type, size, shape, design, and the like of the portable terminal.

Figure 11A:
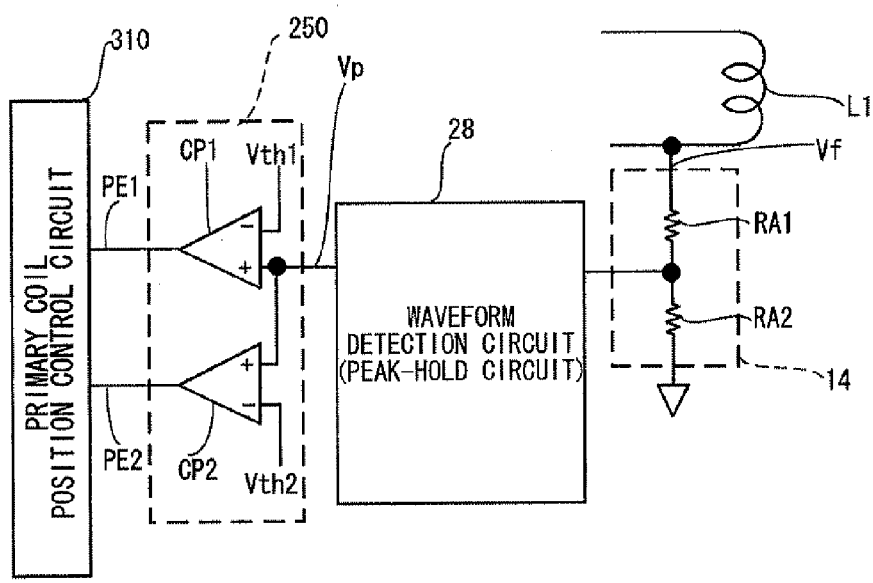
FIGS. 11A and 11B are views showing a specific circuit operation for automatically adjusting the positional relationship between a primary coil and a secondary coil.
Figure 11B:
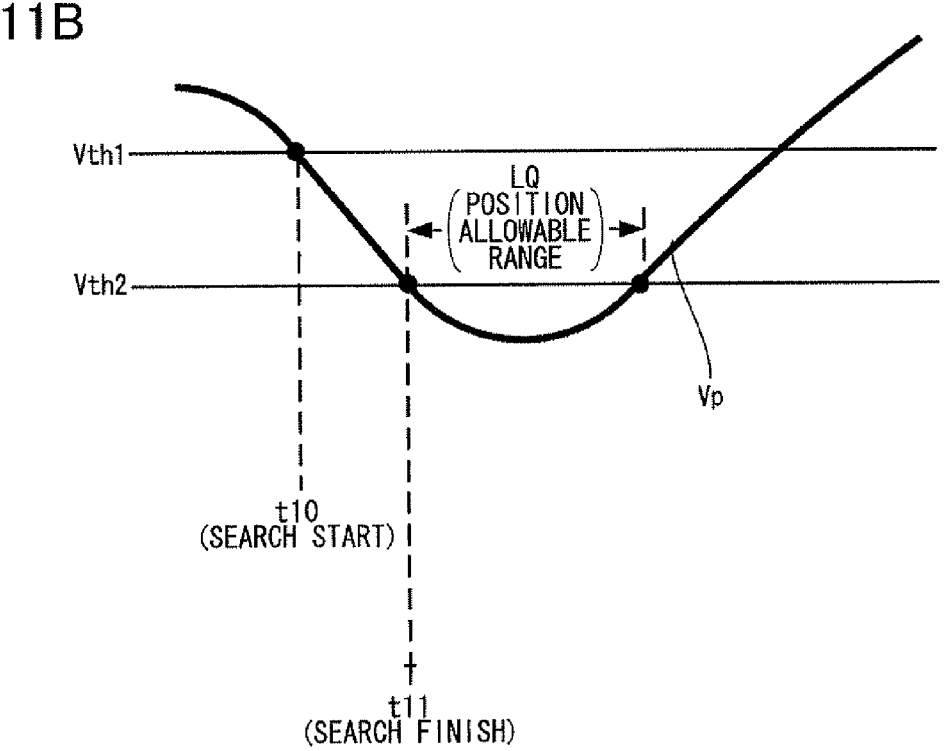

As shown in FIG. 11B, the flat plate (placement member) 600 is provided between the primary coil and the secondary coil, and the primary coil and the secondary coil are electromagnetically coupled through the flat plate (placement member) 600. The flat plate (placement member) 600 may be formed of a material that allows a magnetic flux to pass through and has rigidity. The flat plate (placement member) 600 has strength sufficient to withstand a given weight.

For example, the flat plate (placement member) 600 may be formed of a resin plate (e.g., acrylic plate) having a thickness of several millimeters. It is desirable to carefully determine the material and the thickness of the flat plate (placement member) 600 taking into consideration the weight and the like of an article to be placed and a reduction in electromagnetic coupling loss of the primary coil and the secondary coil.

In the structure shown in FIG. 1B, the power transmitting device 10 is provided under the placement side (SA) of the system desk (structure) 620. Therefore, the power transmitting device is shielded from the outside by the placement member (e.g., a flat plate having rigidity). Therefore, since a liquid such as water does not enter the power transmitting device or an object does not fall onto the power transmitting device, the power transmitting device can be used safely.

When the placement side of the system desk (structure) is partially utilized as the placement area for the secondary-side instrument, the remaining area of the placement side (SA) may be utilized as an area for placing an article other than the secondary-side instrument, for example.

When the secondary-side instrument is not charged, an article other than the secondary-side instrument may be placed in the placement area (Z1) for the secondary-side instrument, for example. Specifically, the system desk shown in FIGS. 1A and 1B may also be used as a dining table, for example.

Figure 37:
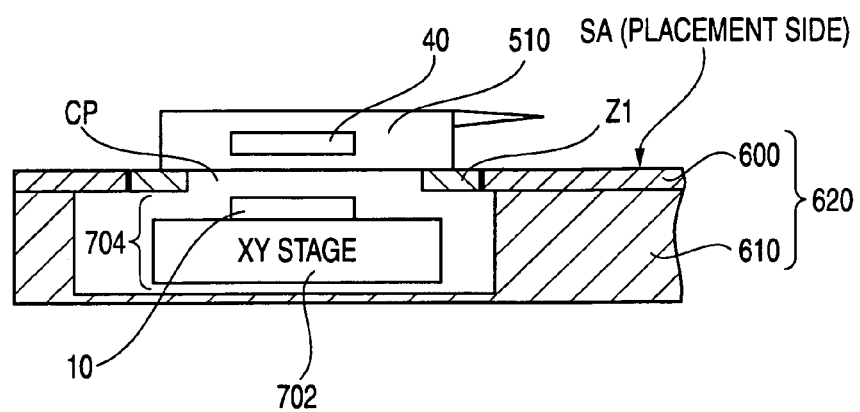
FIG. 37 is a view showing an example of a structure provided with a non-contact power transmission power transmitting device.

In the structure shown in FIG. 1B, the flat plate (placement member) 600 is provided between the power transmitting device 10 and the power receiving device 40. Power is transmitted from the primary coil to the secondary coil through the flat plate (placement member) 600. In this case, a power transmission loss may occur to some extent. With reference to FIG. 37, when a power transmission loss occurs to a large extent, the flat plate (placement member) 600 may be cut corresponding to the power transmission area so that the primary coil and the secondary coil are electromagnetically coupled without the flat plate (placement member) 600 interposed between the primary coil and the secondary coil.

Specifically, the flat plate (placement member) 600 may be cut in the area in which the primary coil faces the secondary coil (i.e., an area that covers the area in which the primary coil at least overlaps the secondary coil; this area may be referred to in FIG. 37 as a power transmission area CP) so that power can be directly transmitted and received between the primary coil and the secondary coil without the flat plate (placement member) 600 interposed between the primary coil and the secondary coil. In this case, since the flat plate (placement member) 600 is not interposed between the primary coil and the secondary coil, a non-contact power transmission loss does not occur. Therefore, a decrease in transmission efficiency can be prevented.

Since the structure according to this embodiment can be utilized as a multi-functional work desk such as a system desk, as described above, a highly versatile and convenient next-generation non-contact power transmission system can be utilized in daily life.

The desk-shaped structure includes a charger table that is used in a portable telephone shop and can simultaneously charge a plurality of portable terminals, a counter table used in a family restaurant or a bar popular among young people, and the like.

The structure according to this embodiment includes a wall-shaped structure and a plate-shaped or pad-shaped structure (described later).

Configuration and Operation of Non-Contact Power Transmission System

Figure 2:
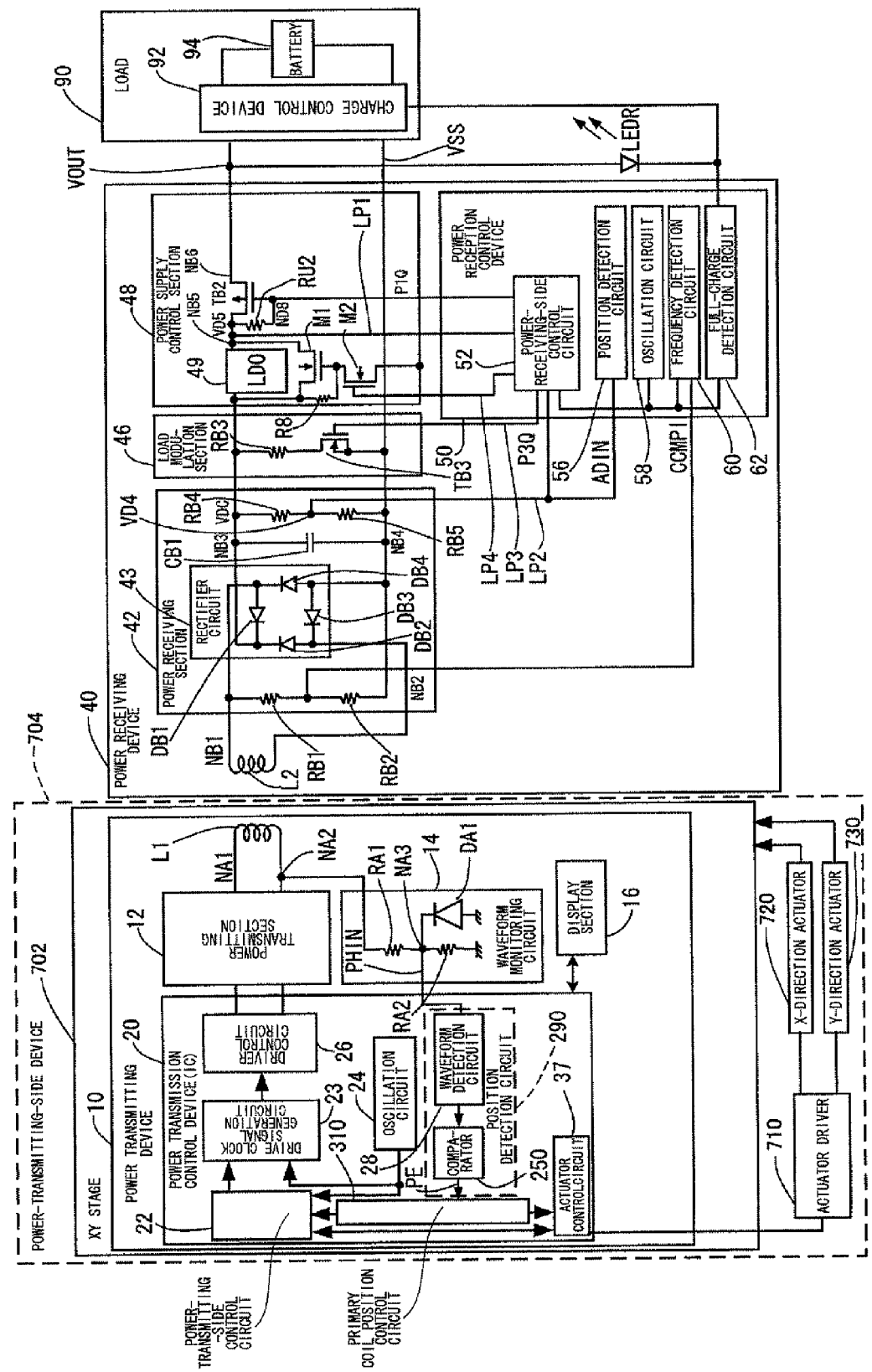
FIG. 2 is a circuit diagram showing an example of a specific configuration of each section of a non-contact power transmission system that includes a power transmitting device and a power receiving device.

FIG. 2 is a circuit diagram showing an example of a specific configuration of each section of a non-contact power transmission system that includes a power transmitting device and a power receiving device.

Configuration and Operation of Power Transmitting Device

As shown in FIG. 2, the power-transmitting-side device (primary-side structure) includes the XY stage (movable stage) 702, the power transmitting device 10 that can be moved by the XY stage 702 in an X-axis direction and a Y-axis direction, an actuator driver 710, an X-direction actuator 720, and a Y-direction actuator 730. Specifically, the power transmitting device 10 is placed on a top plate (movable plate) of the XY stage 702 (described later with reference to FIG. 28).

The power transmitting device 10 includes a power transmission control device 20, a power transmitting section 12, and a waveform monitoring circuit 14. The power transmission control device 20 includes a power-transmitting-side control circuit 22, a drive clock signal generation circuit 23, an oscillation circuit 24, a comparator 250, a driver control circuit 26, an actuator control circuit 37, a waveform detection circuit (peak-hold circuit or pulse width detection circuit) 28, and a primary coil position control circuit 310.

The waveform detection circuit 28 and the comparator 250 function as a position detection circuit 290 that generates a relative position signal indicating the relative positional relationship between the primary coil L1 and the secondary coil L2. The power receiving device 40 includes a power receiving section 40, a load modulation section 46, and a power supply control section 48. A load 90 includes a charge control device 92 and a battery (secondary battery) 94.

The configuration shown in FIG. 2 implements a non-contact power transmission (contactless power transmission) system that electromagnetically couples the primary coil L1 and the secondary coil L2 to transmit power from the power transmitting device 10 to the power receiving device 40 and supply power (voltage VOUT) to the load 90 from a voltage output node NB6 of the power receiving device 40.

The power transmitting device 10 (power transmitting module or primary module) may include the primary coil L1, the power transmitting section 12, the waveform monitoring circuit 14, a display section 16, and the power transmission control device 20. The power transmitting device 10 and the power transmission control device 20 are not limited to the configuration shown in FIG. 2. Various modifications may be made such as omitting some of the elements (e.g., display section and waveform monitoring circuit), adding other elements, or changing the connection relationship.

The power transmitting section 12 generates an alternating-current voltage having a given frequency during power transmission, and generates an alternating-current voltage having a frequency that differs depending on data during data transfer. The power transmitting section 12 supplies the generated alternating-current voltage to the primary coil L1.

Figure 3A:
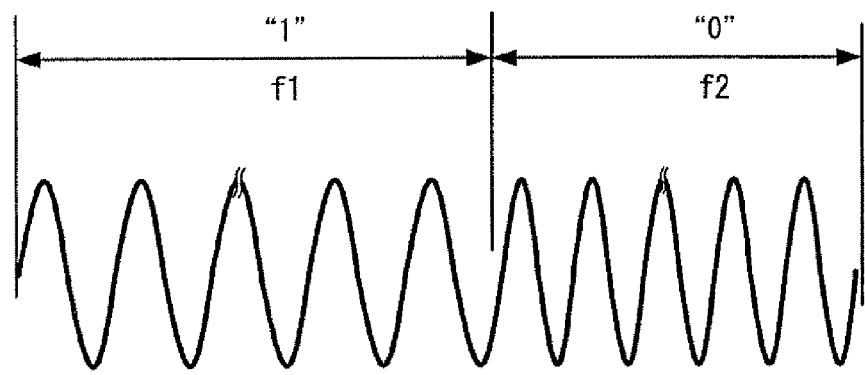
FIGS. 3A and 3B are views illustrative of the principle of information transmission between a primary-side instrument and a secondary-side instrument.
Figure 3B:
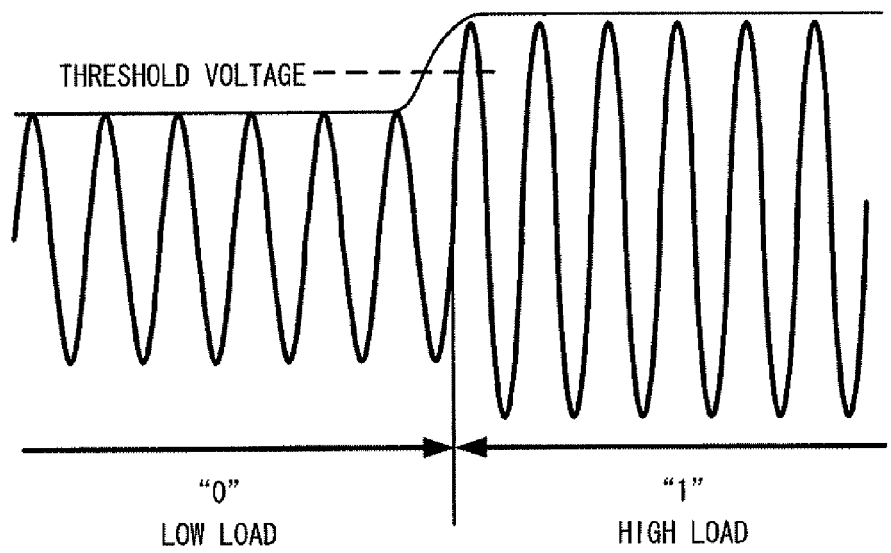

FIGS. 3A and 3B are views illustrative of the principle of information transmission between a primary-side instrument and a secondary-side instrument. Information is transmitted from the primary-side instrument to the secondary-side instrument utilizing frequency modulation. Information is transmitted from the secondary-side instrument to the primary-side instrument utilizing load modulation.

As shown in FIG. 3A, the power transmitting device 10 generates an alternating-current voltage having a frequency f1 when transmitting data "1" to the power receiving device 40, and generates an alternating-current voltage having a frequency f2 when transmitting data "0" to the power receiving device 40, for example.

As shown in FIG. 3B, the power receiving device 40 can switch the load state between a low-load state and a high-load state by load modulation to transmit data "0" or "1" to the primary-side instrument (power transmitting device 10).

The power transmitting section 12 shown in FIG. 2 may include a first power transmitting driver that drives one end of the primary coil L1, a second power transmitting driver that drives the other end of the primary coil L1, and at least one capacitor that forms a resonant circuit with the primary coil L1. Each of the first and second power transmitting drivers included in the power transmitting section 12 is an inverter circuit (or buffer circuit) that includes a power MOS transistor, for example, and is controlled by the driver control circuit 26 of the power transmission control device 20.

As shown in FIG. 1, the portable telephone 510 is placed on the flat plate 600 so that a magnetic flux of the primary coil L1 passes through the secondary coil L2.

When power transmission is unnecessary, the flat plate 600 and the portable telephone 510 are physically separated so that a magnetic flux of the primary coil L1 does not pass through the secondary coil L2.

As the primary coil L1 and the secondary coil L2, a planar coil formed by spirally winding an insulated wire in a single plane may be used, for example. Note that a planar coil formed by spirally winding a twisted wire (i.e., a wire obtained by twisting a plurality of insulated thin wires) may also be used. The type of coil is not particularly limited.

The waveform monitoring circuit 14 is a circuit that detects an induced voltage in the primary coil L1. The waveform monitoring circuit 14 may include resistors RA1 and RA2, and a diode DA1 provided between a common connection point NA3 of the resistors RA1 and RA2 and a power supply GND (low-potential-side power supply in a broad sense), for example. Specifically, a signal PHIN obtained by dividing the induced voltage in the primary coil L1 using the resistors RA1 and RA2 is input to the waveform detection circuit 28 of the power transmission control device 20.

The display section 16 displays the state (e.g., power transmission or ID authentication) of the non-contact power transmission system using a color, an image, or the like. The display section 16 is implemented by a light-emitting diode (LED), a liquid crystal display (LCD), or the like.

The power transmission control device 20 controls the power transmitting device 10. The power transmission control device 20 may be implemented by an integrated circuit device (IC) or the like. The power transmission control device 20 includes the power-transmitting-side control circuit 22, the drive clock signal generation circuit 23, the oscillation circuit 24, the driver control circuit 26, the waveform detection circuit 28, the comparator 250, the primary coil position control circuit 310, and the actuator control circuit 37.

The power-transmitting-side control circuit 22 controls the power transmitting device 10 and the power transmission control device 20. The power-transmitting-side control circuit 22 may be implemented by a gate array, a microcomputer, or the like.

Specifically, the power-transmitting-side control circuit 22 performs sequence control and a determination process necessary for power transmission, load detection, frequency modulation, foreign object detection, removal (detachment) detection, and the like.

The oscillation circuit 24 includes a crystal oscillation circuit or the like, and generates a primary-side clock signal. The drive clock signal generation circuit 23 generates a drive control signal having a desired frequency based on a clock signal generated by the oscillation circuit 24 and a frequency setting signal supplied from the power-transmitting-side control circuit 22.

The driver control circuit 26 outputs the drive control signal to the power transmitting drivers (not shown) of the power transmitting section 12 while preventing a situation in which the power transmitting drivers (not shown) included in the power transmitting section 12 are turned ON simultaneously to control the operations of the power transmitting drivers, for example.

The waveform detection circuit 28 monitors the waveform of the signal PHIN that corresponds to an induced voltage at one end of the primary coil L1, and performs load detection, foreign object detection, and the like. For example, when the load modulation section 46 of the power receiving device 40 has performed load modulation for transmitting data to the power transmitting device 10, the signal waveform of the induced voltage in the primary coil L1 changes correspondingly.

As shown in FIG. 3B, the amplitude (peak voltage) of the signal waveform decreases when the load modulation section 46 of the power receiving device 40 reduces the load in order to transmit data "0", and increases when the load modulation section 46 increases the load in order to transmit data "1". Therefore, the waveform detection circuit 28 can determine whether the data transmitted from the power receiving device 40 is "0" or "1" by determining whether or not the peak voltage has exceeded a threshold voltage by performing a peak-hold process on the signal waveform of the induced voltage, for example. Note that the waveform detection method is not limited to the above-described method. For example, the waveform detection circuit 28 may determine whether the power-receiving-side load has increased or decreased utilizing a physical quantity other than the peak voltage. For example, whether the power-receiving-side load has increased or decreased may be determined utilizing the peak current.

As the waveform detection circuit 28, a peak-hold circuit (or a pulse width detection circuit that detects the pulse width determined by the phase difference between a voltage and a current) may be used. A relative position signal PE that indicates the relative positional relationship between the primary coil L1 and the secondary coil L2 is obtained by comparing the level of an output signal from the waveform detection circuit 28 with a given threshold value using the comparator 250 (described later with reference to FIG. 4).

Configuration and Operation of Power Receiving Device

The power receiving device 40 (power receiving module or secondary module) may include the secondary coil L2, the power receiving section 42, the load modulation section 46, the power supply control section 48, and a power reception control device 50. Note that the power receiving device 40 and the power reception control device 50 are not limited to the configuration shown in FIG. 2. Various modifications may be made such as omitting some of the elements, adding other elements, or changing the connection relationship.

The power receiving section 42 converts an alternating-current induced voltage in the secondary coil L2 into a direct-current voltage. A rectifier circuit 43 included in the power receiving section 42 converts the alternating-current induced voltage. The rectifier circuit 43 includes diodes DB1 to DB4. The diode DB1 is provided between a node NB1 at one end of the secondary coil L2 and a node NB3 (direct-current voltage VDC generation node). The diode DB2 is provided between the node NB3 and a node NB2 at the other end of the secondary coil L2. The diode DB3 is provided between the node NB2 and a node NB4 (VSS). The diode DB4 is provided between the nodes NB4 and NB1.

Resistors RB1 and RB2 of the power receiving section 42 are provided between the nodes NB1 and NB4. A signal CCMPI obtained by dividing the voltage between the nodes NB1 and NB4 using the resistors RB1 and RB2 is input to a frequency detection circuit 60 of the power reception control device 50.

A capacitor CB1 and resistors RB4 and RB5 of the power receiving section 42 are provided between the node NB3 (direct-current voltage VDC) and the node NB4 (VSS). A divided voltage D4 obtained by dividing the voltage between the nodes NB3 and NB4 using the resistors RB4 and RB5 is input to a power-receiving-side control circuit 52 and a position detection circuit 56 through a signal line LP2. The divided voltage VD4 is input to the position detection circuit 56 as a position detection signal input (ADIN).

The load modulation section 46 performs a load modulation process. Specifically, when the power receiving device 40 transmits desired data to the power transmitting device 10, the load modulation section 46 variably changes the load of the load modulation section 46 (secondary side) depending on the transmission target data to change the signal waveform of the induced voltage in the primary coil L1. The load modulation section 46 includes a resistor RB3 and a transistor TB3 (N-type CMOS transistor) provided in series between the nodes NB3 and NB4.

The transistor TB3 is ON/OFF-controlled based on a control signal P3Q supplied from the power-receiving-side control circuit 52 of the power reception control device 50 through a signal line LP3. When performing the load modulation process by ON/OFF-controlling the transistor TB3 and transmitting a signal to the power transmitting device in an authentication stage before main power transmission starts, a transistor TB2 of the power supply control section 48 is turned OFF so that the load 90 is not electrically connected to the power receiving device 40.

For example, when reducing the secondary-side load (high impedance) in order to transmit data "0", the signal P3Q is set at the L level so that the transistor TB3 is turned OFF. As a result, the load of the load modulation section 46 becomes almost infinite (no load). On the other hand, when increasing the secondary-side load (low impedance) in order to transmit data "1", the signal P3Q is set at the H level so that the transistor TB3 is turned ON. As a result, the load of the load modulation section 46 is equivalent to the resistor RB3 (high load).

The power supply control section 48 controls power supply to the load 90. A regulator (LDO) 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

A switch circuit formed using a PMOS transistor (M1) is provided between the input terminal and the output terminal of the regulator (LDO) 49. A path that bypasses the regulator (LDO) 49 is formed by causing the PMOS transistor (M1) (switch circuit) to be turned ON. For example, since a power loss increases due to the equivalent impedance of the regulator 49 and heat generation increases under heavy load (e.g., when it is necessary to cause an almost constant large current to steadily flow in the initial stage of charging a secondary battery exhausted to a large extent), a current is supplied to the load through a path that bypasses the regulator.

An NMOS transistor (M2) and a pull-up resistor R8 that function as a bypass control circuit are provided to ON/OFF-control the PMOS transistor (M1) (switch circuit).

The NMOS transistor (M2) is turned ON when a high-level control signal is supplied to the gate of the NMOS transistor (M2) through a signal line LP4. This causes the gate of the PMOS transistor (M1) to be set at a low level so that the PMOS transistor (M1) is turned ON, whereby a path that bypasses the regulator (LDO) 49 is formed. When the NMOS transistor (M2) is turned OFF, the gate of the PMOS transistor (M1) is maintained at a high level through the pull-up resistor R8. Therefore, the PMOS transistor (M1) is turned OFF so that the bypass path is not formed.

The NMOS transistor (M2) is ON/OFF-controlled by the power-receiving-side control circuit 52 included in the power reception control device 50.

The transistor TB2 (P-type CMOS transistor) is provided between a power supply voltage (VD5) generation node NB5 (output node of the regulator 49) and the node NB6 (voltage output node of the power receiving device 40), and is controlled based on a signal P1Q output from the power-receiving-side control circuit 52 of the power reception control device 50. Specifically, the transistor TB2 is turned ON when main power transmission is performed after completion (establishment) of ID authentication.

The power reception control device 50 controls the power receiving device 40. The power reception control device 50 may be implemented by an integrated circuit device (IC) or the like. The power reception control device 50 may operate based on the power supply voltage VD5 generated based on the induced voltage in the secondary coil L2. The power reception control device 50 may include the (power-receiving-side) control circuit 52, the position detection circuit 56, an oscillation circuit 58, the frequency detection circuit 60, and a full-charge detection circuit 62.

The power-receiving-side control circuit 52 controls the power receiving device 40 and the power reception control device 50. The power-receiving-side control circuit 52 may be implemented by a gate array, a microcomputer, or the like. The power-receiving-side control circuit 52 operates based on a constant voltage (VD5) at the output terminal of the series regulator (LDO) 49 as a power supply voltage. The power supply voltage (VD5) is supplied to the power-receiving-side control circuit 52 through a power supply line LP1.

The power-receiving-side control circuit 52 performs sequence control and a determination process necessary for ID authentication, position detection, frequency detection, full-charge detection, load modulation for authentication communication, load modulation for communication that enables detection of foreign object insertion, and the like.

The position detection circuit 56 monitors the waveform of the signal ADIN that corresponds to the waveform of the induced voltage in the secondary coil L2, and determines whether or not the positional relationship between the primary coil L1 and the secondary coil L2 is appropriate.

Specifically, the position detection circuit 56 converts the signal ADIN into a binary value using a comparator, and determines whether or not the positional relationship between the primary coil L1 and the secondary coil L2 is appropriate.

The oscillation circuit 58 includes a CR oscillation circuit or the like, and generates a secondary-side clock signal. The frequency detection circuit 60 detects the frequency (f1 or f2) of the signal CCMPI, and determines whether the data transmitted from the power transmitting device 10 is "1" or "0".

The full-charge detection circuit 62 (charge detection circuit) detects whether or not the battery 94 of the load 90 has been fully charged (charge state). Specifically, the full-charge detection circuit 62 detects the full-charge state by detecting whether a light-emitting device (LEDR) used to indicate the charge state is turned ON or OFF, for example. The full-charge detection circuit 62 determines that the battery 94 has been fully charged (charging has been completed) when the light-emitting device (LEDR) has been turned OFF for a given period of time (e.g., five seconds).

The charge control device 92 of the load 90 can also detect the full-charge state based on the ON/OFF state of the light-emitting device (LEDR).

The load 90 includes the charge control device 92 that controls charging of the battery 94 and the like. The charge control device 92 detects the full-charge state based on the ON/OFF state of the light-emitting device (LEDR). The charge control device 92 (charge control IC) may be implemented by an integrated circuit device or the like. The battery 94 may be provided with the function of the charge control device 92 (e.g., smart battery). Note that the actual load 90 is not limited to a secondary battery. For example, a given circuit may serve as an actual load when the circuit operates.

Secondary-Side Instrument Approach Detection and Coil Positioning

Figure 4:
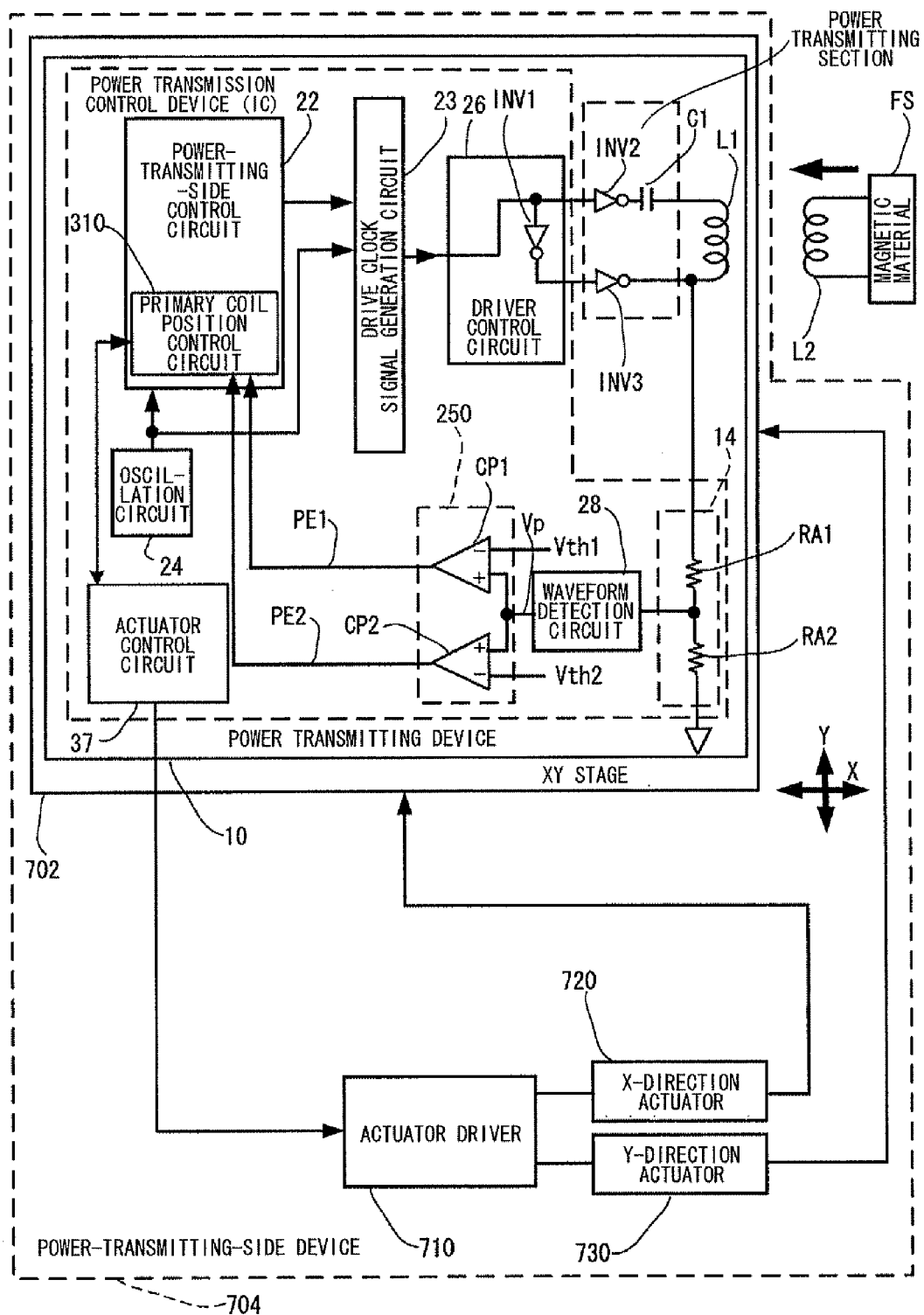
FIG. 4 is a view illustrative of secondary-side instrument approach detection and automatic coil positioning.

FIG. 4 is a view illustrative of secondary-side instrument approach detection and automatic coil positioning. FIG. 4 shows the internal configuration of the power transmitting device 10 shown in the FIG. 2 in detail.

In FIG. 4, the primary coil position control circuit 310 is provided in the power-transmitting-side control circuit 22. In this example, the waveform detection circuit 28 is a peak-hold circuit. The waveform detection circuit 28 outputs a peak voltage Vp of the coil end voltage.

The comparator 250 includes a first comparator CP1 and a second comparator CP2. The first comparator CP1 compares the coil-end peak voltage Vp with a first threshold voltage Vth1, and generates a first relative position signal PE1 corresponding to the comparison result. Likewise, the second comparator CP2 compares the coil-end peak voltage Vp with a second threshold voltage Vth2, and generates a second relative position signal PE2 corresponding to the comparison result.

The primary coil position control circuit 310 detects the approach of the secondary-side instrument (secondary coil L2) based on the relative position signals (PE1 and PE2), and moves the position of the primary coil L1 in the XY plane using the relative position signals (PE1 and PE2) as indices to achieve an automatic coil position adjustment.

Coil Relative Position Detection Principle

The coil relative position detection principle is described below with reference to FIGS. 5 to 11.

FIGS. 5A to 5F are views illustrative of an increase in inductance that occurs when a magnetic material attached to the secondary coil has approached the primary coil.

The term "inductance" used herein refers to an inductance (more accurately an apparent inductance) that changes due to the approach of the secondary coil provided with a magnetic material, as described above. The term "apparent inductance" is distinguished from the inductance (self-inductance) of the primary coil (i.e., the inductance of the primary coil when the primary coil is not affected by the secondary coil). In the following description, the apparent inductance is indicated by Lps.

Figure 5A:
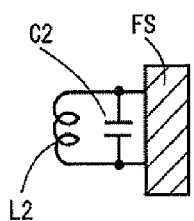
FIGS. 5A to 5F are views illustrative of an increase in inductance that occurs when a magnetic material attached to a secondary coil has approached a primary coil.
Figure 5B:
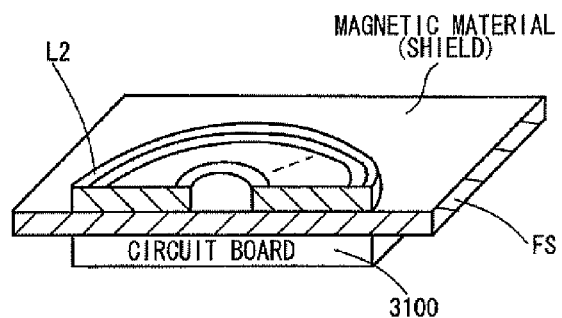

As shown in FIG. 5A, a magnetic material (FS) is attached to the secondary coil L2. As shown in FIG. 5B, the magnetic material (FS) is a magnetic material used as a magnetic shielding material provided between the secondary coil L2 (i.e., planar coil) and a circuit board 3100, for example. Note that the magnetic material (FS) is not limited thereto, but may be a magnetic material used as a core of the secondary coil L2.

Figure 5C:
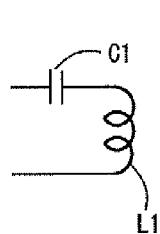
Figure 5D:
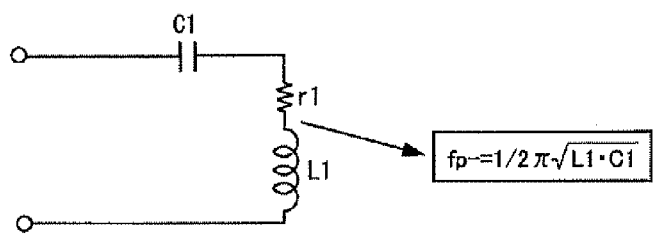
Figure 5F:
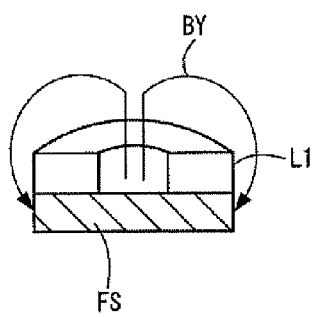

FIG. 5D shows an equivalent circuit of the primary coil L1 shown in FIG. 5C. The resonance frequency of the primary coil L1 is fp. Specifically, the resonance frequency is determined by the primary coil L1 and the capacitor C1.

Figure 5E:
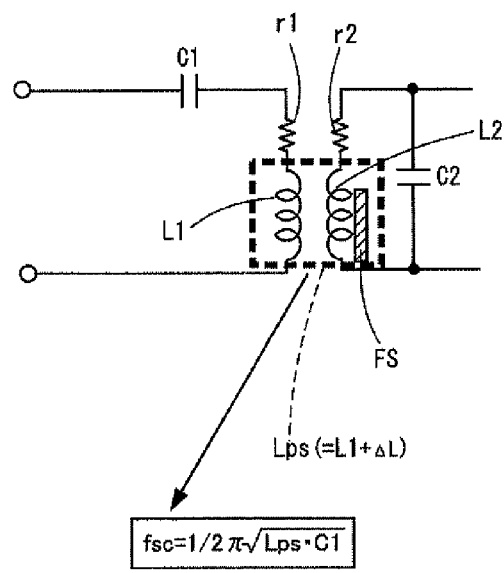

As shown in FIG. 5E, when the secondary coil L2 has approached the primary coil L1, the magnetic material (FS) attached to the secondary coil L1 is coupled to the primary coil L1. Therefore, the magnetic flux of the primary coil (L1) passes through the magnetic material (FS) (see FIG. 5F) so that the magnetic flux density increases. As a result, the inductance of the primary coil L1 increases.

In this case, the resonance frequency of the primary coil L1 is fsc, as shown in FIG. 5E. Specifically, the resonance frequency is determined by the apparent inductance Lps (i.e., the apparent inductance of the primary coil for which the approach of the secondary coil is taken into consideration) and the primary-side resonant capacitor C1. The apparent inductance Lps of the primary coil is expressed by Lps=L1+ΔL (where, L1 is the inductance (self-inductance) of the primary coil, and ΔL is an increase in inductance due to the approach of the magnetic material FS to the primary coil). A specific value of the apparent inductance Lps may be acquired by measuring the inductance of the primary coil when the secondary coil has approached the primary coil using a measuring instrument, for example.

A change in the inductance of the primary coil due to the approach of the secondary coil is discussed below.

FIGS. 6A to 6D are views showing examples of the relative positional relationship between the primary coil and the secondary coil. In FIGS. 6A to 6D), PA1 indicates the center of the primary coil L1, and PA2 indicates the center of the secondary coil L2.

In FIG. 6A, since the secondary coil L2 is positioned away from the primary coil L1, the primary coil L1 is not affected by the secondary coil L2. When the secondary coil (L2) has approached the primary coil (L1), as shown in FIG. 6B, the inductance of the primary coil L1 increases, as described with reference to FIGS. 5E and 5F.

In FIG. 6C, mutual induction (i.e., an effect that cancels a magnetic flux of one coil by a magnetic flux of the other coil) occurs due to coupling of the primary coil (L1) and the secondary coil (L2) in addition to self-induction.

When the position of the secondary coil (L2) has coincided with the position of the primary coil (L1) (see FIG. 6D), a current flows through the secondary coil (L2). As a result, a leakage magnetic flux decreases due to cancellation of the magnetic flux as a result of mutual induction so that the inductance of the coil decreases. Specifically, the primary coil and the secondary coil have been positioned. The secondary-side instrument then starts to operate. A current flows through the secondary coil (L2) due to the operation of the secondary-side instrument so that a leakage magnetic flux decreases due to cancellation of the magnetic flux as a result of mutual induction, whereby the inductance of the primary coil (L1) decreases.

FIG. 7 is a view showing the relationship between the relative distance between the primary coil and the secondary coil and the inductance of the primary coil. In FIG. 7, the horizontal axis indicates the relative distance, and the vertical axis indicates the inductance. The term "relative distance" used herein refers to a relative value obtained by normalizing the distance between the centers of the two coils in the horizontal direction. The relative distance is an index that indicates the distance between the coils in the horizontal direction. An absolute distance (e.g., an absolute value (mm) that indicates the distance between the centers of the coils in the horizontal direction) may be used instead of the relative distance. In FIG. 7, when the relative distance is d1, the primary coil L1 is not affected by the secondary coil. In this case, the inductance of the primary coil L1 is "a" (i.e., the self-inductance of the primary coil). When the secondary coil L2 has approached the primary coil L1 (relative distance: d2), the magnetic flux density increases due to the magnetic material so that the inductance of the primary coil L1 increases to "b".

When the secondary coil L2 has further approached the primary coil L1 (relative distance: d3), the inductance of the primary coil L1 increases to "c". When the secondary coil L2 has further approached the primary coil L1 (relative distance: d4), the inductance of the primary coil L1 increases to "d". The primary coil L1 and the secondary coil L2 are coupled in this state so that the effect of mutual inductance becomes predominant.

Specifically, when the relative distance is d5, since the effect of mutual inductance becomes predominant, the inductance of the primary coil L1 then decreases to "e". When the relative distance is 0 (i.e., the centers of the primary coil and the secondary coil are positioned at the center of the XY plane), a leakage magnetic flux is minimized due to cancellation of the magnetic flux so that the inductance of the primary coil L1 converges to a constant value ("center inductance" in FIG. 7).

The relative distance d2 indicates a power transmission limit range. Desired power transmission can be performed when the relative distance is between d3 and d4 (the range specified by d3 and d4 is a position allowable range LQ). In this case, it is possible to detect that the secondary coil (L2) has approached the primary coil L1 up to the relative distance d2 using an inductance threshold value (INth1). Likewise, whether or not the secondary coil (L2) is positioned within the relative distance range between d2 and d4 can be detected using an inductance threshold value (INth2).

Specifically, whether or not the relative distance between the primary coil and the secondary coil is within the position allowable range (LQ) can be determined by checking an increase in the inductance of the primary coil (In this case, the relative distance cannot be determined when the relative distance is shorter. However, determination at this level is sufficient for practical use as an index of power transmission positioning).

For example, when an increase in inductance due to the approach of the secondary coil (L2) has been detected using the first inductance threshold value (INth1), the secondary coil L2 has approached the primary coil L1 to such an extent that the relative distance is almost within the power transmission range.

The primary coil is then moved (scanned) according to a given scan pattern. When the relative distance between the primary coil (L1) and the secondary coil (L2) has been further reduced due to the movement of the primary coil L1, the inductance of the primary coil L1 increases and then reaches the point c shown in FIG. 7. When it has been detected that the inductance of the primary coil L1 has reached the point c using the second inductance threshold value (INth2), the movement (scan) of the primary coil is stopped. This causes the relative distance between the primary coil (L1) and the secondary coil (L2) to be almost within the range (position allowable range LQ) between d3 and d5, although the relative distance is affected by the damping accuracy of the XY stage used.

The relative positional relationship between the primary coil L1 and the secondary coil L2 is actually determined using the voltage threshold values (Vth1 and Vth2) corresponding to the inductance threshold values (INth1 and INth2). The details are described below.

FIG. 8 is a view showing a change in the resonance frequency of the resonant circuit including the primary coil due to an increase in inductance. When the inductance of the primary coil has increased due to the approach of the magnetic material (FS) attached to the secondary coil L2, the resonance characteristics of the resonant circuit including the primary coil change from Q1 to Q2, as shown in FIG. 8.

When the drive frequency of the primary coil is fd, the coil end voltage (or current) decreases by ΔA due to the shift in the resonance characteristics caused by an increase in the inductance of the primary coil L1. The relative position between the primary coil L1 and the secondary coil L2 can be determined based on the coil end voltage (or coil current) by focusing on the change in the coil end voltage (or current) by ΔA.

FIGS. 9A to 9C are views showing examples of a change in the relative positional relationship between the primary coil and the secondary coil. FIG. 10 is a view illustrative of a method of automatically adjusting the positional relationship between the primary coil and the secondary coil.

The power transmission control device 20 (see FIG. 2) intermittently drives the primary coil L1 at a frequency fd in a given cycle, as indicated by periods T1 and T2 shown in FIG. 10. The power transmission control device 20 monitors the coil end voltage Vf (or coil current), as shown in FIG. 9. When the secondary coil L2 has not approached the primary coil L1 (see FIG. 9A), the amplitude Vf of the coil end voltage (alternating-current) is larger than the first threshold voltage Vth1, as indicated by the periods T1 and T2 shown in FIG. 10.

The coil end voltage Vf is lower than the first voltage threshold value Vth1 during drive from a time t4 shown in FIG. 10. This enables the power transmission control device 20 to detect that the secondary coil L2 has approached.

In this case, the power transmission control device 20 must continuously monitor a change in the coil end voltage Vf while scanning the primary coil (L1) to search for the relative positional relationship between the primary coil L1 and the secondary coil L2. Therefore, the power transmission control device 20 switches power transmission from intermittent power transmission to continuous power transmission after the time t4. Continuous power transmission is performed during a period T3 in which the primary coil L1 is moved (scanned).

When the distance between the primary coil L1 and the secondary coil L2 has been reduced due to the movement of the primary coil L1 so that the relative distance between the primary coil and the secondary coil is within the position allowable range LQ (see FIG. 7), the coil end voltage Vf is lower than the second voltage threshold value Vth2. Therefore, the movement (scan) of the primary coil L1 is stopped, and continuous drive of the primary coil L1 is also stopped. The approach of the secondary coil L2 (magnetic material FS) is thus automatically detected while automatically adjusting the position of the primary coil L1.

Specifically, an operation shown in FIGS. 11A and 11B is performed. FIGS. 11A and 11B are views showing a specific circuit operation for automatically adjusting the positional relationship between the primary coil and the secondary coil.

As shown in FIG. 11A, the coil end voltage Vf is divided by the resistors RA1 and RA2 included in the waveform monitoring circuit 14, and the peak voltage Vp is detected by the peak-hold circuit 28. The peak voltage Vp is compared with the first and second voltage threshold values (Vth1 and Vth2) by the first and second comparators CP1 and CP2 included in the comparator 250.

When the output signal (relative position signal) PE1 from the first comparator CP1 has changed from the high level to the low level (time t10 in FIG. 11B), the primary coil position control circuit 310 causes the actuator control circuit 37 to start to move the primary coil (L1), and continuously drives the primary coil instead of intermittently driving the primary coil, as described above.

When the output signal (relative position signal) PE2 from the second comparator CP2 has changed from the high level to the low level (time t11 in FIG. 11B), the primary coil position control circuit 310 causes the actuator control circuit 37 to stop moving the primary coil (L1), and stops driving the primary coil.

Figure 12A:
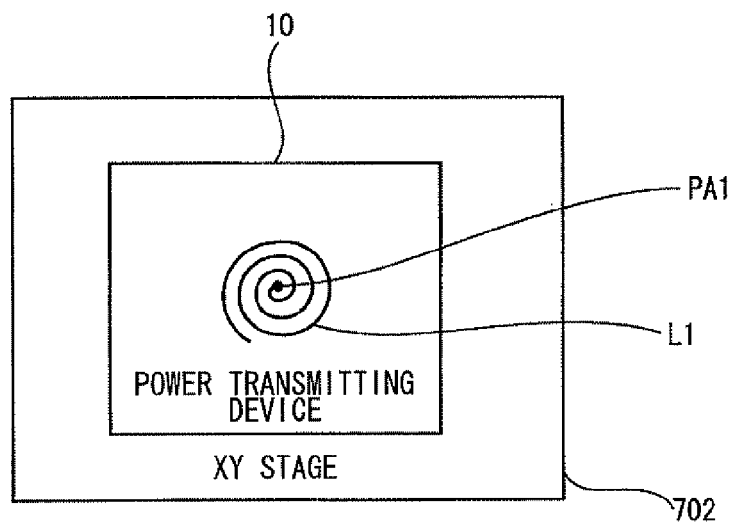
FIGS. 12A and 12B are views illustrative of the movement (scan) of a primary coil.
Figure 12B:
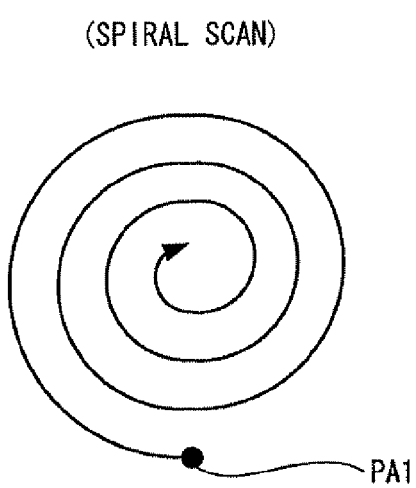

FIGS. 12A and 12B are views illustrative of the movement (scan) of the primary coil. As shown in FIG. 12A, the power transmitting device 10 (power transmitting module) includes the primary coil L1. When moving the position of the primary coil L1, the XY stage 702 is moved in the direction X or the direction Y using the actuator. In FIG. 12A, PA1 indicates the center of the primary coil L1.

As shown in FIG. 12B, the primary coil L1 is scanned for a position adjustment in a spiral pattern, for example. The position of the primary coil can be accurately moved over a wide range by utilizing a spiral scan (note that the scan pattern is not limited thereto).

Figure 13:
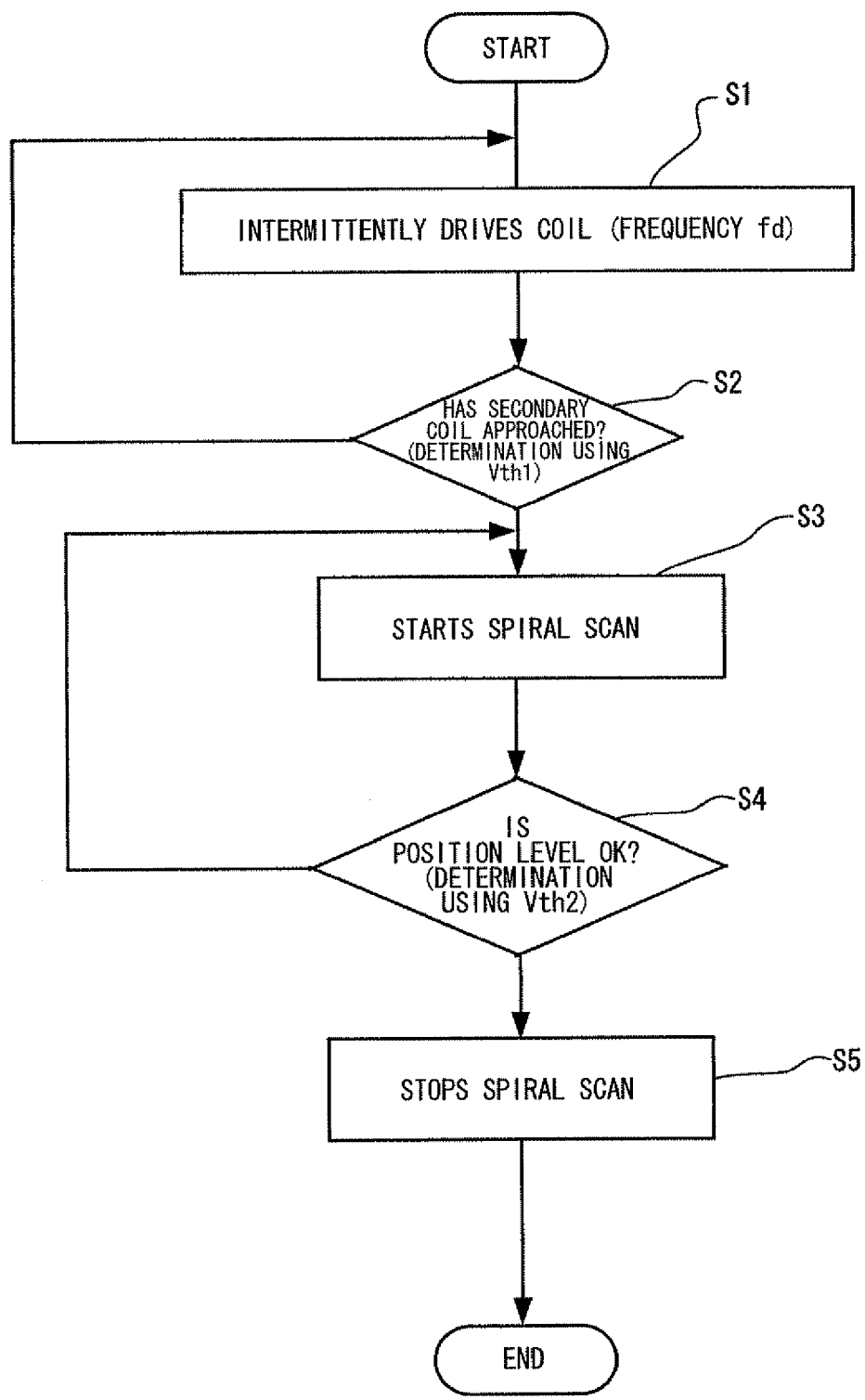
FIG. 13 is a flowchart showing a process of automatically adjusting the position of a primary coil.

FIG. 13 shows a process of automatically adjusting the position of the primary coil as described above. FIG. 13 is a flowchart showing a process of automatically adjusting the position of the primary coil.

As shown in FIG. 13, the primary coil is intermittently driven (frequency fd) in order to detect the approach of the secondary coil (step S1). When the approach of the secondary coil has been detected using the first threshold voltage Vth1 (step S2), the primary coil is driven continuously, and a spiral scan is started (step S3).

When the relative positional relationship between the primary coil and the secondary coil has been determined to be within the allowable range using the second threshold voltage Vth2 (step S4), the continuous drive operation and the spiral scan are stopped (step S5).

Second Embodiment

Figure 14:
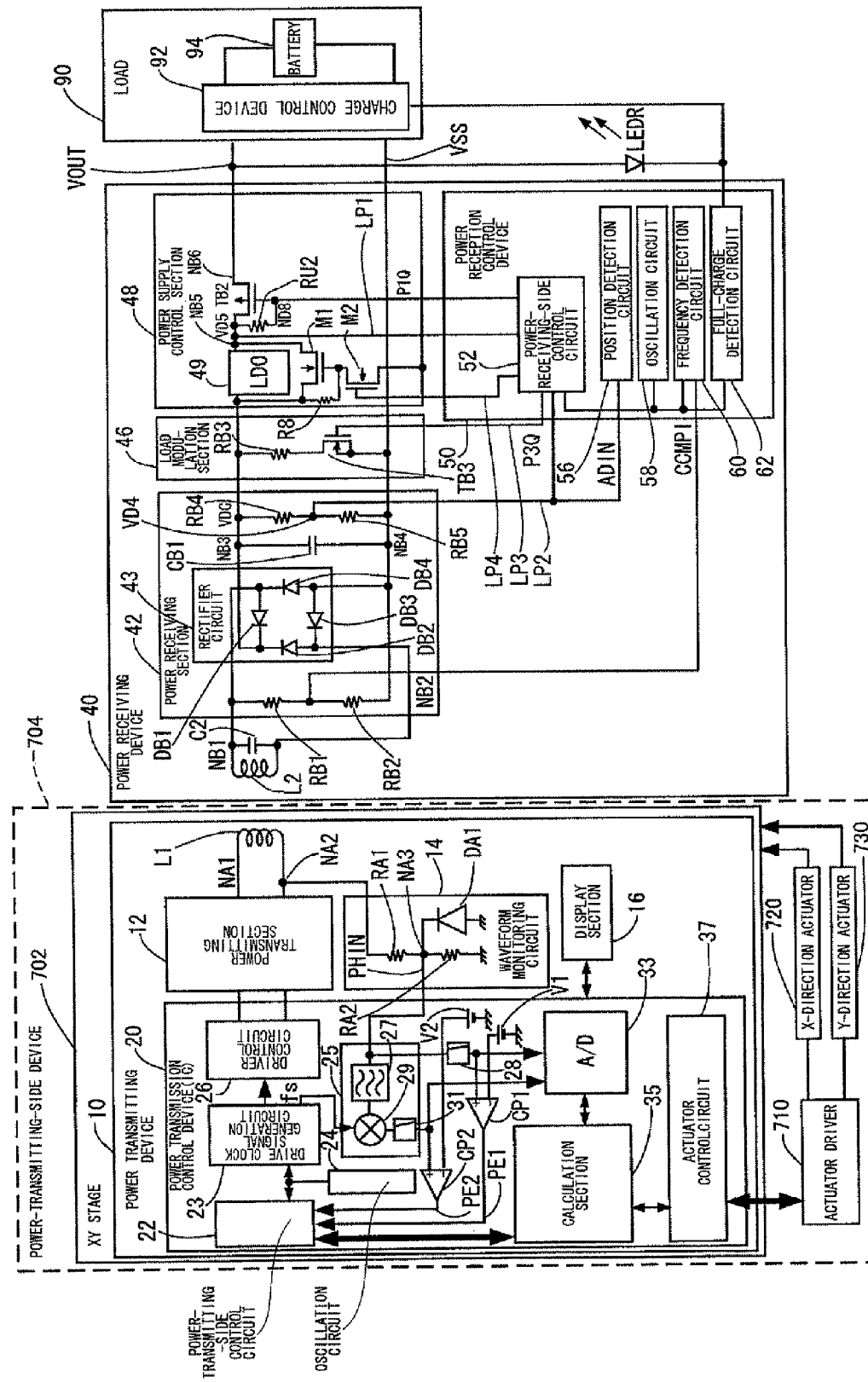
FIG. 14 is a circuit diagram showing another example of a specific configuration of each section of a non-contact power transmission system that includes a power transmitting device and a power receiving device.

FIG. 14 is a circuit diagram showing another example of a specific configuration of each section of a non-contact power transmission system that includes a power transmitting device and a power receiving device.

The basic configuration of the non-contact power transmission system shown in FIG. 14 is similar to that shown in FIG. 2. The non-contact power transmission system shown in FIG. 14 differs from that shown in FIG. 2 in that a power transmission control device 20 includes a harmonic detection circuit 25 that functions as a position detection circuit.

A power transmitting device 10 shown in FIG. 14 includes a power transmission control device 20, a power transmitting section 12, a waveform monitoring circuit 14, and a display section 16 as a notification means. The power transmission control device 20 includes a power-transmitting-side control circuit 22, a drive clock signal generation circuit 23, an oscillation circuit 24, a harmonic detection circuit 25 (including a filter circuit 27, a mixer 29 that adds a harmonic fs, and a detection circuit 31), a driver control circuit 26, a waveform detection circuit (peak-hold circuit or pulse width detection circuit) 28, comparators (CP1 and CP2), and an actuator control circuit 37.

The power transmission control device 20 controls the power transmitting device 10. The power transmission control device 20 may be implemented by an integrated circuit device (IC) or the like. The power transmission control device 20 includes the power-transmitting-side control circuit 22, the drive clock signal generation circuit 23, the oscillation circuit 24, the harmonic detection circuit 25, the driver control circuit 26, the waveform detection circuit (peak-hold circuit or pulse width detection circuit) 28, the comparators CP1 and CP2, and the actuator control circuit 37.

The power-transmitting-side control circuit 22 controls the power transmitting device 10 and the power transmission control device 20. The power-transmitting-side control circuit 22 may be implemented by a gate array, a microcomputer, or the like. Specifically, the power-transmitting-side control circuit 22 performs sequence control and a determination process necessary for power transmission, load detection, frequency modulation, foreign object detection, removal (detachment) detection, and the like.

The oscillation circuit 24 includes a crystal oscillation circuit or the like, and generates a primary-side clock signal. The drive clock signal generation circuit 23 generates a drive control signal having a desired frequency based on a clock signal generated by the oscillation circuit 24 and a frequency setting signal supplied from the power-transmitting-side control circuit 22.

The driver control circuit 26 outputs the drive control signal to the power transmitting drivers (not shown) of the power transmitting section 12 while preventing a situation in which the power transmitting drivers (not shown) are turned ON simultaneously to control the operations of the power transmitting drivers, for example.

The waveform detection circuit 28 monitors the waveform of a signal PHIN that corresponds to an induced voltage at one end of the primary coil L1 in the same manner as in the first embodiment, and performs load detection, foreign object detection, and the like. For example, when the load modulation section 46 of the power receiving device 40 has performed load modulation for transmitting data to the power transmitting device 10, the signal waveform of the induced voltage in the primary coil L1 changes correspondingly. This point has been described above with reference to FIG. 3.

Secondary-Side Instrument Approach Detection and Coil Positioning

Figure 15:
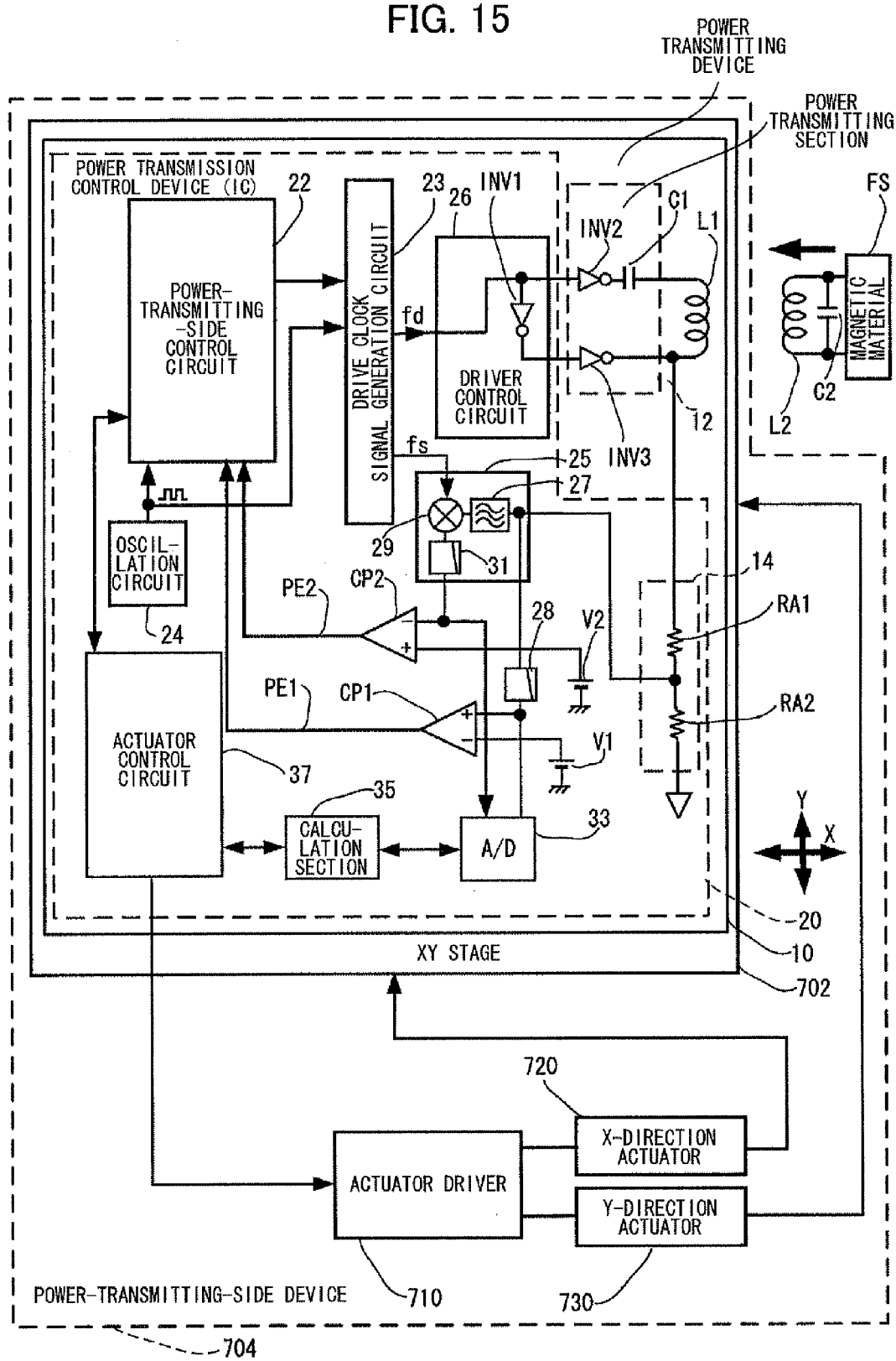
FIG. 15 is a view showing an example of the configuration of a power transmitting device for secondary-side instrument approach detection and automatic coil positioning.

FIG. 15 is a view showing an example of the configuration of the power transmitting device for secondary-side instrument approach detection and automatic coil positioning. FIG. 15 shows the internal configuration of the power transmitting device 10 shown in the FIG. 14 in detail.

In FIG. 15, the waveform detection circuit 28 is a peak-hold circuit. The waveform detection circuit 28 outputs a peak voltage SR of the coil end voltage. The peak voltage SR may be utilized for detecting the approach of the secondary coil L2. The peak voltage SR is compared with a first threshold value (approach detection threshold value) V1 by the comparator CP1. An output signal PE1 from the comparator CP1 is supplied to the power-transmitting-side control circuit 22.

The harmonic detection circuit 25 includes the filter circuit 27 that filters a voltage signal from the waveform monitoring circuit 14, the mixer 29 that adds (mixes) an odd-order harmonic (fifth-order harmonic in this example) fs of the primary coil L1, and the detection circuit 31.

When the resonance frequency of a primary-side series resonant circuit formed by the primary coil L1 and a capacitor C1 is referred to as fp, the drive frequency of the primary coil is generally set at a frequency (fd) away from the resonance frequency (fp) taking operational stability into consideration. When the drive signal of the primary coil is a symmetrical alternating-current signal, the harmonic (fs) of the drive frequency of the primary coil is only an odd-order harmonic. For example, a fifth-order harmonic (fs=5fd) may be used to detect the position of the secondary coil.

The detection output from the harmonic detection circuit 25 is compared with a second threshold value (harmonic resonance peak detection threshold value) V2 by the comparator CP2. An output signal PE2 from the comparator CP2 is supplied to the power-transmitting-side control circuit 22.

The power-transmitting-side control circuit 22 detects the approach of the secondary-side instrument (secondary coil L2) based on the output signal (PE1) from the comparator CP1. The power-transmitting-side control circuit 22 transmits a primary coil (primary-side instrument) scan instruction to the actuator control circuit 37 using the output signal (PE2) from the comparator CP2 as an index.

The actuator control circuit 37 drives the actuator in response to the scan instruction from the power-transmitting-side control circuit 22. Note that the output signal (PE2) from the comparator CP2 may be input to the actuator control circuit 37 so that the actuator is driven based on a determination by the actuator.

As shown in FIG. 15 (upper right), the secondary coil (L2) is provided with a harmonic resonant capacitor C2 and a magnetic material FS. The magnetic material FS is a shield that separates a magnetic flux from a circuit, or may be a core of the secondary coil, for example. The primary-side instrument can detect the approach of the secondary coil due to the presence of the magnetic material FS (described later in detail).

Secondary Coil Approach Detection Principle

The secondary coil approach detection principle is described below with reference to FIGS. 16 to 18. FIGS. 16A to 16F are views illustrative of an increase in inductance that occurs when a magnetic material attached to the secondary coil has approached the primary coil.

The term "inductance" used herein refers to an inductance (more accurately an apparent inductance) that changes due to the approach of the secondary coil provided with a magnetic material, as described above. The term "apparent inductance" is distinguished from the inductance (self-inductance) of the primary coil (i.e., the inductance of the primary coil when the primary coil is not affected by the secondary coil). In the following description, the apparent inductance is indicated by Lps.

Figure 16A:
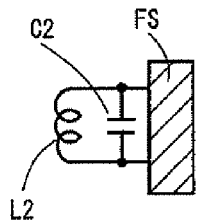
FIGS. 16A to 16F are views illustrative of an increase in inductance that occurs when a magnetic material attached to a secondary coil has approached a primary coil.
Figure 16B:
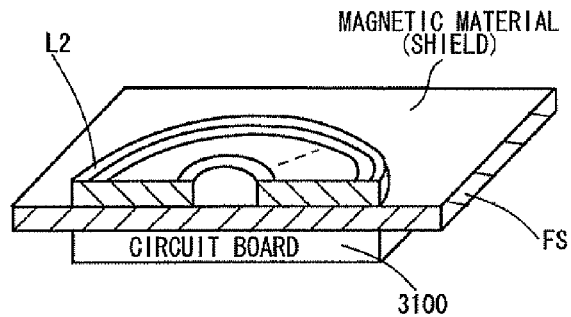

As shown in FIG. 16A, the magnetic material (FS) is attached to the secondary coil L2. As shown in FIG. 16B, the magnetic material (FS) is a magnetic material used as a magnetic shielding material provided between the secondary coil L2 (i.e., planar coil) and a circuit board 3100, for example. Note that the magnetic material (FS) is not limited thereto, but may be a magnetic material used as a core of the secondary coil L2.

Figure 16C:
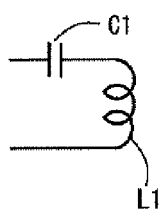
Figure 16D:
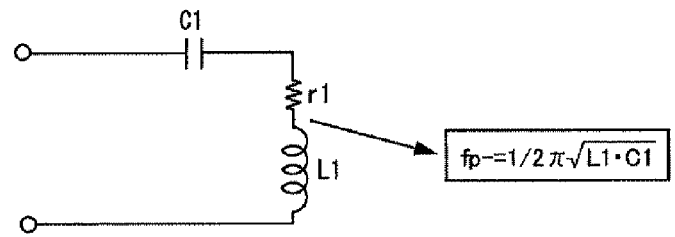
Figure 16F:
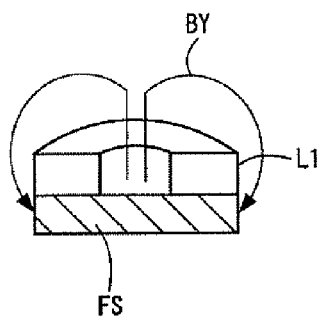
Figure 16E:
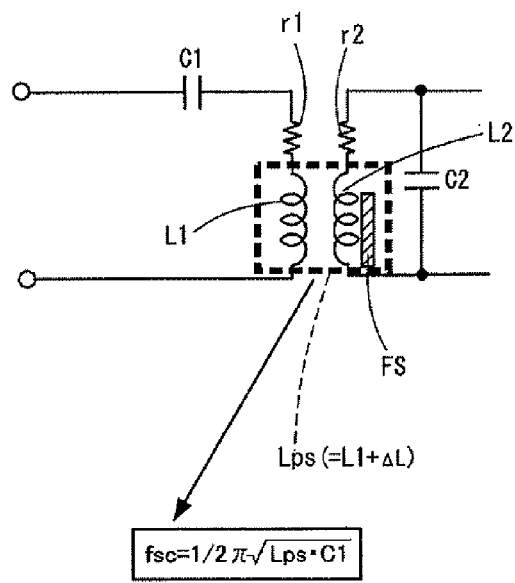

FIG. 16D shows an equivalent circuit of the primary coil L1 shown in FIG. 16C. The resonance frequency of the primary coil L1 is fp. Specifically, the resonance frequency is determined by the primary coil L1 and the capacitor C1. As shown in FIG. 16E, when the secondary coil L2 has approached the primary coil L1, the magnetic material (FS) attached to the secondary coil L1 is coupled to the primary coil L1. Therefore, the magnetic flux of the primary coil (L1) passes through the magnetic material (FS) (see FIG. 16F) so that the magnetic flux density increases. As a result, the inductance of the primary coil L1 increases. In this case, the resonance frequency of the primary coil L1 is fsc, as shown in FIG. 16E.

Specifically, the resonance frequency is determined by the apparent inductance Lps (i.e., the apparent inductance of the primary coil for which the approach of the secondary coil is taken into consideration) and the primary-side capacitor C1. The apparent inductance Lps of the primary coil is expressed by Lps=L1+ΔL (where, L1 is the inductance (self-inductance) of the primary coil, and ΔL is an increase in inductance due to the approach of the magnetic material FS to the primary coil). A specific value of the apparent inductance Lps may be acquired by measuring the inductance of the primary coil when the secondary coil has approached the primary coil using a measuring instrument, for example.

A change in the inductance of the primary coil due to the approach of the secondary coil is discussed below.

In FIG. 17A, since the secondary coil L2 is positioned away from the primary coil L1, the primary coil L1 is not affected by the secondary coil L2. When the secondary coil (L2) has approached the primary coil (L1), as shown in FIG. 17B, the inductance of the primary coil L1 increases. In FIG. 17C, mutual induction (i.e., an effect that cancels a magnetic flux of one coil by a magnetic flux of the other coil) occurs due to coupling of the primary coil (L1) and the secondary coil (L2) in addition to self-induction.

When the position of the secondary coil (L2) has coincided with the position of the primary coil (L1) (see FIG. 17D), a current flows through the secondary coil (L2). As a result, a leakage magnetic flux decreases due to cancellation of the magnetic flux as a result of mutual induction so that the inductance of the coil decreases. Specifically, the primary coil and the secondary coil have been positioned. The secondary-side instrument then starts to operate. A current flows through the secondary coil (L2) due to the operation of the secondary-side instrument so that a leakage magnetic flux decreases due to cancellation of the magnetic flux as a result of mutual induction, whereby the inductance of the primary coil (L1) decreases.

FIG. 18 is a view showing the relationship between the relative distance between the primary coil and the secondary coil and the inductance of the primary coil. In FIG. 18, the horizontal axis indicates the relative distance, and the vertical axis indicates the inductance. The term "relative distance" used herein refers to a relative value obtained by normalizing the distance between the centers of the two coils in the horizontal direction.

The relative distance is an index that indicates the distance between the coils in the horizontal direction. An absolute distance (e.g., an absolute value (mm) that indicates the distance between the centers of the coils in the horizontal direction) may be used instead of the relative distance.

In FIG. 18, when the relative distance is d1, the primary coil L1 is not affected by the secondary coil. In this case, the inductance of the primary coil L1 is "a" (i.e., the self-inductance of the primary coil). When the secondary coil L2 has approached the primary coil L1 (relative distance: d2), the magnetic flux density increases due to the magnetic material so that the inductance of the primary coil L1 increases to "b".

When the secondary coil L2 has further approached the primary coil L1 (relative distance: d3), the inductance of the primary coil L1 increases to "c". When the secondary coil L2 has further approached the primary coil L1 (relative distance: d4), the inductance of the primary coil L1 increases to "d". The primary coil L1 and the secondary coil L2 are coupled in this state so that the effect of mutual inductance becomes predominant.

Specifically, when the relative distance is d5, since the effect of mutual inductance becomes predominant, the inductance of the primary coil L1 then decreases to "e". When the relative distance is zero (i.e., the centers of the primary coil and the secondary coil are positioned at the center of the XY plane), a leakage magnetic flux is minimized due to cancellation of the magnetic flux so that the inductance of the primary coil L1 converges to a constant value ("center inductance" in FIG. 7).

The relative distance d2 is the power transmission limit range. In this case, it is possible to detect that the secondary coil (L2) has approached the primary coil L1 up to the relative distance d2 using an inductance threshold value (INth1). Specifically, when an increase in inductance due to the approach of the secondary coil (L2) has been detected using the first inductance threshold value (INth1), the secondary coil L2 has approached the primary coil L1 to such an extent that the relative distance is almost within the power transmission range.

Note that the approach of the secondary coil is actually determined using a voltage threshold value (first threshold value V1) corresponding to the inductance threshold value (INth1).

In this embodiment, the power transmitting section 12 intermittently (e.g., cyclically) drives the primary coil (L1) in order to automatically detect the approach of the secondary coil (L2). This enables automatic detection of the approach of the secondary coil (secondary-side instrument). Note that the detection method is not limited to the above-described method. A method that detects placement of the secondary-side instrument using a mechanical detection switch may also be employed.

When the approach of the secondary coil (L2) has been detected, a secondary coil position detection operation utilizing harmonic resonance is performed. The details are described below.

Figure 19:
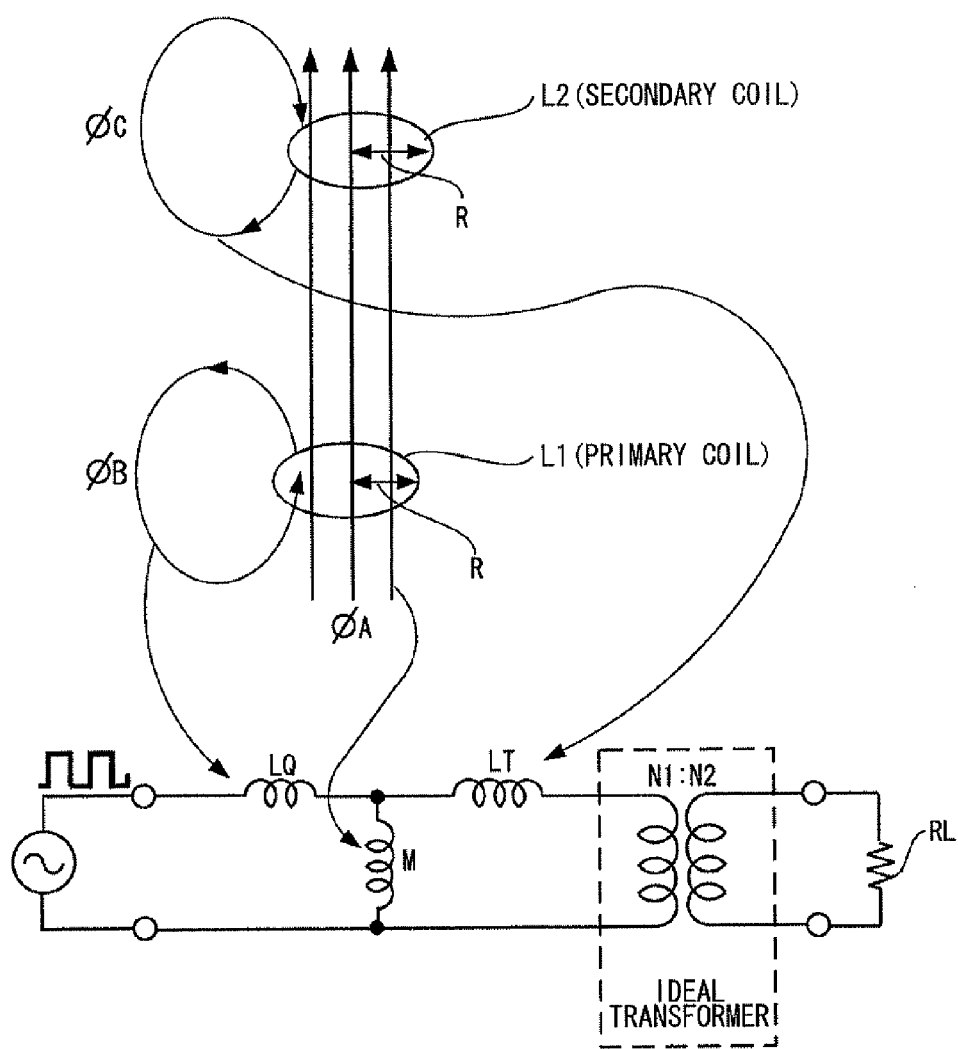
FIG. 19 is a view illustrative of the concept of a leakage inductance in a transformer formed by electromagnetically coupling a primary coil and a secondary coil.

Principle of Detecting Relative Positional Relationship Between Primary Coil and Secondary Coil Utilizing Harmonic Resonance FIG. 19 is a view illustrative of the concept of a leakage inductance in a transformer formed by electromagnetically coupling the primary coil and the secondary coil. The upper part of FIG. 19 shows the state of a magnetic flux between the coils disposed adjacently, and the lower part of FIG. 19 shows an equivalent circuit of the transformer.

In FIG. 19, the primary coil (L1) and the secondary coil (L2) are circular coils having a radius of R. When a magnetic flux φA generated from the primary coil (L1) is interlinked to the secondary coil (L2), a current flows through the secondary coil (L2) due to mutual induction to cancel the magnetic flux of the primary coil (L1) so that the magnetic flux apparently becomes zero. Specifically, the mutual inductance M of the transformer ideally becomes zero.

However, a leakage magnetic flux φB exists in the primary coil (L1), and a leakage magnetic flux φC exists in the secondary coil (L2). A primary-side leakage inductance LQ occurs due to the primary-side leakage magnetic flux φB, and a secondary-side leakage inductance LT occurs due to the secondary-side leakage magnetic flux φC. It is considered that an ideal transformer exists in theory. However, it is not related to the leakage inductance model and may be disregarded.

FIGS. 20A to 20E are views illustrative of the configuration and the operation of a harmonic resonant circuit. As shown in FIG. 20A, the harmonic resonant capacitor C2 is connected to the secondary coil (L2). FIG. 20B show an equivalent circuit of the transformer in this case. The secondary-side load (RL) is not connected before power transmission. Since the mutual inductance is substantially zero, as described above, the mutual inductance can be disregarded.

Since the primary-side leakage inductance (LQ) and the secondary-side leakage inductance (LT) are connected in series, the composite inductance of the primary-side leakage inductance (LQ) and the secondary-side leakage inductance (LT) is (LQ+LT). Therefore, the equivalent circuit of the transformer can be modified as shown in FIG. 20C.

As shown in FIG. 20C, two resonant circuits SY1 and SY2 are formed. The following description focuses only on the resonant circuit SY2 while disregarding the resonant circuit SY1.

FIG. 20D shows odd-order harmonics of the drive frequency (fd) of the drive signal (VD) of the primary coil (L1). The following description focuses on the fifth-order harmonic (5fd) (note that the harmonic is not limited thereto; the third-order harmonic, the seventh-order harmonic, or the like may also be used).

In this embodiment, the capacitance of the capacitor C2 is set so that the resonance frequency fs of the resonant circuit SY2 coincides with the fifth-order harmonic (5fd) of the drive frequency of the primary coil (L1), as indicated by an expression shown in FIG. 20E. Therefore, the resonant circuit SY2 is a harmonic resonant circuit that resonates with the fifth-order harmonic of the drive frequency of the primary coil. Therefore, the equivalent circuit shown in FIG. 20C has resonance characteristics shown in FIG. 20E. The harmonic resonance peak is obtained at a position 5fd on the frequency axis.

As described above, a leakage inductance is an inductance produced by a leakage magnetic flux that does not undergo interlinkage. The amount of leakage magnetic flux differs depending on the relative positional relationship between the primary coil (L1) and the secondary coil (L2).

Therefore, the capacitance of the capacitor C2 of the harmonic resonant circuit SY2 described with reference to FIG. 20 is set talking into account the leakage inductance when the position of the primary coil coincides with the position of the secondary coil, for example. The harmonic resonant circuit SY2 undergoes harmonic resonance when the position of the primary coil coincides with the position of the secondary coil.

For example, when the capacitance of the secondary-side resonant capacitor C2 is set corresponding to the leakage inductance when the primary coil and the secondary coil are positioned at a distance R, the harmonic resonant circuit SY2 undergoes harmonic resonance when the primary coil (L1) and the secondary coil (L2) are positioned at the given distance R.

Figure 21A:
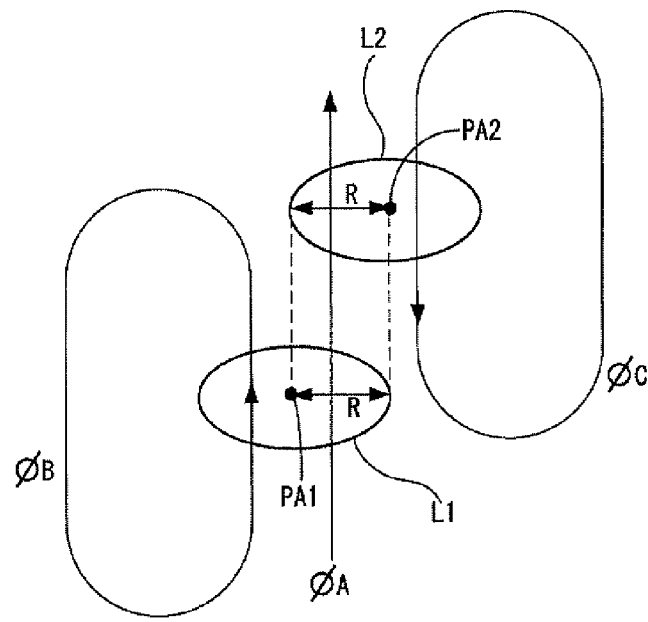
FIGS. 21A and 21B are views illustrative of a harmonic resonant circuit that resonates when a primary coil and a secondary coil are positioned at a given distance R.
Figure 21B:
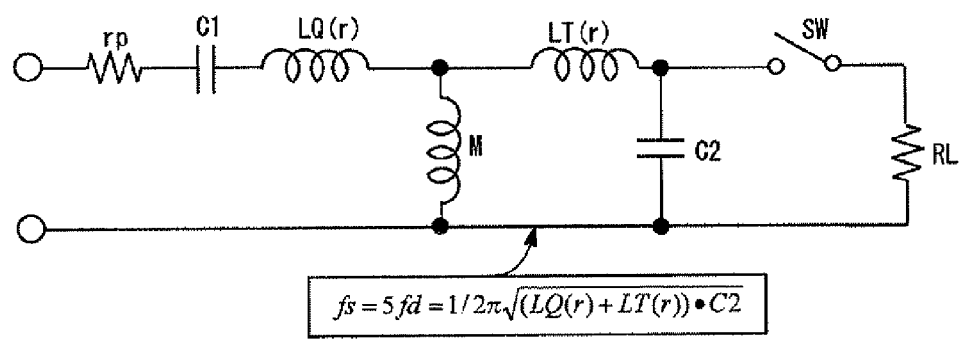

FIGS. 21A and 21B are views illustrative of a harmonic resonant circuit that resonates when the primary coil and the secondary coil are positioned at the given distance R. As shown in FIG. 21A, when the capacitance of the capacitor C2 is set taking into account the leakage inductances (φB and φC) when the distance between the center of the primary coil (L1) and the center of the secondary coil (L2) is R, the harmonic resonant circuit SY2 undergoes harmonic resonance when the primary coil (L1) and the secondary coil (L2) are positioned at the given distance R.

As shown in FIG. 21B, when the leakage inductances when the primary coil (L1) and the secondary coil (L2) are positioned at the given distance R are referred to as LQ(R) and LT(R), the harmonic resonant circuit SY2 is caused to undergo harmonic resonance when the primary coil (L1) and the secondary coil (L2) are positioned at the given distance R by setting the capacitance of the capacitor C2 to satisfy the expression shown in FIG. 21B.

Figure 22A:
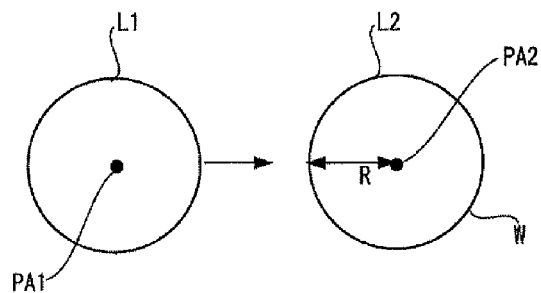
FIGS. 22A to 22D are views illustrative of a position at which the harmonic resonance peak is obtained when scanning a primary coil with respect to a secondary coil.

FIGS. 22A to 22D are views illustrative of a position at which the harmonic resonance peak is obtained when scanning the primary coil with respect to the secondary coil. As shown in FIG. 22A, the center of the primary coil (L1) is referred to as PA1, and the center of the secondary coil (L2) is referred to as PA2.

Figure 22B:
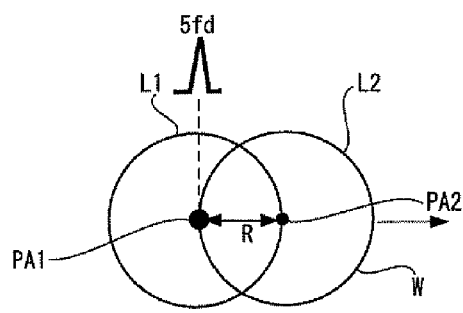
Figure 22C:
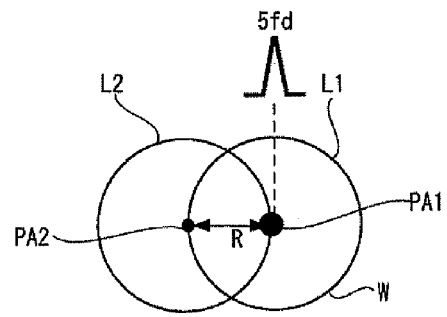

As shown in FIG. 22A, the primary coil (L1) is scanned linearly from the left toward the secondary coil (L2). In this case, the harmonic resonance peak is obtained when the primary coil (L1) approaches the secondary coil (L2) so that the distance between the primary coil (L1) and the secondary coil (L2) is R, as shown in FIG. 22B. The harmonic resonance peak is also obtained when the primary coil (L1) moves away from the secondary coil (L2), as shown in FIG. 22C.

Figure 22D:
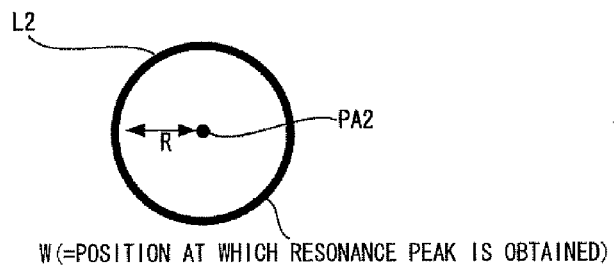

When the primary coil (L1) is scanned along an arbitrary axis that intersects the secondary coil (L2) in a stationary state, the resonance peak is obtained at a position on a circumference at a distance R from the center PA2 of the secondary coil (L2), as shown in FIG. 22D. Specifically, when a position at which the harmonic resonance peak is obtained is referred to as W, the position W coincides with the outermost circle of the secondary coil (L2).

Figure 23:
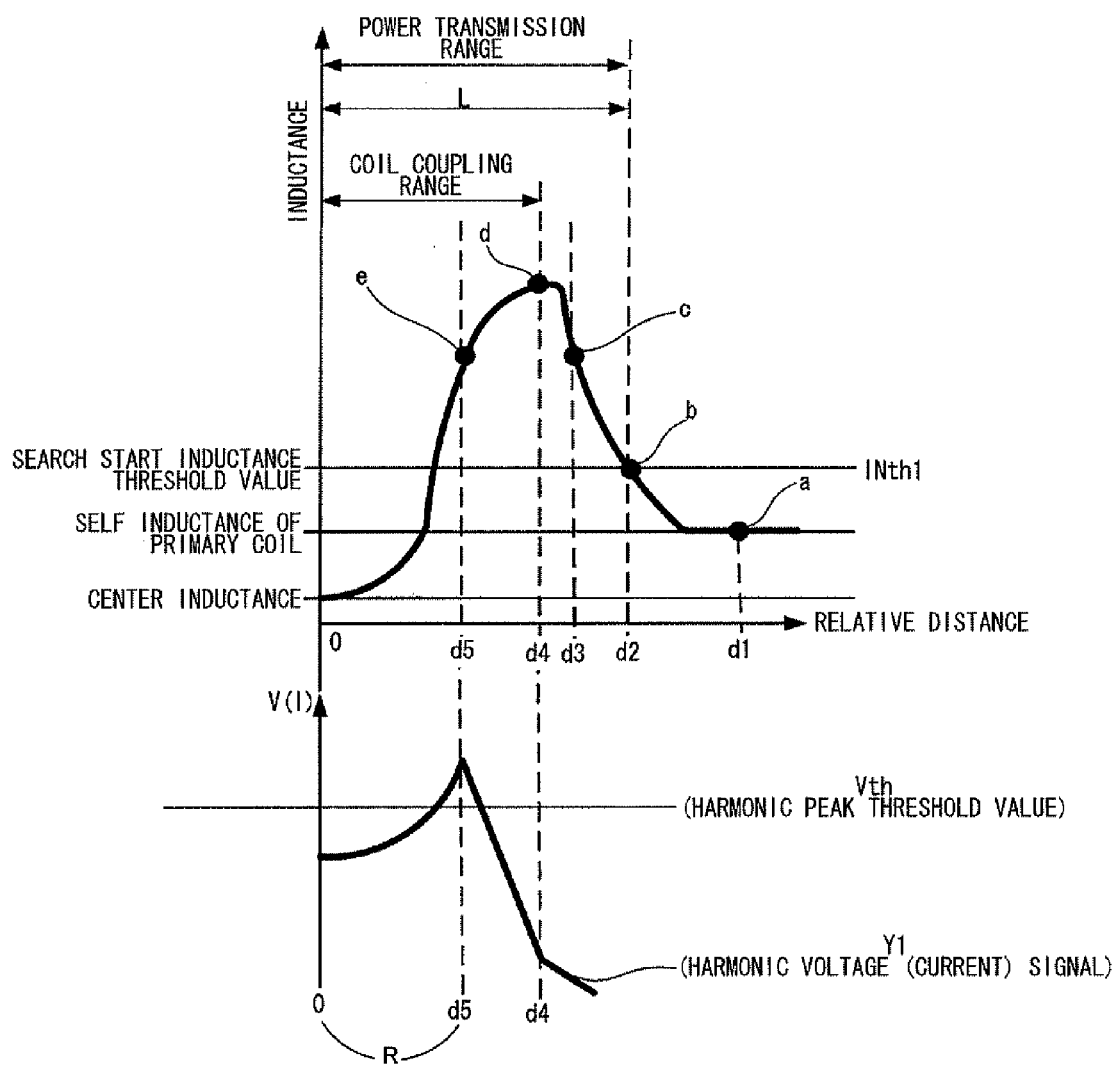
FIG. 23 is a view showing an example of a change in the inductance of a primary coil and an example of a change in harmonic voltage obtained from a harmonic detection circuit when the primary coil approaches a secondary coil.

FIG. 23 is a view showing an example of a change in the inductance of the primary coil and an example of a change in the harmonic voltage obtained from the harmonic detection circuit when the primary coil approaches the secondary coil. The upper part of FIG. 23 is the same as FIG. 18. As shown in the lower part of FIG. 23, the harmonic resonance peak is obtained by the harmonic detection circuit 25 when the distance between the primary coil and the secondary coil is R (=relative distance d5).

Therefore, the harmonic peak can be detected by comparing the output from the harmonic detection circuit 25 with a harmonic peak detection threshold voltage (V2).

As described with reference to FIG. 18, the approach of the secondary coil can be detected by a decrease in coil end voltage (coil current) due to an increase in the inductance of the primary coil when the distance between the center of the primary coil and the center of the secondary coil is L (=relative distance d2).

As shown in FIG. 23, the distance R (distance at which the harmonic resonance peak occurs) is shorter than the distance L (approach detection distance) (R<L). Specifically, a situation in which the secondary coil has approached the primary coil within the distance L is detected by approach detection, and a situation in which the primary coil and the secondary coil have been positioned at the distance R is detected by harmonic detection.

Note that the distance R (distance at which the harmonic resonance peak occurs) may be zero (R=0). Specifically, when harmonic resonance has occurred when R=0 (i.e., when the position of the primary coil coincides with the position of the secondary coil), the primary coil and the secondary coil can be positioned by moving the primary-side instrument by trial and error using the harmonic peak as an index, or the primary coil and the secondary coil can be positioned by manually moving the secondary-side instrument. Moreover, placement or removal (leave) of the secondary-side instrument can be detected depending on the presence or absence of the harmonic peak. The details are described later Secondary Coil Position Detection Utilizing Orthogonal Two-Axis Search A secondary coil position detection process utilizing an orthogonal two-axis search is described below with reference to FIGS. 24 to 27. FIGS. 24 to 27 are views illustrative of a secondary coil position detection method and a positioning method utilizing an orthogonal two-axis search.

Figure 24:
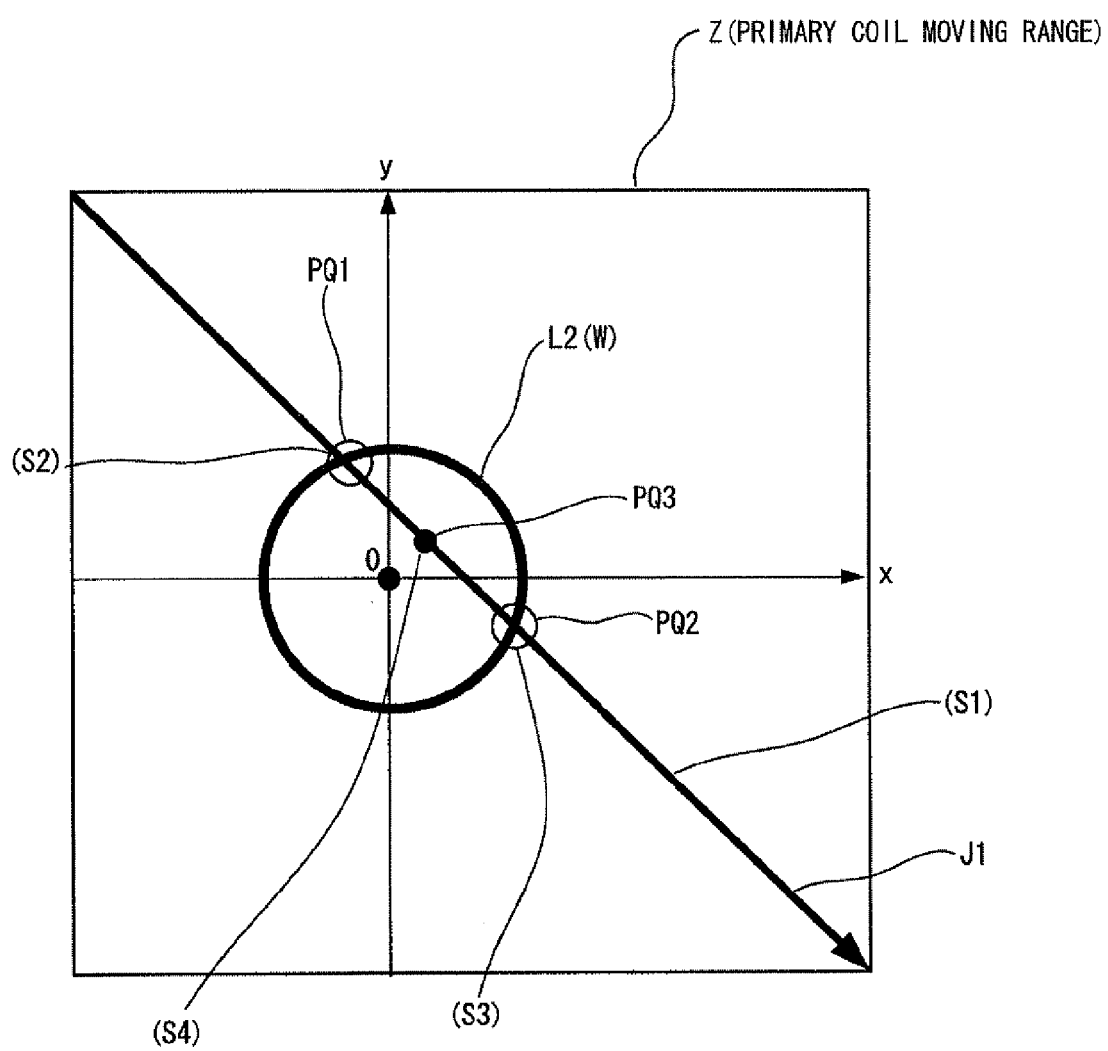
FIG. 24 is a view illustrative of a secondary coil position detection method and a positioning method utilizing an orthogonal two-axis search.

In FIG. 24, the secondary coil (L2) is placed in a primary coil moving range Z. If the range in which the secondary-side instrument 510 is placed is limited to an area Z1 of which the color differs from the remaining area (see FIG. 1), for example, the secondary coil (L2) is necessarily placed in the primary coil moving range.

The approach of the secondary coil (L2) can be detected by intermittently driving (moving) the primary coil, as described above. Therefore, the power-transmitting-side control circuit 22 shown in FIG. 2 causes the actuator control circuit 37 to perform an orthogonal two-axis search for detecting the position of the secondary coil. The details are described below.

An XY plane determined by XY axes is set as shown in FIG. 24. The calculation circuit 35 shown in FIG. 15 calculates the coordinate position in the XY plane. The primary coil (L1) and the secondary coil (L2) are circular planar coils having a radius of R. The harmonic peak is obtained when the distance between the centers (PA1 and PA2) of the primary coil (L1) and the secondary coil (L2) is R.

As shown in FIG. 24, the actuator control circuit 37 drives actuators 720 and 730 to move the primary coil (L1) along a first axis (J1) that intersects the secondary coil to perform a first scan for detecting the position of the secondary coil (step (S1)).

A harmonic resonance peak occurs at two points PQ1 and PQ2 (step (S2) and step (S3)). The calculation circuit 35 calculates the coordinates PQ3 of the midpoint of a line segment that connects the two points PQ1 and PQ2 (step (S4)).

Figure 25:
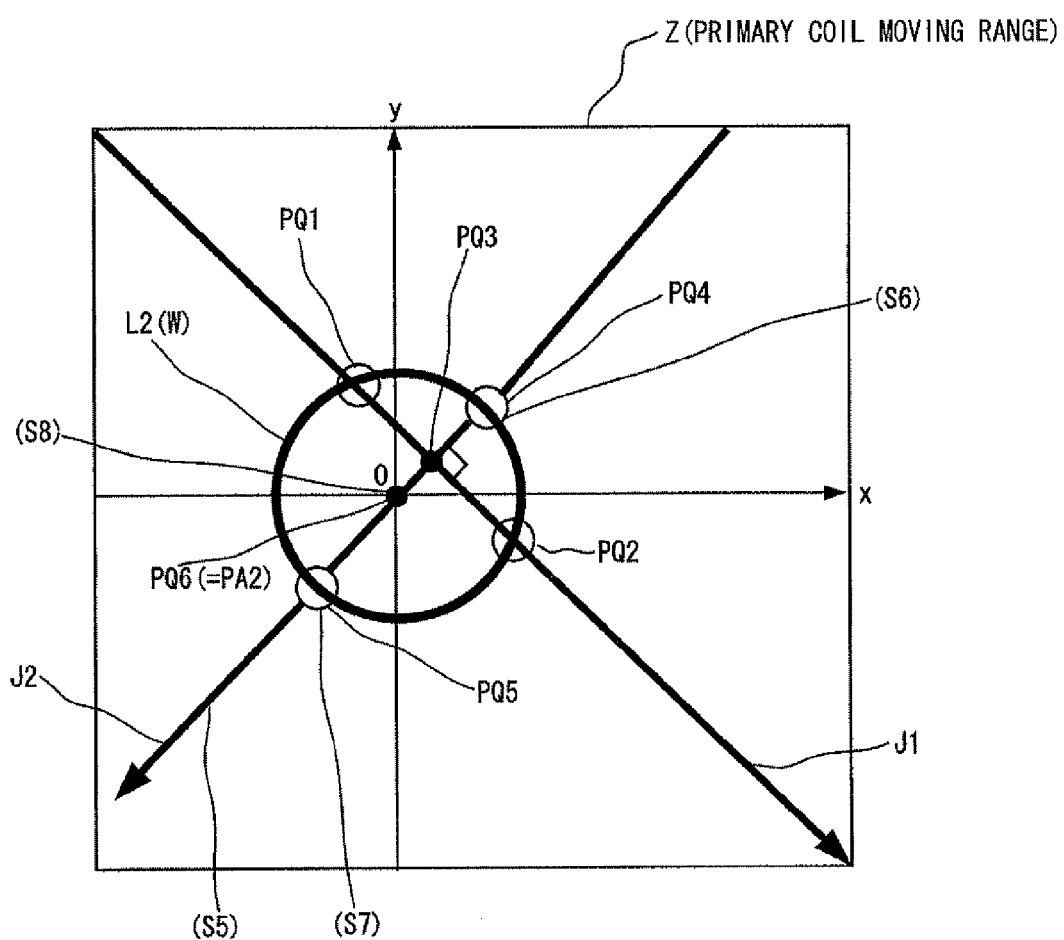
FIG. 25 is a view illustrative of a secondary coil position detection method and a positioning method utilizing an orthogonal two-axis search.

As shown in FIG. 25, the actuator control circuit 37 then drives the actuators 720 and 730 to move the primary coil (L1) along a second axis (J2) that perpendicularly intersects the first axis (J1) and passes through the midpoint (PQ3) calculated by the first scan to perform a second scan for detecting the position of the secondary coil (step (S5)).

A harmonic resonance peak occurs at two points PQ4 and PQ5 (step (S6) and step (S7)).

The calculation circuit 35 then calculates the coordinates PQ6 of the midpoint of a line segment that connects the two points PQ4 and PQ5 (step (S8)).

The calculated coordinates PQ6 indicate the position of the center PA2 of the secondary coil (L2). Specifically, the center position of the secondary coil (L2) is thus calculated.

Figure 26:
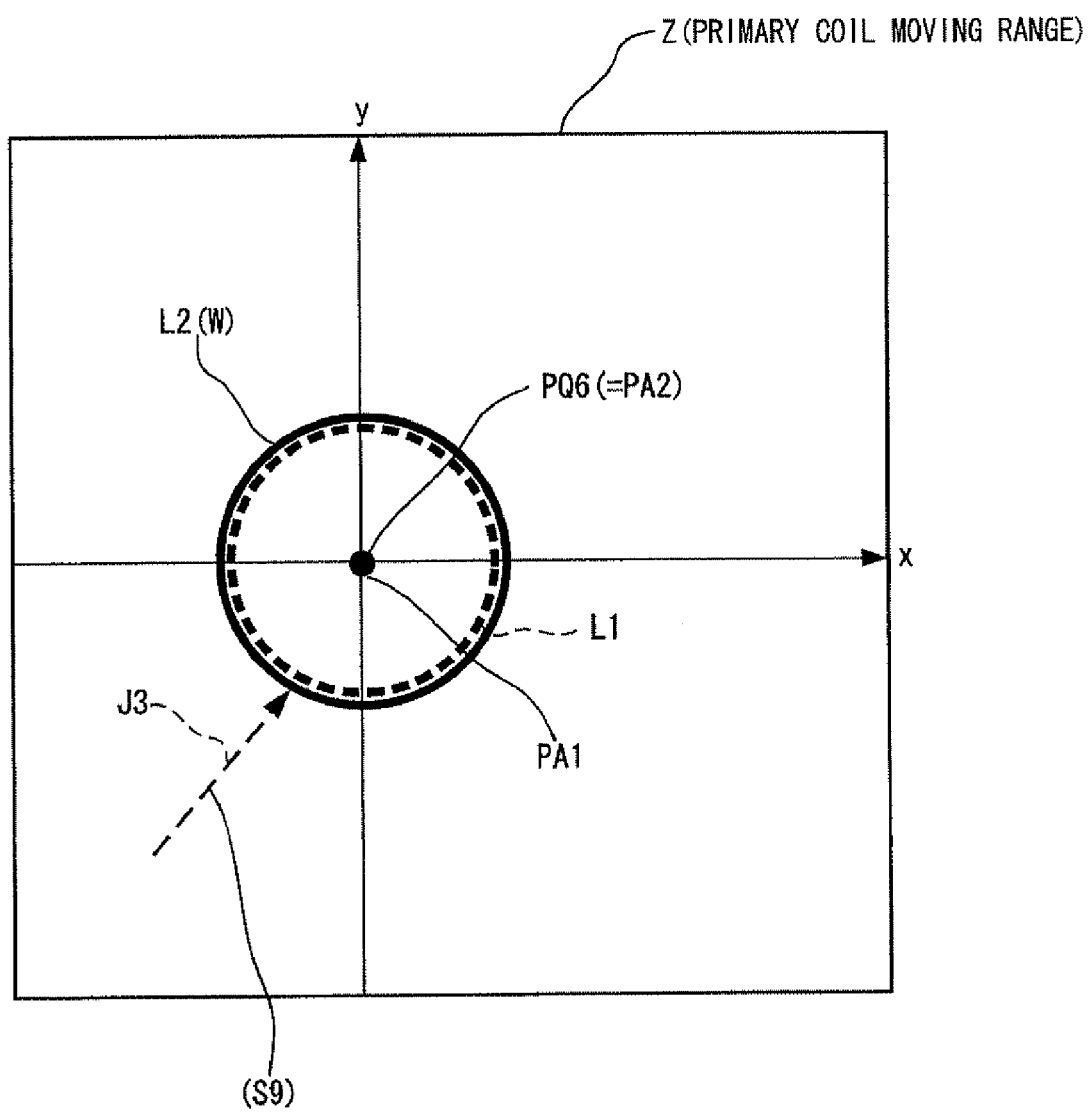
FIG. 26 is a view illustrative of a secondary coil position detection method and a positioning method utilizing an orthogonal two-axis search.

As shown in FIG. 26, the primary coil (L1) is moved in a direction J3 so that the center PA1 of the primary coil (L1) coincides with the center PA2 of the secondary coil (L2) (step (S9)). The primary coil and the secondary coil can thus be automatically positioned with very high accuracy.

Figure 27:
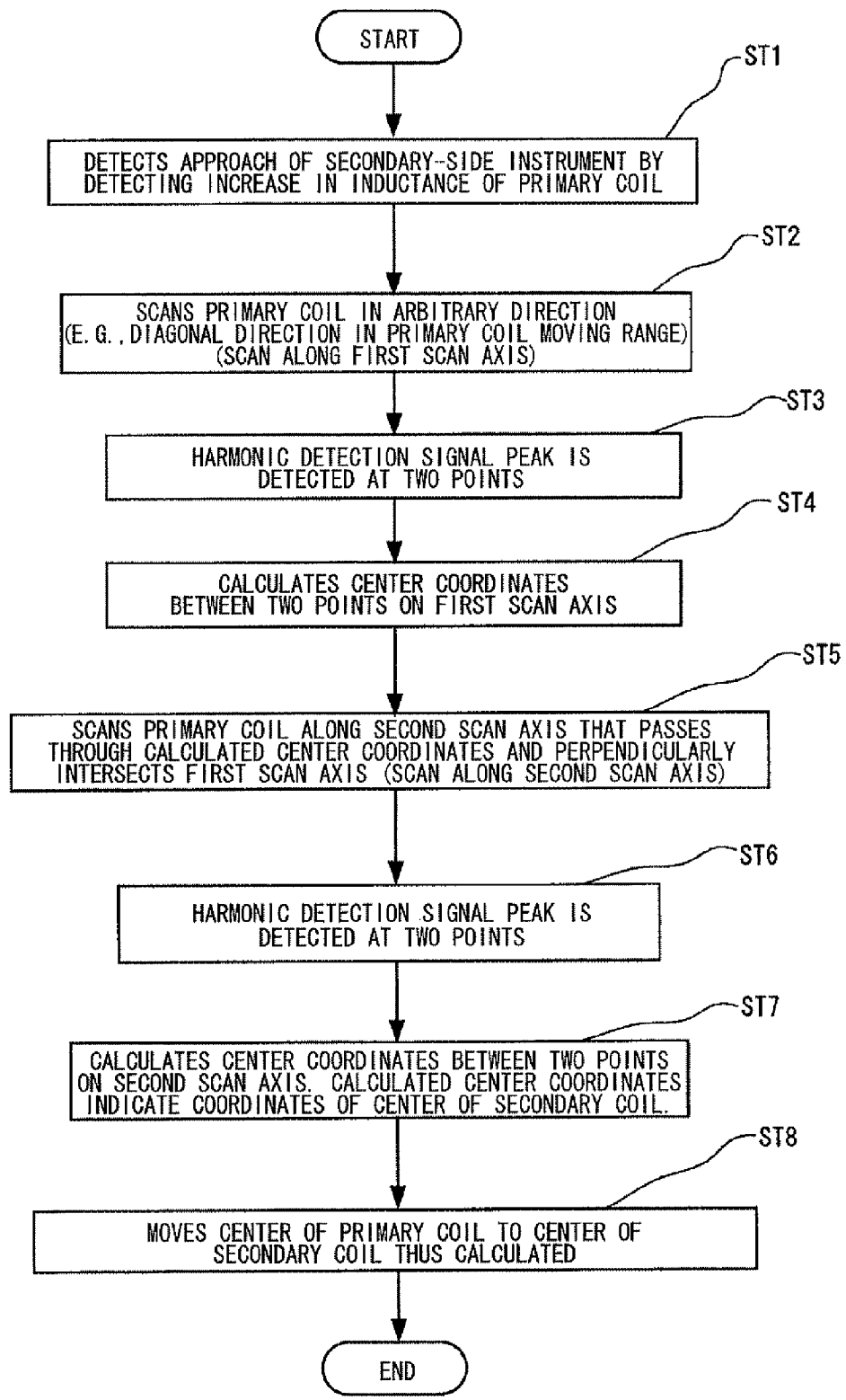
FIG. 27 is a view illustrative of a secondary coil position detection method and a positioning method utilizing an orthogonal two-axis search.

FIG. 27 shows a summary of the above-described process. FIG. 27 is a flowchart showing the process of the secondary coil position detection method and the primary coil positioning method utilizing the orthogonal two-axis search. The flow shown in FIG. 27 also includes the secondary coil approach detection operation. Note that the approach detection operation is not indispensable, and may be omitted.

The primary coil is intermittently driven to detect the approach of the secondary-side instrument (secondary coil) by detecting an increase in the inductance of the primary coil (step ST1). When it has been detected that the secondary-side instrument has been placed in a given area (i.e., the approach of the secondary coil has been detected), the first scan is performed along the first scan axis (step ST2).

A harmonic detection signal peak (harmonic resonance peak) is obtained at two points by the first scan (step ST3). The coordinates of the midpoint of a line segment that connects the two points are then calculated (step ST4).

The second scan is then performed along the second scan axis that passes through the calculated center coordinates and perpendicularly intersects the first scan axis (step ST5). A harmonic detection signal peak (harmonic resonance peak) is obtained at two points by the second scan (step ST6).

The coordinates of the midpoint of a line segment that connects the two points determined by the second scan are then calculated (step ST7). The coordinates of the midpoint thus calculated indicate the coordinates of the center of the secondary coil (L2).

The center of the primary coil (L1) is moved to the center of the secondary coil thus calculated (step ST8). The primary coil (L1) and the secondary coil (L2) are positioned in this manner.

Configuration Example and Operation of XY Stage

Figure 28:
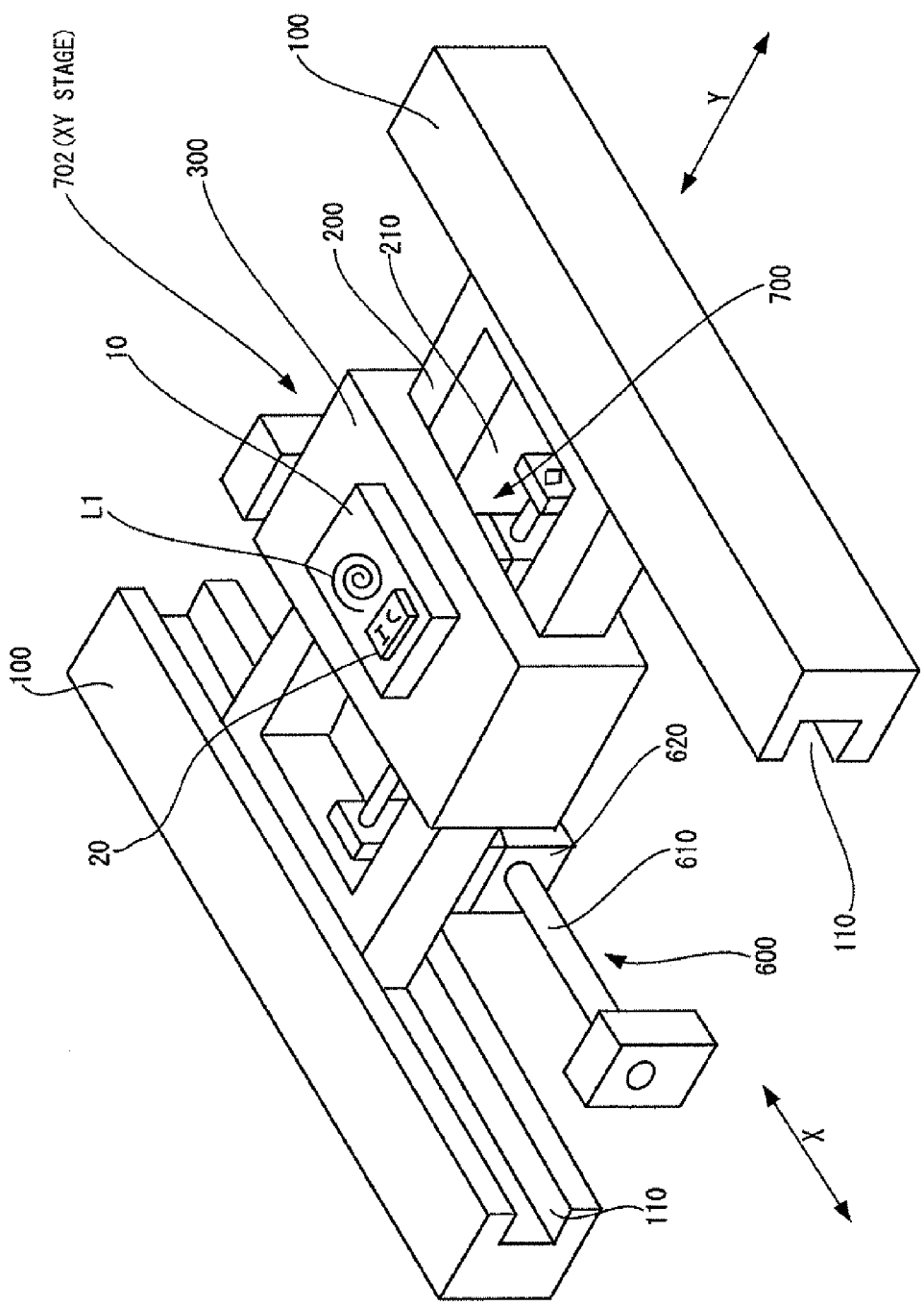
FIG. 28 is a perspective view showing the basic configuration of an XY stage.

An example of the configuration of the XY stage and the operation of the XY stage are described below. FIG. 28 is a perspective view showing the basic configuration of the XY stage.

As shown in FIG. 28, the XY stage 702 includes a pair of guide rails 100, an X-axis slider 200, and a Y-axis slider 300. Aluminum, iron, granite, a ceramic, or the like is used as the material for these members.

The guide rails 100 respectively have guide grooves 110 opposite to each other The guide rails 100 extend in parallel in the X-axis direction. The guide rails 100 are secured on a surface plate (not shown).

The X-axis slider 200 engages the guide rails 100. The X-axis slider 200 is in the shape of a rectangular flat plate. The ends of the X-axis slider 200 are fitted into the guide grooves 110 so that the X-axis slider 200 can be moved in the X-axis direction along the guide grooves 110, but cannot be moved in the Y-axis direction. Therefore, the X-axis slider 200 can be reciprocated in the X-axis direction along the guide rails 100.

Note that the guide groove 110 formed in the guide rail 100 may be formed in the X-axis slider 200, and the guide rail 100 may have a protrusion that is fitted into the guide groove formed in the X-axis slider 200. It suffices that the engagement portion of the guide rail 100 and the X-axis slider 200 be supported on three sides. The shape of the guide groove is not particularly limited.

The Y-axis slider 300 is provided to enclose the X-axis slider 200. The Y-axis slider 300 has a cross-sectional shape (almost in the shape of the letter U) corresponding to the cross-sectional shape of the X-axis slider 200 in the shape of a rectangular flat plate.

The end of the Y-axis slider 300 almost in the shape of the letter U is bent inward. The upper part of the Y-axis slider 300 may be open. Alternatively, the Y-axis slider 300 may have a cross-sectional shape having no opening.

The ends of the X-axis slider 200 in the widthwise direction that engage the guide grooves 110 are thus supported by the Y-axis slider 300 on the upper side, the side, and the lower side. Since the Y-axis slider 300 is secured on the X-axis slider 200, the movement of the Y-axis slider 300 in the X-axis direction with respect to the X-axis slider 200 is prevented. When the X-axis slider 200 is moved in the X-axis direction, the Y-axis slider 300 moves in the X-axis direction together with the X-axis slider 200.

The Y-axis slider 300 can be moved in the Y-axis direction with respect to the X-axis slider 200. The X-axis slider 200 functions as an X-axis direction moving member, and also serves as a guide that allows the Y-axis slider 300 to move in the Y-axis direction with respect to the X-axis slider 200. The upper part of the Y-axis slider 300 serves as a top plate (movable main surface) on which an object that is moved along the XY axes is placed.

As shown in FIG. 28, the power transmission device 10 including the primary coil (circular wound coil) L1 and the power transmission control device 20 (IC) is provided on the main surface (top plate) of the Y-axis slider 300. When the primary coil L1 is a wound coil, the volume and the height of the coil can be reduced. This is advantageous when scanning the primary coil L1. Note that the type of the primary coil is not limited to the above-described example.

The XY stage 702 shown in FIG. 28 utilizes a highly accurate linear motor as a drive source. A ball screw mechanism may be used instead of the linear motor.

An X-axis linear motor 600 that moves the X-axis slider 200 is provided between the pair of guide rails 100. A movable member 620 of the X-axis linear motor 600 secured on a rod-shaped stator 610 is secured on the lower part of the X-axis slider 200 so that the X-axis slider 200 can be reciprocated.

The Y-axis slider 300 is reciprocated by a Y-axis linear motor 700. A depression 210 is formed in the X-axis slider 200, and the Y-axis linear motor is placed in the depression 210. Therefore, the stage height can be reduced.

The X-axis linear motor 600 and the Y-axis linear motor 700 respectively correspond to the X-direction actuator 720 and the Y-direction actuator 730 shown in FIG. 2.

The power-transmitting-side device (i.e., the primary-side structure of the non-contact power transmission system) 704 is formed by placing the power transmission device 10 including the primary coil (circular wound coil) L1 and the power transmission control device 20 (IC) on the XY stage 702.

As shown in FIG. 1B, the power-transmitting-side device 704 is provided in a structure (e.g., desk) having a flat surface, for example. This implements the power-transmitting-side device 704 that deals with a next-generation non-contact power transmission system capable of automatically moving the position of the primary coil in the XY plane corresponding to the position of a secondary coil of a secondary-side instrument (e.g., portable terminal) placed at an approximate position.

As described above, the power transmission control device 20 according to this embodiment intermittently drives the primary coil, and always monitors whether or not the coil end voltage (current) has decreased due to an increase in primary-side inductance. When the approach of the secondary-side instrument (i.e., the secondary-side instrument has been placed in a given area Z1) has been detected, the primary coil position control circuit 310 automatically adjusts the position of the primary coil. Since the secondary-side instrument approach detection process and the primary coil position adjustment process are automatically performed, the user's workload is reduced.

Third Embodiment

In this embodiment, harmonic resonance occurs when the position of the primary coil coincides with the position of the secondary coil, and the primary coil is scanned by trial and error using the harmonic detection output as an index.

Figure 29A:
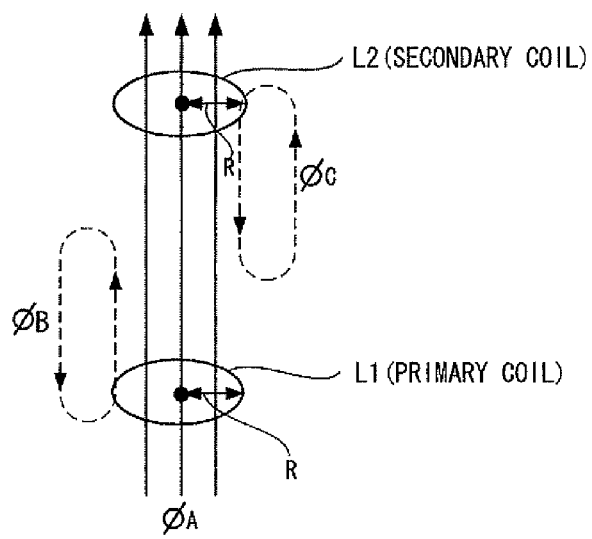
FIGS. 29A and 29B are views illustrative of a harmonic resonant circuit that resonates when the position of a primary coil coincides with the position of a secondary coil.
Figure 29B:
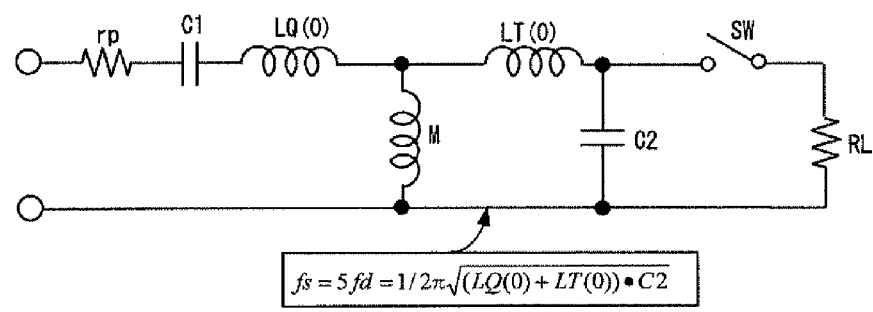

FIGS. 29A and 29B are views illustrative of a harmonic resonant circuit that resonates when the position of the primary coil coincides with the position of the secondary coil.

As shown in FIG. 29A, when the capacitance of the capacitor C2 is set taking into account the leakage inductances ($\phi B$ and $\phi C$) when the center of the primary coil (L1) coincides with the center of the secondary coil (L2, the harmonic resonant circuit SY2 undergoes harmonic resonance when the position of the primary coil (L1) coincides with the position of the secondary coil (L2).

As shown in FIG. 29B, when the leakage inductances when the position of the primary coil coincides with the position of the secondary coil are referred to as LQ(0) and LT(0), the harmonic resonant circuit SY2 undergoes harmonic resonance when the position of the primary coil (L1) coincides with the position of the secondary coil (L2) by setting the capacitance of the capacitor C2 to satisfy the expression shown in FIG. 29B.

Scanning Primary Coil Using Harmonic Detection Output as Index

Figure 30A:
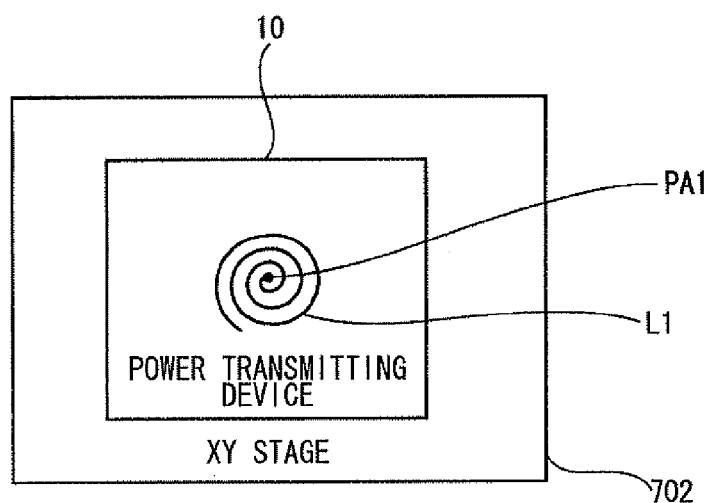
FIGS. 30A and 30B are views illustrative of a primary coil positioning method that scans a primary coil by trial and error using a detection output from a harmonic resonant circuit as an index.
Figure 30B:
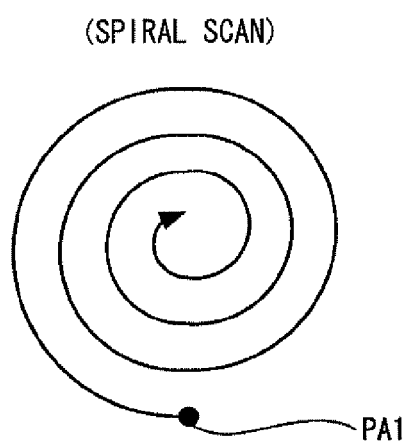

FIGS. 30A and 30B are views illustrative of a primary coil positioning method that scans the primary coil by trial and error using the detection output from the harmonic resonant circuit as an index. The primary coil may be moved by trial and error by moving the primary coil based on a given movement sequence (e.g., based on a spiral scan sequence), or moving the primary coil at random, for example.

The following description is given taking an example in which the primary coil is scanned spirally (note that various scan patterns such as a zigzag scan may also be employed).

As shown in FIG. 30A, the power transmitting device 10 including the primary coil (L1) is placed on the XY stage 702. In FIG. 30A, PA1 indicates the center of the primary coil.

When the power-transmitting-side control circuit 22 included in the power transmission control device 20 has detected placement of the secondary-side instrument by the above-described approach detection, the power-transmitting-side control circuit 22 causes the actuator control circuit 37 to move the XY stage 702 so that the primary coil L1 is scanned spirally, as shown in FIG. 30B, for example.

Specifically, the primary coil is gradually moved so that the center PA1 of the primary coil L1 draws a spiral. The power-transmitting-side control circuit 22 determines whether or not the output level of the harmonic detection circuit 25 has exceeded the threshold voltage V2 using the comparator CP2 while moving the primary coil L1. The power-transmission-side control circuit 22 stops scanning the primary coil (L1) when the output level of the harmonic detection circuit 25 has exceeded the threshold voltage V2.

Specifically, if the harmonic resonant circuit (SY2 in FIG. 20) formed in the secondary-side instrument resonates when the position of the primary coil (L1) coincides with the position of the secondary coil (L2), for example, the position of the primary coil (L1) should coincide with the position of the secondary coil (L2) when the output level of the harmonic detection circuit 25 has exceeded the threshold voltage V2. This means that the primary coil (L1) has been positioned with respect to the secondary coil (L2).

Figure 31:
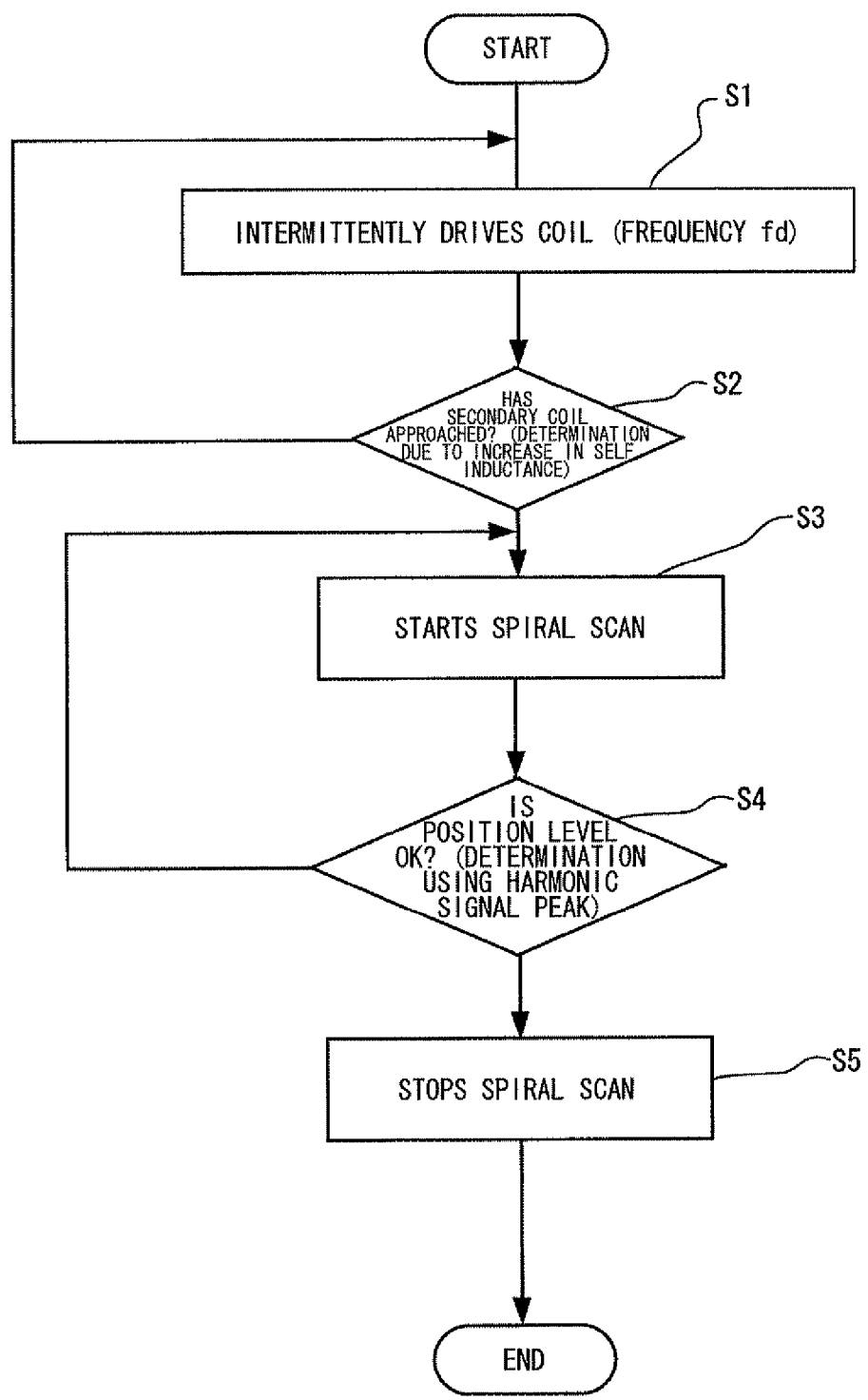
FIG. 31 is a flowchart showing a process of scanning a primary coil using a harmonic detection output as an index.

The primary coil (L1) can thus be automatically positioned by scanning the primary coil (L1) using the harmonic detection output as an index. FIG. 31 shows a summary of the above-described process.

FIG. 31 is a flowchart showing the primary coil scan process using the harmonic detection output as an index.

The power-transmitting-side control circuit 22 intermittently (e.g., cyclically) drives the primary coil at the drive frequency fd in order to automatically detect placement of the secondary-side instrument (i.e., the approach of the secondary coil) (step S1), and detects the approach of the secondary coil by detecting a decrease in coil end voltage (coil current) due to an increase in inductance (step S2).

When the power-transmitting-side control circuit 22 has detected placement of the secondary-side instrument by the above-described approach detection, the power-transmitting-side control circuit 22 causes the actuator control circuit 37 to move the XY stage 702 so that the primary coil is scanned spirally, for example (step S3), and determines whether or not the harmonic detection output level has exceeded the given threshold voltage (i.e., whether or not the desired positional relationship has been achieved) while scanning the primary coil (step S4).

When the primary coil and the secondary coil have satisfied the desired positional relationship, the power-transmission-side control circuit 22 stops scanning (spirally scanning) the primary coil.

Fourth Embodiment

In this embodiment, the primary-side instrument is not provided with the primary coil scan mechanism using the actuator. The user positions the primary coil and the secondary coil by manually moving the secondary-side instrument. The details are described below.

Figure 32:
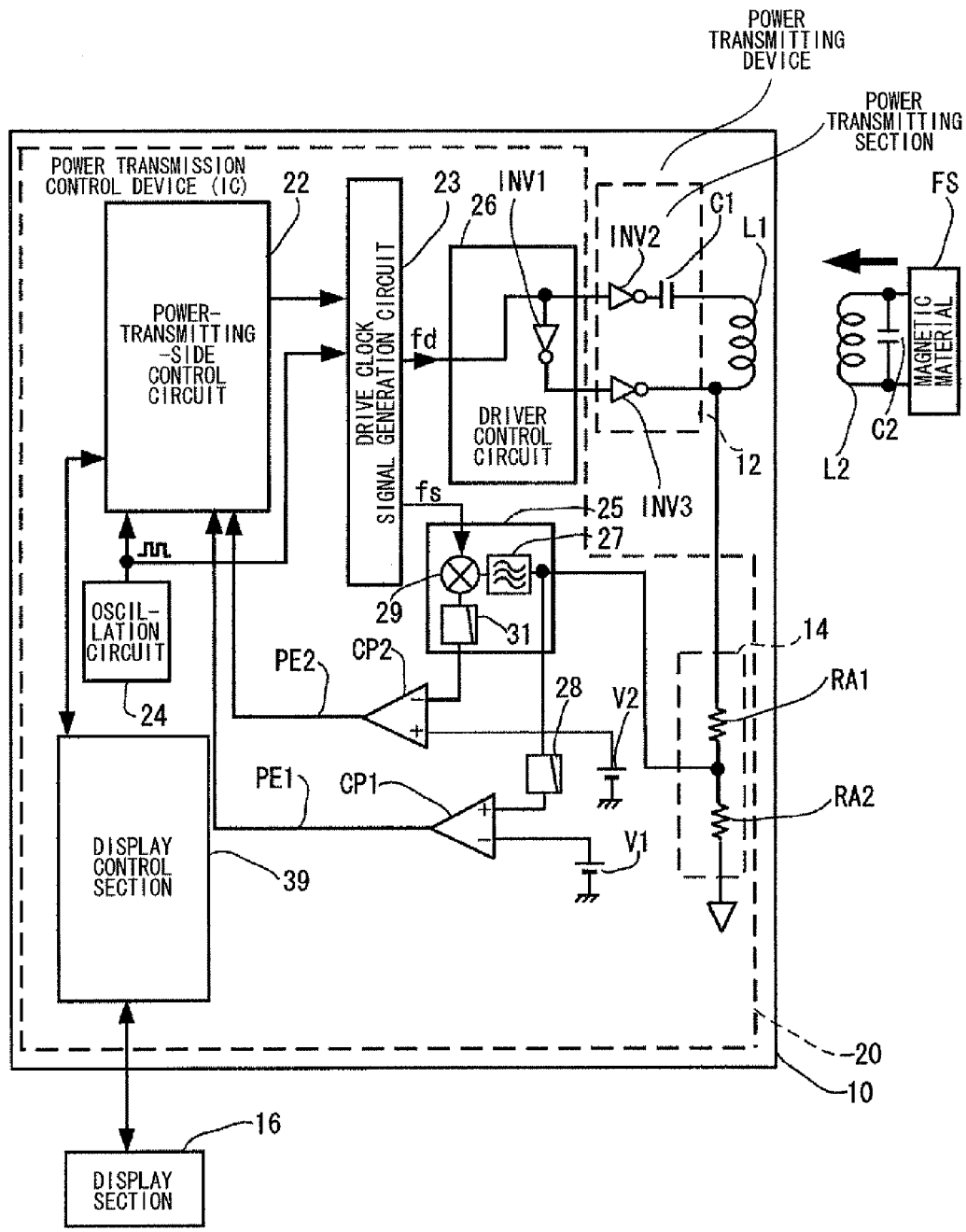
FIG. 32 is a view showing another configuration of a power transmitting device (configuration that detects the approach of a secondary-side instrument and notifies the user of coil relative positional relationship information).

FIG. 32 is a view showing another configuration of the power transmitting device (configuration that detects the approach of the secondary-side instrument and notifies the user of coil relative positional relationship information). The main configuration of the power transmitting device shown in FIG. 32 is similar to that shown in FIG. 15. The power transmitting device shown in FIG. 32 differs from that shown in FIG. 15 in that a display control section 39 is provided instead of the actuator control circuit 37.

Specifically, a power transmitting device 10 shown in FIG. 32 (power transmission control device 20) merely has a function of notifying the user of a detection result (relative positional relationship information) for the relative positional relationship between the primary coil and the secondary coil based on the harmonic detection output of the harmonic detection circuit 25 using the display section 16. The power transmitting device 10 may notify the user of the detection result using sound or the like.

Figure 33A:
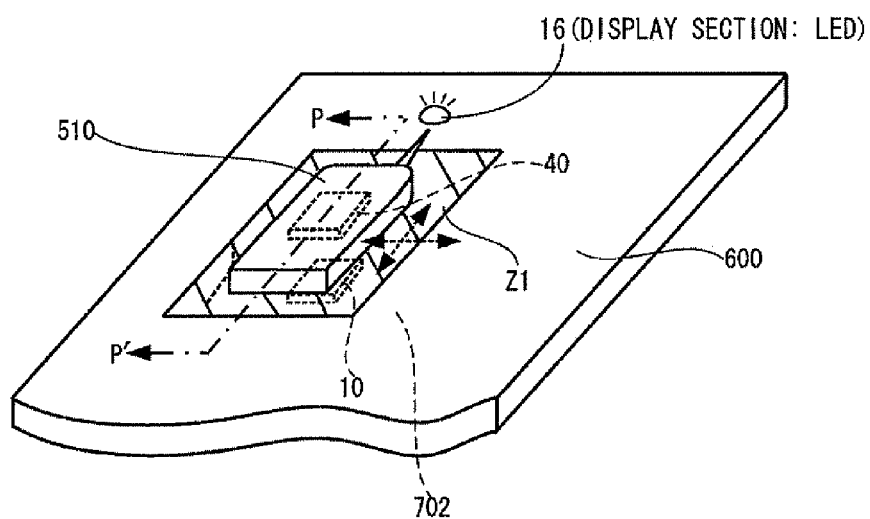
FIGS. 33A and 33B are views showing an example of an application of a non-contact power transmission system using a power transmitting device having a configuration shown in FIG. 32.
Figure 33B:
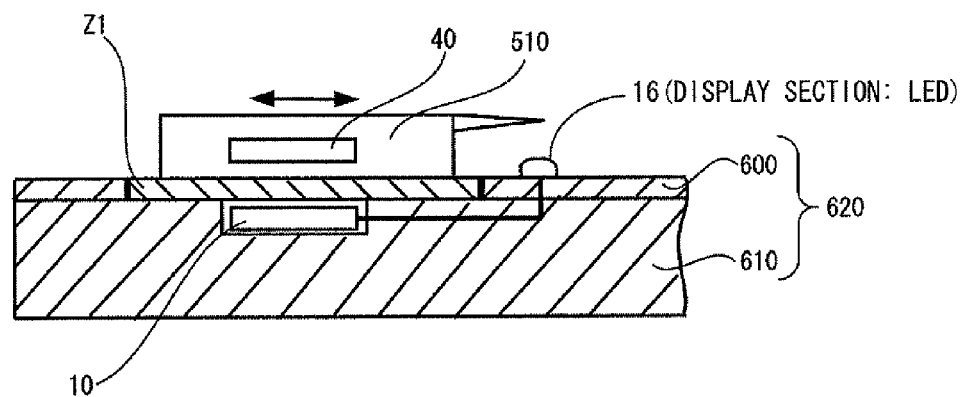

FIGS. 33A and 33B are views showing an example of an application of a non-contact power transmission system using the power transmitting device having a configuration shown in FIG. 32. FIG. 33A is a perspective view showing a system desk, and FIG. 33B is a cross-sectional view of the system desk shown in FIG. 33A along the line P-P'.

As shown in FIG. 33B, the power transmitting device 10 is provided in a structure (system desk in this example) 620 having a placement side.

Specifically, the power transmitting device 10 is provided in a depression formed in the system desk 620. A flat plate (placement member; e.g., an acrylic plate having a thickness of several millimeters) 600 is provided over (on the upper side of) the system desk 620. The flat plate 600 is supported by a support member 610.

A display section (LED) 16 is provided on the flat plate 600. The user is notified of a detection result (relative positional relationship information) for the relative positional relationship between the primary coil and the secondary coil based on the harmonic detection output using the display section (LED) 16. For example, the display section (LED) 16 emits red light when the position of the primary coil (L1) has coincided with the position of the secondary coil (L2), and is turned OFF when the position of the primary coil (L1) does not coincide with the position of the secondary coil (L2).

The flat plate 600 includes a portable terminal placement area Z1 in which a portable terminal (including a portable telephone terminal, a PDA terminal, and a portable computer terminal) is placed.

As shown in FIG. 33A, the portable terminal placement area Z1 included in the flat plate 600 differs in color from the remaining area so that the user can determine that the portable terminal placement area Z1 is an area in which a portable terminal should be placed. Note that the color of the boundary area between the portable terminal placement area Z1 and the remaining area may be changed instead of changing the color of the entire portable terminal placement area Z1.

A portable terminal (secondary-side instrument) 510 includes a power receiving device 40 (including a secondary coil) that receives power transmitted from the power transmitting device 10.

When the portable terminal 510 has been placed at an approximate position in the portable terminal placement area Z1, the power transmitting device 10 provided in the system desk 620 automatically detects placement of the portable terminal 510. This allows the power transmitting device 10 to detect the relative positional relationship between the primary coil and the secondary coil based on the harmonic detection output and display the detection result.

The user manually moves the portable terminal 510, and checks whether or not the display section (LED) 16 emits light. The user stops moving the portable terminal 510 when the display section (LED) 16 has emitted light. The secondary coil (L2) is thus positioned with respect to the primary coil (L1).

As described above, the secondary coil (L2) can be positioned with respect to the primary coil (L1) by providing the display section (LED) 16 that emits light of a given color when a harmonic detection output that exceeds a given level is obtained, and manually moving the portable terminal 510 (i.e., secondary-side instrument) by trial and error to search for a position at which the display section (LED) 16 emits light.

The power transmitting device 10 then starts a given operation for power transmission. When power transmission has started, the display section (LED) 16 emits yellow light to notify the user that power transmission (charging) is performed, for example.

The user may be notified of the relative positional relationship information using the display section (LED) 16 in various ways. For example, a multi-stage notification operation may be performed corresponding to the level of the harmonic detection output as a coil relative positional relationship detection signal.

For example, the display section (LED) 16 may be configured to emit red light when a harmonic detection output that exceeds a first level is obtained, and emit green light when a harmonic detection output that exceeds a second level higher than the first level is obtained. The user manually moves the portable terminal 510 (secondary-side instrument) by trial and error, and checks whether or not the display section (LED) 16 emits light and the color of the light. This makes it possible to more efficiently position the secondary coil (L2) with respect to the primary coil (L1).

Specifically, since the secondary coil (L2) has approached the primary coil (L1) to some extent when the display section (LED) 16 emits red light, the user can more carefully move the secondary-side instrument 510 (portable terminal) within a narrow search (movement) range.

According to this example, the secondary-side instrument 510 (portable terminal) can be easily positioned utilizing color display. This makes it easy to position the secondary coil (L2) with respect to the primary coil (L1).

Note that the user may be notified of placement or removal (leave) of the secondary-side instrument 510 (portable terminal) utilizing the state (e.g., ON, OFF, or the color of the light) of the display section (LED) 16.

Fifth Embodiment

This embodiment illustrates a structure that can simultaneously transmit power to a plurality of secondary-side instruments.

Figure 34:
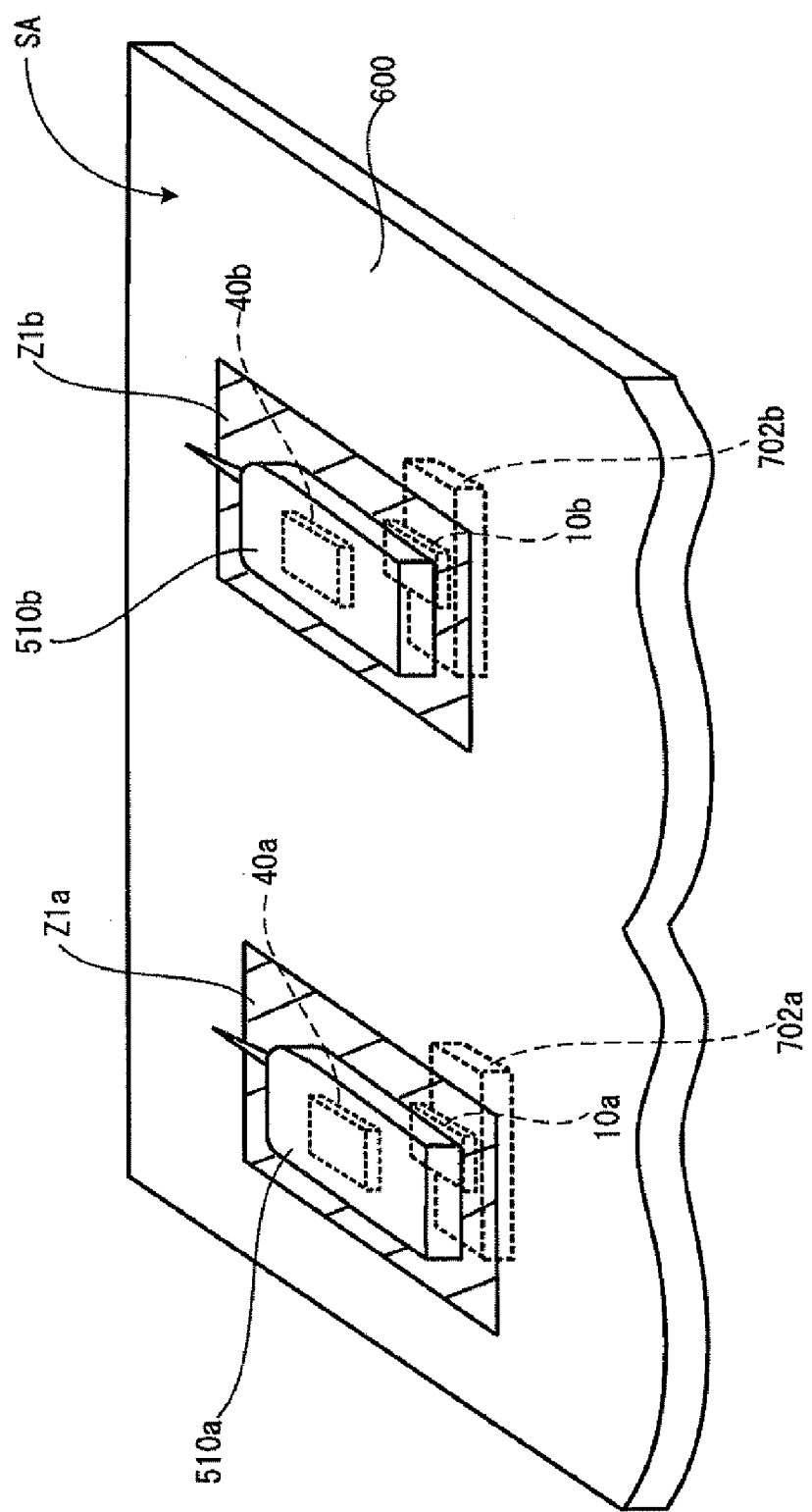
FIG. 34 is a view showing the main portion of a structure that can simultaneously transmit power to a plurality of secondary-side instruments.

FIG. 34 is a view showing the main portion of a structure that can simultaneously transmit power to a plurality of secondary-side instruments. The basic structure is the same as that shown in FIGS. 1A and 1B.

A flat plate 600 provided on the structure (system desk in this example) includes a plurality of portable terminal placement areas (Z1a and Z1b) in which a plurality of portable terminals (such as a portable telephone terminal, a PDA terminal, and a portable computer terminal) are respectively placed.

A larger number of portable terminal placement areas may be provided on the flat plate 600. The portable terminal placement areas (Z1a aid Z1b) differ in color from the remaining area so that the user can easily determine that the portable terminal placement areas (Z1a and Z1b) are areas in which a portable terminal should be placed. Note that the color of the boundary area between the portable terminal placement area Z1 and the remaining area may be changed instead of changing the color of the entire portable terminal placement areas (Z1a and Z1b).

A power receiving device (10a or 10b) and an XY stage (702a or 702b) are provided under a placement side (SA) in each of the portable terminal placement areas (Z1a and Z1b). According to this embodiment, the primary coil (L1) can be spontaneously and automatically positioned with respect to the secondary coil (L2) by the operation described in the first to third embodiments.

According to this embodiment, secondary batteries of a plurality of secondary-side instruments can be charged simultaneously. The above-described structure may be installed in a portable telephone shop as a charger table that can simultaneously charge a plurality of portable terminals, and may be utilized by the customer.

Note that an embodiment in which the secondary-side instrument is moved by trial and error without providing the XY stage (see fourth embodiment) may be employed. In this case, it is desirable to separately provide a notification section that indicates the state of the harmonic detection signal.

Sixth Embodiment

Figure 35:
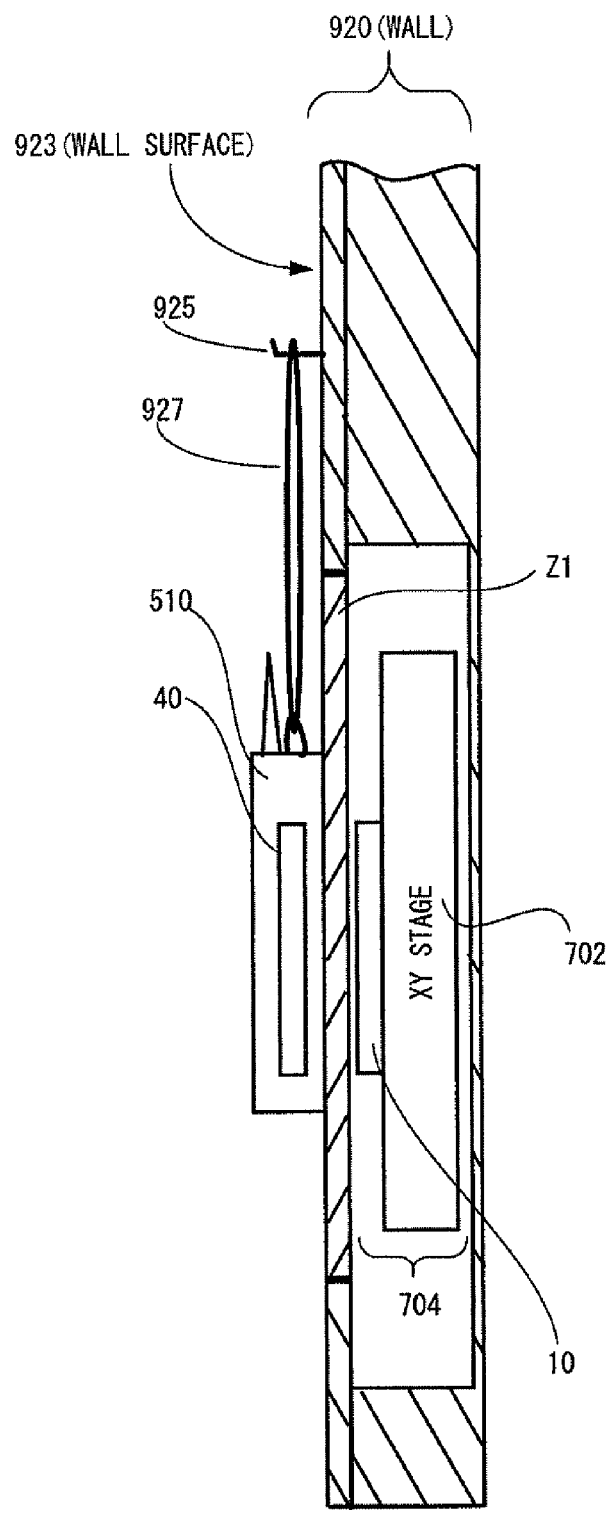
FIG. 35 is a view showing a structure in which a power receiving device is provided in a wall.

In this embodiment, a power receiving device is provided in a wall. FIG. 35 is a view showing a structure in which a power receiving device is provided in a wall.

Although the above embodiments have been described taking a system desk as an example, the structure according to the invention also includes a wall (or a clock-type structure attached to a wall). Specifically, a secondary-side instrument such as a portable terminal may be placed horizontally (horizontal direction) or vertically (vertical direction).

As shown in FIG. 35, a power-transmitting-side device 704 including a power transmitting device 10 and an XY stage 702 is provided in a vertical wall. In this embodiment, a wall surface 923 serves as a placement side (SA). The power-transmitting-side device 704 is provided under the wall surface 923 (in this example, the direction toward the inside of the structure being referred to as a downward direction) in the same manner as in the above embodiments.

A portable terminal 510 including a power receiving device 40 (a folder including the power receiving device 40 may be attached to the portable terminal 510 instead of incorporating the power receiving device 40 in the portable terminal 510) is suspended from a support 925 through a strap 927.

According to this embodiment, the primary coil (L1) can be spontaneously and automatically positioned with respect to the secondary coil (L2) by the operation described in the first to third embodiments.

Note that an embodiment in which the secondary-side instrument is moved by trial and error without providing the XY stage (see fourth embodiment) may be employed. In this case, it is desirable to separately provide a notification section that indicates the state of the harmonic detection signal.

The wall-shaped structure compliant with non-contact power transmission may be utilized as a wall (structure in which the power transmitting device and the like are provided in a wall) of a condominium or a single-family house, for example. In this case, a portable terminal suspended on a wall through a strap can be automatically charged via non-contact power transmission from the power transmitting device provided in the wall, for example. The structure in which the power transmitting device is provided in a wail may be used to charge a portable terminal or supply power to a household appliance, for example (this also applies to a structure configured so that the secondary-side instrument is placed horizontally).

Seventh Embodiment

This embodiment illustrates an example of a plate-shaped or pad-shaped structure. The structure according to the invention also includes a plate (i.e., a plate-shaped article having a relatively small area) and a pad (i.e., a pad or mat having a relatively small area and having a friction or impact buffer function).

The material for the plate or pad is not limited. For example, a rubber or a plastic having flexibility (bendability) and elasticity, a synthetic fiber fabric, or the like may be used in order to provide a friction or impact buffer function (note that the material is not limited thereto).

A synthetic resin (e.g., acrylic resin) may also be used in the same manner as in the above embodiments.

Figure 36:
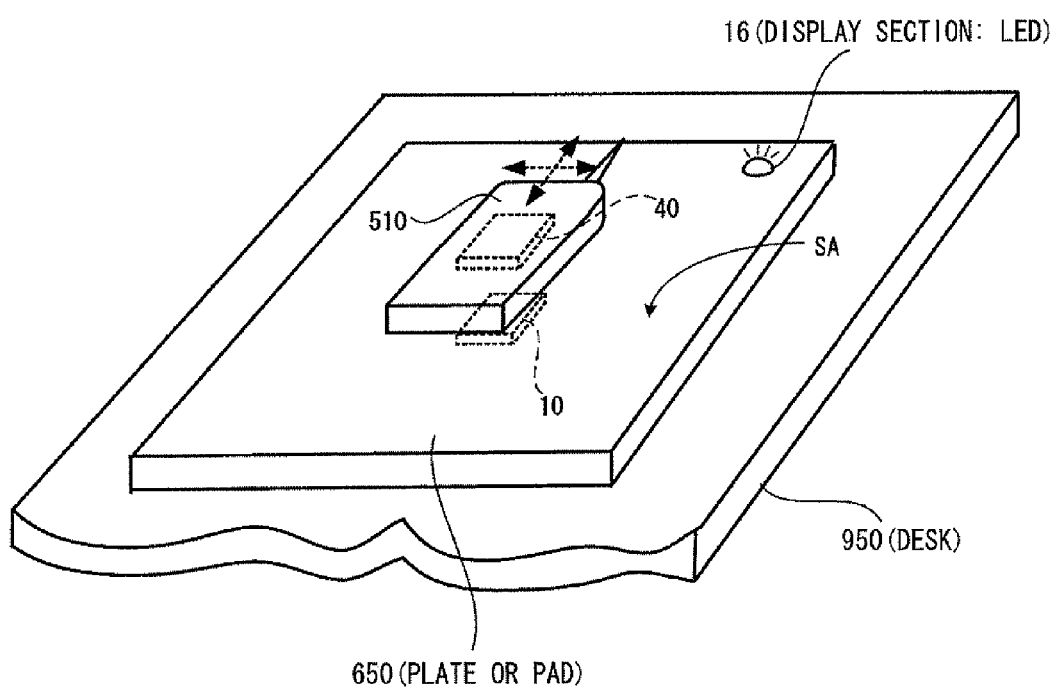
FIG. 36 is a view showing an example of a plate-shaped or pad-shaped structure.

FIG. 36 is a view showing an example of a plate-shaped or pad-shaped structure. In this embodiment, the method according to the fourth embodiment may be employed, for example.

Specifically, a notification section that indicates the state of the harmonic detection output may be provided, and the secondary-side instrument may be moved by trial and error using a notification signal as an index to position the secondary coil with respect to the primary coil, as described with reference to FIGS. 33A and 33B.

In FIG. 36, a plate (pad) 650 has such a thickness that a power transmitting device 10 can be buried in the plate (pad) 650. The power transmitting device 10 is buried in the plate (pad) 650. The plate (pad) 650 is placed on a desk 950.

The user of a portable terminal 510 moves the portable terminal 510 by trial and error using the ON/OFF state and the color of a display section (LED) 16 that indicates the state of the harmonic detection output as an index to position the secondary coil (L2) with respect to the primary coil (L1). After positioning has been completed, power is transmitted from the power transmitting device 10 to a power receiving device 40.

Since the plate-shaped or pad-shaped structure compliant with non-contact power transmission has excellent movability and portability, the user can easily utilize non-contact power transmission in an arbitrary place. When the power transmitting device is provided in the plate or the pad, the power transmitting device can be moved together with the plate or the pad.

Eighth Embodiment

The above embodiments have been described taking an example in which the harmonic detection circuit 25 and the secondary coil approach detection circuit (28 or CP1) function as a means for adjusting the positional relationship between the primary coil (L1) and the secondary coil (L2). These circuits also function as a means that detects (determines) whether or not an article placed in the placement area (Z1) can be a power transmission target.

Specifically, when a harmonic can be detected by the harmonic detection circuit 25, the article placed in the placement area is not a screw, a nail, or the like, but is a secondary-side instrument that can be (may be) a power transmission target.

Specifically, the harmonic detection circuit 25 also has a function of a means that detects whether or not the article placed in the placement area (Z1) is an instrument that can be a power transmission target (i.e., a detector that detects whether or not the article is an appropriate secondary-side instrument).

Likewise, when the approach of the secondary coil can be detected by the secondary coil approach detection circuit (28 or CP1), the secondary-side instrument that can be a power transmission target approaches the primary-side instrument. Therefore, the approach detection circuit also has a function of a means that detects whether or not the instrument placed in the placement area (Z1) is a secondary-side instrument that includes the secondary coil and can be a power transmission target (i.e., a detector that detects whether or not the instrument is an appropriate secondary-side instrument).

According to this embodiment, the primary-side instrument can easily and independently detect whether or not the article placed in the placement area can be a power transmission target by a simple configuration utilizing the function of the non-contact power transmission. According to this embodiment, the power transmitting device can determine whether or not the secondary-side instrument is appropriate, for example.

If the primary-side instrument can independently determine whether or not the article placed in the placement area can be a power transmission target, a situation in which power is unnecessarily transmitted to an article that cannot be a power transmission target is prevented. Therefore, unnecessary power consumption and heat generation can be prevented.

In the above-described example, the primary-side instrument independently detects the secondary coil position and the like. Note that the invention is not limited thereto. For example, the secondary-side instrument may transmit an index signal to the primary-side instrument, and the primary-side instrument may receive the index signal and determine the secondary coil position.

The secondary-side instrument may transmit self-ID information, and the primary-side instrument may receive the self-ID information and determine that the secondary-side instrument is a power transmission target.

In the configuration shown in FIGS. 33A and 33B (or FIG. 36), the display section 16 (notification section) may notify the user whether or not the article placed in the placement area Z1 is an instrument that can be a power transmission target (e.g., a secondary-side instrument having a secondary-side configuration compliant with the standard), for example.

For example, when the reception level of the harmonic detection circuit 25 is appropriate, the article placed in the placement area Z1 is determined to be a secondary-side instrument that can be a power transmission target, and the display section 16 emits green light. This enables the user to determine that utilization of the non-contact power transmission system has been allowed.

Ninth Embodiment

In this embodiment, the placement area Z1 shown in FIG. 1A is formed using a transparent member (including a translucent member). The area other than the placement area may be formed using an opaque member (or a member that differs in light reflectance from the placement area).

In this case, since the user can determine the placement area Z1 and visually observe the lower side (inside) of the placement area Z1, the user can easily determine the position of a primary coil (L1) provided under (in) the placement area Z1 either directly or indirectly.

For example, the user may visually observe the primary coil (L1). Alternatively, the primary coil (L1) may be covered with an IC package or the like, and a mark that indicates the coil position may be attached to the IC package or the like. In this case, the user can determine the position of the primary coil (L1) using the mark as an index.

Therefore, when the user moves the position of the secondary-side instrument to position the primary coil (L1) and the secondary coil (L2) (second embodiment), the user can more easily position the primary coil (L1) and the secondary coil (L2) so that the convenience to the user is improved.

Although only some embodiments of the invention have been described in detail above, those skilled in the art would readily appreciate that many modifications are possible in the embodiments without materially departing from the novel teachings and advantages of the invention. Specifically, various modifications are possible without materially departing from the novel teachings and advantages of the invention.

Accordingly, such modifications are intended to be included within the scope of the invention. Any term (e.g., GND and portable telephone/charger) cited with a different term (e.g., low-potential-side power supply and electronic instrument) having a broader meaning or the same meaning at least once in the specification and the drawings can be replaced by the different term in any place in the specification and the drawings. Any combinations of the embodiments and the modifications are also included within the scope of the invention.

The configurations and the operations of the power transmission control device, the power transmitting device, the power reception control device, and the power receiving device, and the method of detecting the secondary-side load by the primary side instrument are not limited to those described in the above embodiments. Various modifications and variations may be made.

The size and the application of the structure are not limited. The invention may be widely applied to various structures.

In the above embodiments, the primary-side instrument detects the relative position of the secondary-side instrument. Note that positioning information may be transmitted from the secondary-side instrument to the primary-side instrument so that the primary-side instrument determines the coil positioning state. Such a modification is also included within the scope of the invention. In this case, a circuit that detects the positional relationship between the coils based on the positioning information from the secondary-side instrument corresponds to the position detection circuit according to the invention.

The secondary-side instrument (electronic instrument) may be a wide range of instruments such as a card-type instrument and a household appliance. As the method that detects that the secondary-side instrument has been placed on the placement side, a mechanical placement detection device in which a switch is turned ON due to the weight of the secondary-side instrument may be utilized. Such a modification is also included within the scope of the invention. In this case, a circuit that detects placement of the secondary-side instrument by detecting that the switch has been turned ON corresponds to the position detection circuit according to the invention.

According to at least one aspect of the invention, the following effects can be obtained, for example. Note that the following effects are not necessarily achieved at the same time. Accordingly, the following effects do not in any way limit the scope of the invention.

(1) When using the structure according to at least one embodiment of the invention, the power transmitting device (primary-side instrument) can voluntarily detect the relative positional relationship between the power transmitting device (primary-side instrument) and the power receiving device (secondary-side instrument). The primary coil and the secondary coil can be efficiently positioned using the positional relationship detection information. Moreover, the primary coil and the secondary coil can be automatically positioned.

(2) When the placement side of the structure is partially utilized as the placement area for the secondary-side instrument, the remaining area of the placement side may be utilized as an area for placing an article other than the secondary-side instrument, for example.

(3) When the power transmitting device and the power receiving device are separated by a flat plate that exhibits desired rigidity and has a placement side, an article other than the secondary-side instrument can be placed in the secondary-side instrument placement area when the secondary-side instrument is not charged, for example. Since the power transmitting device is provided under the placement side of the flat plate, the power transmitting device is shielded from the outside by the flat plate. Therefore, since a liquid such as water does not enter the power transmitting device or an object does not fall onto the power transmitting device, the power transmitting device can be used safely. As the material for the flat plate, a synthetic resin such as an acrylic resin may be used, for example.

(4) When the flat plate is cut in the area in which the primary coil faces the secondary coil so that the primary coil and the secondary coil directly transmit and receive power without the flat plate interposed between the primary coil and the secondary coil, a power transmission loss due to the flat plate does not occur. Therefore, a decrease in transmission efficiency can be prevented.

(5) Since the structure compliant with non-contact power transmission can be utilized as a multi-functional work desk such as a system desk, a highly versatile and convenient next-generation non-contact power transmission system can be utilized in daily life.

(6) The structure compliant with non-contact power transmission can be utilized as a charger table that is installed in a portable telephone shop and can simultaneously charge a plurality of portable terminals, for example. The structure compliant with non-contact power transmission can also be utilized as a counter table used in a family restaurant or a bar popular among young people and the like.

(7) The structure compliant with non-contact power transmission can be utilized as a wall (structure in which the power transmitting device and the like are provided in a wall) of a condominium or a single-family house, for example. In this case, a portable terminal suspended on a wall through a strap can be automatically charged via non-contact power transmission from the power transmitting device provided in the wall, for example. The structure in which the power transmitting device is provided in a wall may be used to charge a portable terminal or supply power to a household appliance, for example (this also applies to a structure configured so that the secondary-side instrument is placed horizontally).

(8) The structure compliant with non-contact power transmission may be a plate-shaped or pad-shaped structure, for example. The structure according to the invention may be a plate (i.e., a plate-shaped article having a relatively small area) or a pad (i.e., a pad or mat having a relatively small area and having a friction or impact buffer function), for example. The material for the plate or pad is not limited. For example, a rubber or a plastic having flexibility (bendability) and elasticity, a synthetic fiber fabric, or the like may be used. Since the plate-shaped or pad-shaped structure has excellent movability and portability, the user can easily utilize non-contact power transmission in an arbitrary location. When the power transmitting device is provided in the plate or the pad, the power transmitting device can be moved together with the plate or the pad.

(9) An excellent non-contact power transmission system can be utilized comfortably by utilizing the structure according to the embodiment of the invention. When using the non-contact power transmission system provided in the structure according to the invention, a novel coil relative positional relationship detection method utilizing the resonance of an odd-order harmonic of the drive frequency of the primary coil due to the approach of the secondary coil provided with a magnetic material is implemented, for example.

(10) When using the non-contact power transmission system provided in the structure according to the embodiment of the invention, a situation in which the primary coil and the secondary coil are positioned to satisfy a given relationship (e.g., the position of the primary coil coincides with the position of the secondary coil, or the primary coil and the secondary coil are positioned at the given distance R) can be detected by adjusting the circuit parameter of the harmonic resonant circuit provided in the secondary-side instrument, for example.

(11) When using the non-contact power transmission system provided in the structure according to the embodiment of the invention, the primary coil and the secondary coil can be automatically positioned by automatically scanning the primary coil using the actuator and the XY stage utilizing the position detection result based on the harmonic detection output as an index, for example.

(12) When using the non-contact power transmission system provided in the structure according to the embodiment of the invention, the user can position the primary coil and the secondary coil by moving the secondary-side instrument by trial and error utilizing the position detection result based on the harmonic detection output as an index, for example.

(13) When using the non-contact power transmission system provided in the structure according to the embodiment of the invention, placement or removal (leave) of the secondary-side instrument in or from a given area can be detected based on the harmonic detection output for example.

(14) When using the non-contact power transmission system provided in the structure according to the embodiment of the invention, the positioning operation can be completely automated by combining the technology that allows the primary-side instrument to automatically detect the approach of the secondary coil provided with a magnetic material and the automatic primary coil positioning technology using the actuator, for example.

(15) Whether or not the article placed in the placement area is a secondary-side instrument that includes the secondary coil and can be a power transmission target can be detected using the harmonic detection circuit and the secondary coil approach detection circuit. When the article cannot be a power transmission target, the power-transmission-side instrument control device can stop the non-contact power transmission process, for example. This prevents unnecessary power transmission so that an increase in power consumption, heat generation, and the like do not occur. Moreover, the user can be notified of the detection result using the notification means. This enables the user to determine that utilization of the non-contact power transmission system has been allowed, for example.

(16) When using the non-contact power transmission system provided in the structure according to the embodiment of the invention, since appropriate power transmission is necessarily implemented regardless of the size, shape, design, and the like of the secondary-side instrument, the versatility of the non-contact power transmission system is significantly improved.

(17) When using the non-contact power transmission system provided in the structure according to the embodiment of the invention, since the degree of freedom relating to the design of the secondary-side instrument is not limited, a burden is not imposed on the manufacturer of the secondary-side instrument, for example.

(18) When using the non-contact power transmission system provided in the structure according to the embodiment of the invention, since the relative positional relationship between the primary coil and the secondary coil is detected by effectively utilizing the circuit configuration of the non-contact power transmission system without using a special circuit (e.g., position detection element), the configuration does not become complicated. For example, a highly versatile and convenient next-generation non-contact power transmission system can be implemented that enables the position of the primary coil to be automatically adjusted to enable charging or the like merely by placing a portable terminal or the like in a given area of a structure (e.g., desk) having a flat surface, or enables the primary coil and the secondary coil to be positioned by manually moving a portable terminal or the like.

(19) The invention can provide a next-generation non-contact power transmission system with significantly improved versatility and convenience, and enables the novel non-contact power transmission system to be easily utilized. Therefore, the invention promotes utilization of the non-contact power transmission system as an infrastructure to contribute to widespread use of the non-contact power transmission system.

(20) Secondary batteries of a plurality of secondary-side instruments can be charged simultaneously. Such a structure may be installed in a portable telephone shop as a charger table that can simultaneously charge a plurality of portable terminals, and may be utilized by the customer The invention achieves an effect of promoting widespread use of the next-generation non-contact power transmission system with significantly improved versatility and convenience. For example, the invention is useful for a structure having a secondary-side instrument placement side and compliant with non-contact power transmission.

What is claimed is:

1. A structure having a power transmitting device comprising:
    a placement member that includes a placement side on which an electronic instrument including a power receiving device having a secondary coil can be placed,
    a power transmitting device having a primary coil that transmits power to the power receiving device,
    an actuator that causes movement of a position of the primary coil of the power transmitting device in an XY plane, and an XY stage that moves the position of the primary coil when driven by the actuator, the primary coil being able to couple electromagnetically with a secondary coil of the power receiving device, the power transmitting device including a position detection circuit, the position detection circuit detecting a positional relationship between the primary coil and the secondary coil, the position detection circuit being a harmonic detection circuit that detects a harmonic signal of a drive signal of the primary coil, a resonant circuit including the primary coil being formed when the primary coil and the secondary coil are electromagnetically coupled in a state in which the center of the primary coil and the center of the secondary coil having a given positional relationship, the resonant circuit resonating with a harmonic of the driving signal of the primary coil, and a resonance peak signal being output from the harmonic detection circuit, the power transmitting device further including:

a power transmission control device, the power transmission control device including a power-transmitting-side control circuit that controls power transmission to the power receiving device;

the harmonic detection circuit as the position detection circuit that detects the harmonic signal of the drive signal of the primary coil;

a calculation circuit that performs given calculations based on a detection signal from the harmonic detection circuit, and calculates the position of the center of the secondary coil;

and an actuator control circuit that controls the operation of the actuator that causes movement of the position of the primary coil in the XY plane, the actuator control circuit driving the actuator to move the primary coil along a first axis to perform a first scan to detect the position of the secondary coil, the calculation circuit calculating the coordinates of a midpoint of a line segment that connects two points at which the peak of the detection signal of the harmonic detection circuit is obtained during the first scan, the actuator control circuit driving the actuator to move the primary coil along a second axis that perpendicularly intersects the first axis and passes through the midpoint calculated by the first scan to perform a second scan to detect the position of the secondary coil, the calculation circuit calculating the coordinates of a midpoint of a line segment that connects two points at which the peak of the detection signal of the harmonic detection circuit is obtained during the second scan, and the actuator control circuit driving the actuator to move the primary coil so that the position of the center of the primary coil coincides with the position of the midpoint calculated during the second scan.

2. The structure as defined in claim 1, the placement member having a strength sufficient to withstand a given weight, and the primary coil and the secondary coil being electromagnetically coupled through the placement member.

3. The structure as defined in claim 1, the placement member having a cutting portion in which the primary coil faces the secondary coil so that the primary coil and the secondary coil are electromagnetically coupled without the placement member interposed between the primary coil and the secondary coil.

4. The structure as defined in claim 1, the placement side at least partially having a side parallel to a coil surface of the primary coil that is planar.

5. The structure as defined in claim 1, the structure being a desk-shaped structure.

6. The structure as defined in claim 1, the structure being a wall-shaped structure.

7. The structure as defined in claim 1, the structure being a portable plate-shaped structure.

8. The structure as defined in claim 1, the structure being a portable pad-shaped structure.

9. The structure as defined in claim 1, a plurality of the electronic instruments being able to be placed on the placement side, and the power being simultaneously transmitted from the structure to the plurality of electronic instruments via non-contact power transmission.

10. The structure as defined in claim 1, the power transmitting device intermittently driving the primary coil using a drive signal having a given frequency in order to detect an approach of the secondary coil.

11. A structure having a power transmitting device comprising:

a placement member that includes a placement side on which an electronic instrument including a power receiving device having a secondary coil can be placed, a power transmitting device having a primary coil that transmits power to the power receiving device, the primary coil being able to couple electromagnetically with a secondary coil of the power receiving device, the power transmitting device including a position detection circuit, the position detection circuit detecting a positional relationship between the primary coil and the secondary coil, the position detection circuit being a harmonic detection circuit that detects a harmonic signal of a drive signal of the primary coil, a resonant circuit including the primary coil being formed when the primary coil and the secondary coil are electromagnetically coupled in a state in which the center of the primary coil and the center of the secondary coil have a given positional relationship, the resonant circuit resonating with a harmonic of the driving signal of the primary coil, and a resonance peak signal being output from the harmonic detection circuit.

12. A structure having a power transmitting device comprising:

a placement member that includes a placement side on which an electronic instrument including a power receiving device having a secondary coil can be placed, a power transmitting device having a primary coil that transmits power to the power receiving device, an actuator that causes movement of the position of the primary coil of the power transmitting device in an XY plane, and an XY stage that moves the position of the primary coil when driven by the actuator, the primary coil being able to couple electromagnetically with a secondary coil of the power receiving device, the power transmitting device including a position detection circuit, the position detection circuit detecting a positional relationship between the primary coil and the secondary coil, the power transmitting device further including:
a power transmission control device, the power transmission control device including a power-transmitting-side control circuit that controls power transmission to the power receiving device;
the harmonic detection circuit as the position detection circuit that detects the harmonic signal of the drive signal of the primary coil;
a calculation circuit that performs given calculations based on a detection signal from the harmonic detection circuit, and calculates the position of the center of the secondary coil;
and an actuator control circuit that controls the operation of the actuator that causes movement of the position of the primary coil in the XY plane,
the actuator control circuit driving the actuator to move the primary coil along a first axis to perform a first scan to detect the position of the secondary coil,
the calculation circuit calculating the coordinates of a midpoint of a line segment that connects two points at which the peak of the detection signal of the harmonic detection circuit is obtained during the first scan,
the actuator control circuit driving the actuator to move the primary coil along a second axis that perpendicularly intersects the first axis and passes through the midpoint calculated by the first scan to perform a second scan to detect the position of the secondary coil,
the calculation circuit calculating the coordinates of a midpoint of a line segment that connects two points at which the peak of the detection signal of the harmonic detection circuit is obtained during the second scan, and
the actuator control circuit driving the actuator to move the primary coil so that the position of the center of the primary coil coincides with the position of the midpoint calculated during the second scan.

* * * * *